(12) United States Patent
Stromotich

(10) Patent No.: US 9,222,527 B2
(45) Date of Patent: Dec. 29, 2015

(54) HIGH EFFICIENCY INFINITELY VARIABLE FLUID POWER TRANSFORMER

(76) Inventor: Frank Louis Stromotich, West Vancouver (CA)

(*) Notice: Subject to any disclaimer, the term of this patent is extended or adjusted under 35 U.S.C. 154(b) by 1166 days.

(21) Appl. No.: 12/965,757

(22) Filed: Dec. 12, 2010

(65) Prior Publication Data

US 2012/0144815 A1    Jun. 14, 2012

(51) Int. Cl.
*F15B 1/02* (2006.01)
*F16D 31/00* (2006.01)
*F03B 13/18* (2006.01)

(52) U.S. Cl.
CPC .............. *F16D 31/00* (2013.01); *F03B 13/187* (2013.01); *F03B 13/1815* (2013.01); *F03B 13/1855* (2013.01); *F05B 2260/406* (2013.01); *Y02E 10/38* (2013.01)

(58) Field of Classification Search
CPC .. F15B 1/024; F15B 11/032; F15B 2211/214; F15B 2211/88
USPC .................................. 60/398, 414, 419, 442
See application file for complete search history.

(56) References Cited

U.S. PATENT DOCUMENTS

| | | | | |
|---|---|---|---|---|
| 2,933,897 | A * | 4/1960 | Toutant | 60/419 |
| 4,553,391 | A * | 11/1985 | Reinhardt | 60/419 |
| 6,223,529 | B1 * | 5/2001 | Achten | 60/419 |
| 6,854,268 | B2 * | 2/2005 | Fales et al. | 60/414 |
| 2002/0104313 | A1 * | 8/2002 | Clarke | 60/419 |

* cited by examiner

*Primary Examiner* — F. Daniel Lopez

(57) ABSTRACT

A fluid transformer is comprised of standard components arranged in a novel way that gives a substantial high efficiency gain in overall transmission over prior art transfomers. The transformer is applied in a example of continuous application where high efficiency is important, that of a wave energy converter, (WEC), that reciprocates as recurring waves pass over. The transformer operates with single-acting, double-acting and helical hydraulic actuators to pressurize hydraulic fluid in an energy conversion system and power a hydraulic motor that drive an electric generator. A sensor system detects characteristics of in-coming waves, or alternatively waves in the process of wave making, by detecting changes in pressure as waves pass over the sensor system. A control computer system calculates characteristics of the waves such as wave height and speed data, and uses the data to control aspects of the WECs and components of the transformer system.

6 Claims, 68 Drawing Sheets

(POWER STROKE - PRESSURE BOOST) Q3 SS3

FIG. 6 (POWER STROKE - PRESSURE BOOST) Q3 SS3

FIG. 7 (POWER STROKE - PRESSURE REDUCE) Q3 SS4

FIG. 8 (RETURN STROKE - PRESSURE BOOST) Q1 SS1

FIG. 9 (RETURN STROKE - PRESSURE REDUCE) Q1 SS2

FIG. 10 (POWER STROKE - PRESSURE BOOST - Motor-Pump) Q3 SSS3

FIG. 11 (POWER STROKE – PRESSURE REDUCE – Motor-Pump) Q3 SSS4

FIG. 12 (RETURN STROKE - PRESSURE BOOST - Motor-Pump) Q1 SSS1

FIG. 13 (RETURN STROKE - PRESSURE REDUCE - Motor-Pump) Q1 SSS2

FIG. 14 (POWER STROKE RETRACT - PRESSURE BOOST - Class C) Q3 SSC2

FIG. 15 (RETURN STROKE EXTEND - PRESSURE BOOST - Class C) Q1 SSC1

FIG. 16 (MOTOR STROKE EXTEND - PRESSURE BOOST - Class A) Q1 SS1 CO1

FIG. 17 (MOTOR STROKE EXTEND - PRESSURE REDUCE - Class A) Q1 SS2 CO1

FIG. 18 (MOTOR STROKE RETRACT - PRESSURE BOOST - Class A) Q2 SS1 CO2

FIG. 19 (MOTOR STROKE RETRACT - PRESSURE REDUCE - Class A) Q2 SS2 CO2

FIG. 20 (REGEN STROKE RETRACT - PRESSURE BOOST - Class A) Q3 SS3 CO1

FIG. 21 (REGEN STROKE RETRACT - PRESSURE REDUCE - Class A) Q3 SS4 CO1

FIG. 22 (REGEN STROKE EXTEND - PRESSURE BOOST - Class A) Q4 SS3 CO2

FIG. 23 (REGEN STROKE EXTEND - PRESSURE REDUCE - Class A) Q4 SS4 CO2

FIG. 24 (MOTOR STROKE - PRESSURE BOOST - Class B) Q1 SSS1 CO1

FIG. 25 (MOTOR STROKE - PRESSURE REDUCE - Class B) Q1 SSS2 CO1

FIG. 26 (MOTOR STROKE - PRESSURE BOOST - Class B) Q2 SSS1 CO2

FIG. 28 (REGEN STROKE - PRESSURE BOOST - Class B) Q3 SSS3 CO1

FIG. 29 (REGEN STROKE - PRESSURE REDUCE - Class B) Q3 SSS4 CO1

FIG. 30 (REGEN STROKE - PRESSURE BOOST - Class B) Q4 SSS3 CO2

FIG. 31 (REGEN STROKE - PRESSURE REDUCE - Class B) Q4 SSS4 CO2

FIG. 32 (MOTOR STROKE EXTEND - PRESSURE BOOST - Class C) Q1 SSC1 CO1

FIG. 33 (MOTOR STROKE RETRACT - PRESSURE BOOST - Class C) Q2 SSC2 CO2

FIG. 34 (REGEN STROKE RETRACT - PRESSURE BOOST - Class C) Q3 SSC3 CO1

FIG. 35 (REGEN STROKE EXTEND - PRESSURE BOOST - Class C) Q4 SSC4 CO2

FIG. 36 (DUAL - REGEN STROKE - PRESSURE BOOST) Q3 SS3

FIG. 37 (DUAL - POWER STROKE EXTEND - PRESSURE BOOST) Q1 SS1

FIG. 38 (TRIPLEX - REGEN STROKE - PRESSURE BOOST) Q3 SS3

Fig. 39 (QUADRANT LEGEND)

FIG. 40 - (WEC with helical hydraulic actuators)

FIG. 46 - (Transformer in motoring mode)

FIG. 47 - (Transformer in regenerating mode.)

FIG. 48 - (Actuators in translation and rotation)

FIG. 49 (Actuators in translation and rotation reversed)

FIG. 50 - (Class B - Transformer in motoring mode)

FIG. 51 - (Class B - Transformer in regenerating mode)

FIG. 52 - (Actuators in translation and rotation)

FIG. 53- (Actuators in translation and rotation reversed)

FIG. 54 - ( Class C - Transformer in motoring mode )

FIG. 55 - (Class C Transformer in regenerating mode )

FIG. 56 - (Actuators in translation and rotation)

FIG. 57 - (Actuators in translation and rotation reversed)

FIG. 58 - (Paralleling Transformers in Motoring Mode)

FIG. 59 - (Paralleling Transformers in Regenerating Mode)

FIG. 60 - ( Achten Transformer in motoring mode )

FIG. 61 - (Achten Transformer in regenerating mode)

FIG. 63 - Transposition

FIG. 65 - Transposition

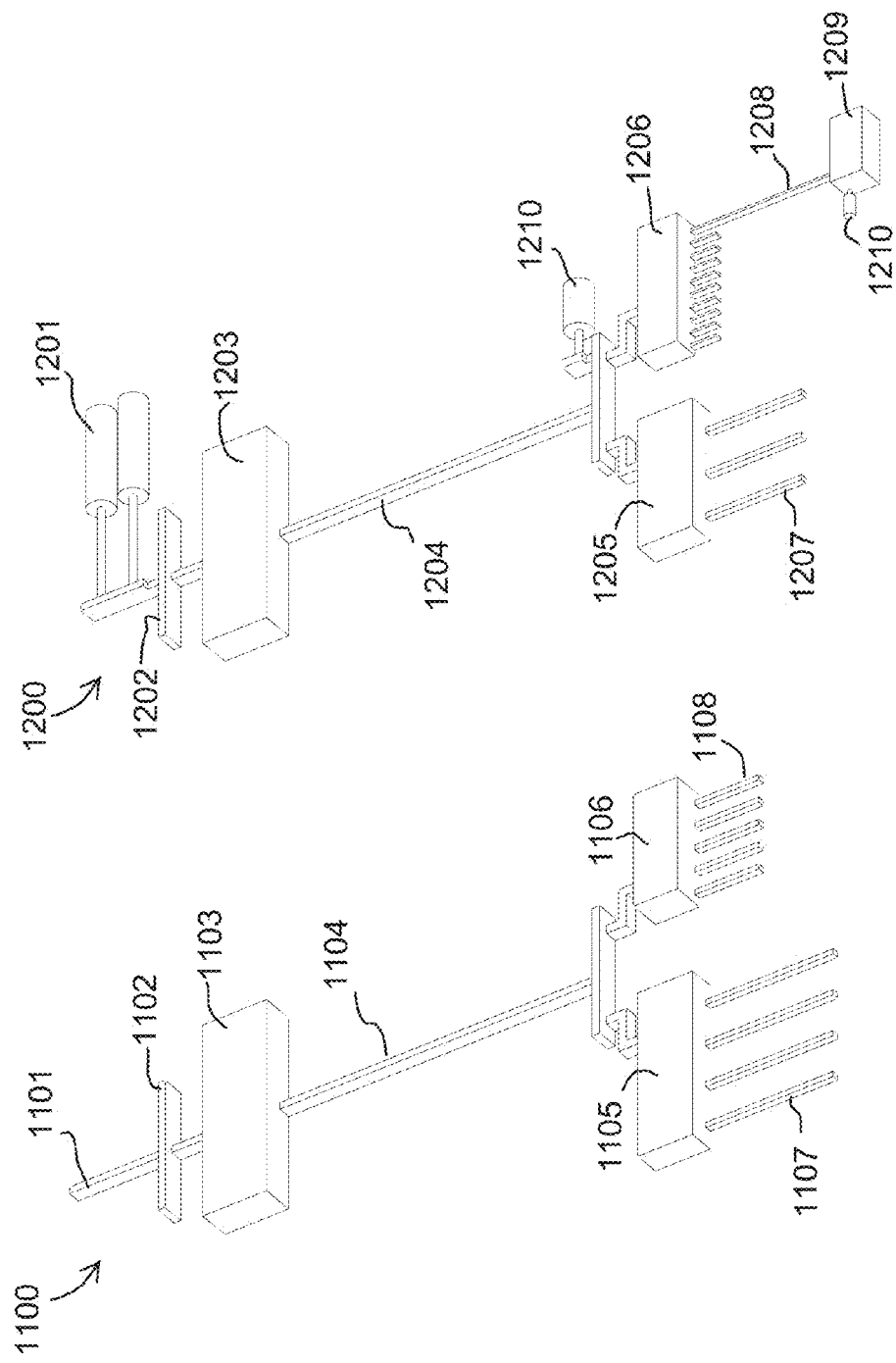
FIG. 68 - (Electric and Hydraulic Distribution Systems)

HIGH EFFICIENCY INFINITELY VARIABLE FLUID POWER TRANSFORMER

CROSS-REFERENCE TO RELATED APPLICATION

This is a U.S. National Phase application, as a continuation in part, and claims priority and the benefit thereof of Canadian Patent Application No. 2,634,450, filed Jun. 18, 2008, and application 33392PCT filed in Canada on Jun. 11, 2009, published as WO2009152606 A1, and now includes further improvements.

BACKGROUND

The purpose of this application is to better particularize the high efficiency infinitely variable-displacement fluid power transformer included with the wave energy converter (WEC) application, to claim it as a separate invention, as required in accordance with the rules of electronic filing when proceeding with an application-to-make-special to achieve accelerated-examination with the object to achieve final allowance within one year. The benefits of efficiency improvement is recited by the "Engineering Research Center for Compact and Efficient Fluid Power" group of universities funded by the National Science Foundation reports that a one percent improvement in the efficiency of exiting hydraulic energy use would result in a savings of $1 billion per year in the USA. The field of fluid power in which the invention applies is shown by analogy with an electric distribution system in FIG. 68.

Artisans of electronic filing will appreciate the speed of comprehension of figures with consistent margins and scale used in this application and in the companion WEC application, when drawings in pdf format are viewed full page size on a computer screen they become animated by rolling the mouse wheel, making it possible to instantly view effects of switching changes on fluid flow, such as for example in this application, when scrolling between power-stroke and return-stroke, or pressure-boost and pressure-reduce, in FIGS. 6 to 9. To meet the requirement to disclose the best mode of application of the invention, and the closest related art for transformer applications generally and including the WEC, the applicant devised a new form of expression, known herein as a multidimensional cube, and explained it with additional figures and description for the Class A, Class B, Class C transformers, and most recently published closest related art, in sets of FIGS. 46 to 49 Class A, 50 to 53 Class B, 54 to 57 Class C, and 60, 61 and 68, respectively. FIGS. 40 to 44 are more particularized expressions for comparing the inventive switching features for the claims section. The aforementioned multi-dimensional expressions (cubes) are formulated in high resolution vector graphics, at press quality, allowing for magnification to more than 15 times page size on the computer screen, for viewing the fine details of switching and fluid flows, and the polarity of fluid flow and shaft rotation.

The multi-dimensional cubes could be further particularized to include for the efficiency improvement of the transformer by sectionalizing the assembly of hydraulic cylinders below the WEC piston shown in FIG. 5, into groups with two sections as shown in FIGS. 36 and 37, and into groups with three sections as shown in FIG. 38.

Artisans will appreciate on perusing the drawings and description in the 2008 filing, that the inventor had possession of the claimed subject matter at the claimed priority time, 18 Jun. 2008, and that artisans generally could not have foreseen the same claimed subject matter in his earlier application, referenced here as CA 2,408,855, filed in Canada in 2002, published in 2004, and abandoned in June 2008, prior to any claims being accepted. This is apparent also on comparison with the recently published closest related art.

The inventive transformer relates to fluid power transmission systems for fast varying cyclic applications like ocean wave energy converters, hydraulic hybrid applications, and, more generally, to a wide range of vertical and horizontal translating and forward-reverse rotation applications. Fluid power transformers are known in hydraulic systems for converting or recovering energy of recurring motion to electric energy, and for boosting and reducing fluid pressure between different levels in common pressure rail ("CPR") systems.

It is known that hydraulic power systems with linear and rotational actuation can operate in both motoring mode and regenerating mode, that of extending/retracting and forward/reverse rotation, and that these modes can be segregated into four quadrants, Q1 to Q4. It is also known that rotational actuation can be made electronically reversible in each of the quadrants. Fluid power flows from the CPR through the transformer to the actuator in motoring mode, and from the actuator through the transformer to the CPR in regeneration mode.

In U.S. Pat. No. 7,028,470 to Achten, the sequence chosen shows motion in four quadrants of angular speed and torque in FIG. 8, which it is reported is also convertible to fluid force and linear displacement, namely Qi and Qiv, for a single-acting cylinder with linear extending and linear retracting, respectively. It can be concluded, therefore, that Qiv is a regeneration mode with external force applied to retract the cylinder. Therefore, when including for double-acting cylinders, Qii must be a linear extending mode because of movement in the same direction as Qi, and Qiii must be a linear retracting mode because of movement in the same direction as Qiv. Therefore, it can be concluded that Qii is a regeneration mode and Qiii is a motoring mode. This quadrant by quadrant sequence of Achten is troublesome because it is difficult to visualize the connection of transformer to the actuator in a particular quadrant to visualize actuation and transformer fluid flow.

The quadrant sequence used in this application is particular to the new form of expression, with motoring on the right quadrants (Q1 and Q2), and regeneration on the left quadrants (Q3 and Q4), making it possible to visualize the overall functionality of the Class A and Class B transformers and linear and rotary actuators with their respective multi-dimensional cubes.

According to the invention there is provided a means for transmitting energy between a CPR and an actuator with the smoothness and flexibility of current art infinitely variable motors and pumps, and equally importantly, substantially more efficiently than prior art transformers. There is further provided a means for smoothly paralleling transformers and taking them out of service without fluid power interruption.

The parent invention or companion device, also known herein as the prime mover device, or actuator device, on which this application claims benefit of priority, is the application of the inventive transformer to a wave energy converter (WEC) where the benefits of the high efficiency fluid power transformer are shown to result in a smooth transfer of hydraulic energy to electric energy to a utility grid, with saved energy that would otherwise have been lost with less efficient prior art fluid transformation. It is shown herein that from 34% more to 42% more electric power can be generated by use of the inventive transformer in the fluid transmission pressure change range of 50% to 20%, respectively. In other words, the inventive fluid power transformer is shown to be substantially more efficient than prior art transformers in the whole range of 50% or less change in pressure between transmission sending end and receiving end, with energy savings in the more than 50% pressure change range tapering off from the aforementioned 34% savings, as well. One of the objectives in this application is to provide an efficient transformer of fixed and variable embodiments for a system with several common pressure rails CPRs where fluid can transfer efficiently among them. For example a manufacturer's warehouse filled with products piled high, designed especially for hydraulic-hybrid forklift trucks, could have peak periods of regeneration in early morning when loading outgoing highway trucks, and periods of motoring in early afternoon when unloading incoming trucks and restocking the warehouse.

The following publications describe a number of prior approaches to convert energy of recurring motion to other forms of usable energy, such as electric energy, including but not limited to applications to wave energy, and to other means of efficient fluid power transformation:

Burns: International Patent Publication No. WO 2004/0003380;
Burns: International Patent Publication No. WO 2007/019640;
Gardner: U.S. Pat. No. 6,256,985;
Kouns: U.S. Pat. No. 3,627,451;
Rexroth: U.S. Pat. No. 4,819,429;
Otremba et al: U.S. Pat. No. 5,568,766;
Achten: U.S. Pat. No. 6,116,138;
Fales: U.S. Pat. No. 6,854,268;
Achten: U.S. Pat. No. 7,028,470;
Cherney: U.S. Pat. No. 7,124,576;
Walker: U.S. Pat. No. 7,562,944;
Achten: EP2246566A2;
Stromotich: CA Patent Application No. 2,408,855 filed in 2002 and abandoned in June 2008.

SUMMARY

This summary is provided to introduce a selection of concepts in simplified form that are further described below in the Description. This summary is not intended to identify key features of the claimed subject matter, nor is it intended to be used as an aid in determining the scope of the claimed subject matter. An embodiment of the inventive fluid transformer comprising state-of-art electronically operated, infinitely-variable-reversible, motor and pump devices is the best mode for high efficiency transformation with maximum flexibility and is able to boost pressure or reduce pressure in forward and reverse directions in four quadrants. A further embodiment similarly arranged except comprising fixed displacement rotary devices (those without a variable swashblock feature) is able to boost pressure or reduce pressure in forward and reverse directions in four quadrants with an additional fluid transposition switch at the terminals of the motor or the pump, in lieu of the electronically over-center controllable swashblock. The disclosure herein includes the use of both mutually exclusive motor and pump combinations (Class B), and mutually interchangeable motor and regenerative motor combinations (Class A).

In one application of the inventive fluid power transformer, the companion device—the driving or driven device, as the case may be—the wave energy converter (WEC), comprises several underwater WECs, each having a large piston that reciprocates up and down as recurring waves pass over. Downward motion of the piston drives the rods or plungers of a multiplicity of hydraulic cylinders to pressurize hydraulic fluid in an energy conversion system. Ultimately, the energy conversion system powers one or more hydraulic motors that drive an electric generator or multiple generators. The fluid power transformer is applied in another embodiment of a wave energy converter, to a multiplicity of hydraulic cylinders whose internal motion is translatory and external actuation is rotary—known as helical hydraulic rotary actuators—that differs from the assembly of hydraulic cylinders in the first WEC device where the hydraulic cylinders are translatory only. The inventive fluid power transformer is directly applicable to single-acting and double-acting cylinder operated devices including helical hydraulic rotary actuators, and to fixed and variable-displacement axial piston motors and pumps, and applicable generally where hydraulic fluid is transmitted from one set of input pressure and flow conditions to another set of output pressure and flow conditions.

The companion WEC application on which this transformer invention claims priority, employs single-acting hydraulic cylinders with power-stroke and return-stroke in vertically opposite directions, and as such can be described as a 4-quadrant linear actuator control application with active control in two quadrants only. Regeneration takes place in the third quadrant (Q3) with the piston moving down under force of seawater in the power-stroke. Recovered energy stored in an accumulator in Q3 is used in Q1 to lift the piston to the top of the WEC and expel the seawater in the return-stroke. The hydrokinetic operation of the WEC is started by energy imported over an underwater cable from an electric utility on shore, analogous to known black-start procedures in electric power generation plants.

Embodiments of the inventive fluid power transformer include four switching states that provide fluid pressure-boost and pressure-reduce in both directions to meet the requirements of four quadrants. The hydraulic actuator cylinders in the companion WEC are single acting, retracting in power stroke and extending in return stroke, the dead-weight of the WEC piston providing a natural and sufficient retracting force on the cylinder assembly, even with no seawater in the chamber. The fluid transformer controls motion in four quadrants with double-acting cylinders as in the case of a wave energy converter using double acting helical hydraulic rotary actuators in a wave pool application, such as shown herein, such a device (FIG. 41) could also be used in the alternative as an ocean wave energy recovery device.

The best mode of computer control of the inventive fluid power transformer in a system with fluid flow and mechanical motion in any or all four quadrants is explained with arrows showing direction of fluid flow and mechanical motion on the three faces of the aforementioned multi-dimensional cube (FIG. 46, 47). Mechanical motion for the linear and rotary actuators is shown in two views of the front face of the cube, sectionalized in four quadrants (FIG. 48, 49). In a first view showing an infinitely adjustable over-center swashblock position indicator, the angle of deflection of the swashblock position indicator from center position (about 15 degrees) is indicative of what can be considered as positive displacement in the actuator motor, deflecting to the right representing forward rotation (FIG. 48), and deflecting to the left representing negative displacement and reverse rotation (FIG. 49). The sides of the cube show the four different fluid switching states of the transformer, pressure boost and pressure reduce for motoring, and pressure boost and pressure reduce for regenerating, shown on right and left sides, respectively. Typically fluid communicates between storage(s) and actuator(s) through the transformer with flow lines configured according to a particular switching state for the transformer as shown on the sides of the cube, and through a 4-way crossover switch on the front face of the cube, switched to flow fluid to the appropriate side of the linear and/or rotary actuator. Isometric views of the rotatable multi-dimensional cube provide an overview of the hydraulic system between sending end and receiving end points of reference, between any one of the eight transformer fluid flow switch faces and any one of the four mechanical motion faces. Motoring is represented by an isometric view from the right side (FIG. 46) and regenerating by a view from the left side of the cube (FIG. 47).

The operation of the inventive fluid power transformer is compared with the single rotor transformer described in U.S. Pat. No. 7,028,470 to Achten, and recent application publication EP2246566A2 to Achten (Mar. 11, 2010). It is shown in the former, in FIG. 8 the device has 4-quadrants of mechanical motion with two positions of adjustment to pressure and displacement control in each quadrant, with the actuator controller shown in FIGS. 12 and 13. Artisans will appreciate this is a functionally analogous approximation to electronic swashblock control. FIGS. 2 to 5 in application EP2246566 by Achten show the transformer applied to a hydraulic hybrid automobile.

A visual comparison of the Achten transformer with the inventive transformer in motoring mode and regenerating mode, is shown on the multidimensional cube, in FIGS. 60 and 61. The mechanical motion shown in FIGS. 2,3,5,4 of EP2246566A2 is replicated in quadrants Q1 to Q4, respectively. The Class A embodiment is shown in pressure reducing mode in blocks at the extreme right and left of the 3-D representation. According to application EP2246566 to Achten, and FIG. 12, the Achten transformer is limited to a pressure range of 0 to 250% in motoring mode and 0 to 110% in regenerating mode. This limitation in operating range may be inherent with single overcenter actuation, and necessary to enable torque to increase smoothly from zero to 250% in acceleration. In other words, able to boost the pressure of an accumulator from say, 1000 psi to 2500 psi and apply that to the motor on the wheel. However, in regeneration mode gentle braking may not be satisfactory, particularly as the wheel motor slows, and cannot raise the necessary pressure to match or exceed the accumulator pressure, and as a result regenerative braking fails. This overcome with the Class A transformer (as well as all other inventive transformers) which function identically in motoring and regenerating modes, with no restrictions whether pressure is reduced or increased. This is explained as follows: in pressure reducing mode, all the flow from the high pressure terminal passes through the motor, and the energy therefrom drives the pump to increases flow to the outlet terminal by drawing fluid from the low pressure accumulator; In pressure increasing mode, with the a-way 2-position switch toggled to the second position, the lower device acts as a motor and drives the upper device to pump fluid from the inlet terminal to the outlet terminal. There is no restriction in the range of pressure boost. More particularly, there are no such restrictions in the inventive transformer because the swashblocks of the motor and pump are set independently: a pump can deliver to its maximum pressure rating, and a motor can take fluid from any pressure within its rating and drive the pump. On the other hand, in the Achten transformer, a single swashbiock adjusts axial piston displacement against fixed port plate, acting like a mask, dividing the flow between the motor and the pump sectors. The problem of the competing objectives of pressure and flow with single rotor transformers are overcome with all embodiments of the inventive transformer in this application. For example, a Class AF transformer could switch from pressure reduce similar to that shown in SS4, by toggling the fluid switch to pressure boost (not shown) and putting the fluid transposition switch at the terminals of the first rotary device to the second position, known herein as the transposed position. Fixed displacement transformation is not well suited to an automobile hybrid application because of the limitation of boosting or reducing to some predetermined amount depending on the choice of motor and pump combination.

Controllability and observability is problematic with prior art transformer devices, and is overcome with the inventive transformer in this application. These control concepts including impacts on sensitivity and stability are explained by Professors Andrew P. Sage, and Chelsea C. White, in Chapter 7 of "Optimum Systems Control", second edition, published Prentice and Hall in 1977. (Also included are methods for adaptive control.) In the aforementioned earlier patent 7,028, 470 to Achten, some of the difficulties of controlling fluid between the hydraulic actuators and common pressure rails (CPR) are explained, for example, "The motor could develop an inadmissible speed, or inadmissibly much power could be used from the high-pressure line." There is no mention of a solution to this problem in the latter published application of Achten. These and other problems, and problems of prior art transformers generally, are overcome with the inventive transformer in this application, where all variables of fluid transformer control are observable and controllable, the rationale of which is explained in depth with reference to defined coordinate systems as they would apply to state of art electronically controllable hydraulic motors and pumps.

The WEC application is an illustrative example of hybrid hydraulic fluid transmission systems characterized by fast acceleration and deceleration with a short cycle time—where fluid energy is driven directly to a high pressure accumulator to maximize recovery, rather than to a turbine to power a generator and charge an electric battery pack. Efficiency is paramount in continuous operations and computer systems are a generally accepted means to achieve better operation and are included to achieve the objective. The WEC application demonstrates the advantages of the inventive fluid power transformer in converting ocean wave energy of varying intensity to electric energy, and alternatively, in powering the WEC device in reverse actuation to make waves with electric energy.

The simultaneous application of one or more fluid transformers to multiple double-acting helical hydraulic rotary actuators is explained herein with reference to a second embodiment of a wave energy converter, known herein as WEC-Type-II. Applying a single device to multiple similar purposes is commonly known as multiplexing. In this instance the fluid transformer is multiplexed to operate several helical hydraulic rotary actuators in a recreational wave pool application, and alternatively, to convert ocean wave energy to electric energy.

A further object of the invention is to parallel transformers without flow interruption to facilitate gradual change to higher or lower hydraulic system loads, in a manner analogous to known practise to parallel power transformers in electric utility systems.

According to the invention is this application, there is provided a substantive improvement in efficiency over prior art, and by utilizing current art electronically operated infinitely variable motors and pumps, there is further provided smooth fluid flow in four quadrants of mechanical motion. While transformers with a single rotor, three fluid terminals, and a rotatable port plate, promise high efficiency operation in two- and four-quadrants, they are problematic in that they lack the requisite smoothness of pressure and flow regulation necessary for the smooth flow of electric power to customers on-shore, in the objective to provide flicker free electric power from ocean waves. Artisans will appreciate it is known in electric power systems for transformers have to closely spaced taps in small steps of percent of full voltage range to provide fine regulation of voltage and current. It is known for example, on supplying a constant impedance load, that moving up a 1% tap would increase voltage and current by about 1%, and vice versa. Early fluid transformers lacked the fine regulation now possible with electronic displacement control.

The inventive transformer incorporates the known features, functions, and realizes the benefits thereof, of rotary axial piston hydraulic devices, all of which can be attributed to the arcuate inlet and outlet fluid openings in the port plate being sectionalized with one rib at top dead center (TDC) and another at bottom dead center (BDC), at the exact 12 o'clock and 6 o'clock positions, respectively, with a vertical centerline joining them and a horizontal centerline though the 3 and 9 o'clock positions, both intersecting the axis of the rotor and coincident with the axis of rotation of the swashblock. (These comments apply equally to similar hydraulic devices where the axis of rotation of the swashblock is vertical rather than horizontal and TDC and BDC are along the horizontal, transposed 90 degrees.)

A combination of factors suggest TDC and BDC as the most advantageous locations for sectionalizing the port plate. It is the region of least axial piston movement, and least cylinder torque, the effective torque arm length being the product of the radius of the piston cylinder circle on the rotor and the sine of the angle of the piston off dead center. Also there the piston's axial movement slows to zero and reverses as the piston chamber crosses the vertical centerline, experiencing only a sudden pressure change from inlet to outlet pressure or vice versa, as pistons cross one at a time. The vertical axis and the horizontal axis are coincident with the plane of the swashblock surface at zero deflection. Pistons, as they cross the centerline, move horizontally parallel to the axis of the swashblock independent of swashblock slope. The intersection of the vertical and horizontal axes is a natural point of origin for a co-ordinate system where the x-axis is coincident with the axis of the swashblock: a first defined coordinate system ("DCS1") where the z-axis is coincident with the axis of the rotor of the cylinder assembly; and a second, ("DCS2") with the z-axis normal to the surface of the swashblock. The angle between DCS1 and DCS2 is the swashblock angle, which controls displacement at TDC and BDC. The swashblock angle is electronically controllable in a range from about +20 to 0 to −20 degrees, in percentage terms, +100% to 0 to −100%, in dimensionless units, +1 to 0 to −1, respectively. Manufacturers' publish their swashblock response times which aids in computer control where it is preferable that all variables are controllable and observable. The aforementioned DCSs were used by this inventor for creation of animation drawings of the rotatable port plate feature (not shown) to sharpen focus on the pressure fluctuation problems of such prior art.

Sectionalizing at a distance off the vertical centerline (where x>0) has a number of disadvantages. Pistons moving over the horizontal centerline at (x,y)=(1,0) experience maximum incremental changes in displacement, directly proportional to swashblock slope. The torque arm is equal to x so torque contribution is greatest at (x,y)=(1,0). A rib placed anywhere off the vertical centerline results in each cylinder experiencing a sudden pressure change when crossing over the valving land as volume of the piston chamber changes with swashblock slope with the fluid trapped inside, analogous to passengers hitting a speed bump on an otherwise smooth roadway—the greater the swashblock slope, the steeper the roadway grade, the stronger the speed bump effect, all of which is compounded by the continuing trend in hydraulic motors to ever higher pressure and higher rotational speed. To ameliorate the impact of the sharp pressure changes on pistons crossing the rib, Achten taught the use of a shuttle, quote: "The prevention of pressure peaks is realised by absorbing a small volume of oil during the passage of a valving land. The shuttle-solution fulfils these requirements. The shuttles are small ball shaped 'pistons' that are free to move over a limited stroke between two end positions". U.S. Pat. No. 7,328,647B2 to Achten discloses a motor/pump device with twin sets of 12 cylinders offset midway from each other thereby giving a pressure smoothing effect of 24 cylinders. Such an alternative appears costly and complex compared to the economy and smoothness of operation of the transformer in this application. Returning now to earlier prior art.

In the first embodiment of the three terminal transformer disclosed by U.S. Pat. No. 6,116,138 to Achten, three ribs are spaced 120 degrees apart with the result that two cylinders are simultaneously impacted by sudden pressure dips or spikes, which increases to three cylinders at a time when the port plate is rotated off TDC position. This is in contrast with manufacturers generally who employ a fixed port plate with only two sections, sectionalized at TDC and BDC, and enjoy smooth operation free of disturbances even as the swashblock is tilted over the entire range from plus 100% through zero to minus 100%, and achieve up to two horsepower per pound, rotational speeds up to 4,000 rpm or more, pressures to 5,000 psi or more, in power ranges up to about 1,000 hp. These commonly available, infinitely variable-displacement, preferably electronically controllable, axial piston motors and pumps are configured in an innovative way in this application for a substantive improvement in efficiency over prior art power transformers.

Fluid transformers evolved as disclosed by patents listed above to Kouns, Kordak, Otremba, Schmidt, and Schaich. In Schaich, both motor and pump were fully variable. All of these devices, configured much like the traditional fluid transformers, the more recent of which when equipped with electronic swashblock controls, described herein as Class C transformers, appear to have the requisite smoothness of regulation for an electric generation application. However, all of the above prior art have efficiency shortcomings, which are overcome with the new Class A and B transformer configurations described in this application and in the WEC application on which this transformer application claims priority. Furthermore, known traditional transformers rely on pairs of mutually interchangeable regenerative hydraulic motors for a dual role of motor/pump, whereas the Class B transformer in this application incorporates an innovative four-pole-double-throw fluid-transformation-switch to facilitate a mutually exclusive arrangement where the pump is automatically switched to a position coincident with the position of a regenerative motor in the Class A transformer.

U.S. Pat. Nos. 6,116,138 and 7,028,470 to Achten describe a transformer operating in two-quadrant and four-quadrant linear applications, respectively, the latter including a complex rotatable port plate, which is problematic in that output pressure and fluid flow are not smooth and precisely controllable, and therefore a transformer on that basis is not suitable for a continuously recurring application like a WEC supplying electric power to shore where voltage fluctuations could be annoying.

This inventor (Stromotich) filed a transformer in his WEC application slightly prior to Fales who included the Achten fluid power transformer in his U.S. Pat. No. 6,854,268. Fales, who filed on 6 Dec. 2002 and first published on 10 Jun. 2004, discloses the application of a fluid power transformer and accumulator to mobile equipment such as a large excavator to recover energy from lowering that would otherwise be converted to heat if dumped to a reservoir rather than transferred to an accumulator and stored for assisting subsequent heavy lifting strokes. Stromotich filed Canadian Patent Application No. 2,408,855 on 30 Oct. 2002, which was published on 30 Apr. 2004, and abandoned it in June 2008, after filing the present application on 18 Jun. 2008, which included much further work and a new approach to fluid switching, inter alia, resulting in a single switch to control between pressure boost and pressure reduce, which together with full displacement electronic control, provides 4-quadrant motion control independent of changes in pressure of fluid storage.

The inventive transformer in this application operates independent of, yet in harmony with, the actuated hydraulic device whether it be a linear or rotary motor device, in motoring or regenerative mode, and that almost all, if not all, the features and functions of state-of-art rotatably operable devices are observable and controllable within and at the boundaries of the transformer, and therefore the functioning of the entire system is predictable in a given circumstance.

The best mode configuration therefore lends itself to optimal state estimation and followed by optimal computer control. Consider for example, the state of the fluid energy conversion system of a WEC in power-stroke, as shown in quadrant Q3 on the aforementioned front face of the multi-dimensional cube representation, under conditions with a hypothetically high resultant hydraulic fluid pressure due to a very high wave serge force on the piston, with resultant fluid pressure higher than the high pressure accumulator, with the need to reduce pressure along the fluid flow line through the transformer as illustrated by the lower rear module of the left side view of the cube, marked as switching state SS4 and Q3. Artisans will appreciate one can compute the amount of fluid that must pass through the motor to the common high pressure rail, the energy of which would drive a pump (or motor in regenerative mode) to transfer fluid from the lower pressure rail to the high pressure rail, and, via the computer, settle on the appropriate settings in milliseconds immediately prior to initiating the power-stroke.

It may be similarly desirable on the return-stroke of the WEC in quadrant Q1, as shown in FIG. 8, to reset the piston quickly to the top of the stroke to evacuate the chamber in readiness for the power-stroke, together with the hypothetical need to increase pressure along the fluid flow line through the transformer as illustrated by the upper front module of the right side view of the multi-dimensional cube, marked as switching state SS1 and Q1. It is readily apparent that it is possible to compute the fluid flow and fluid force necessary to accelerate the mass of the piston with seawater in the chamber and complete the return-stroke in a specific time, by using manufacturers' published specifications on displacements and swashblock response times.

U.S. Pat. No. 6,854,268 to Fales' discloses a hydraulic power transformer with a rotatable port plate that adjusts over center to provide a four-quadrant operation. Fluctuations in pressure and flow due to large steps in cylinder adjustment are inherent in both these prior art two-quadrant and four-quadrant applications. It is known single rotor transformers require pressure and flow modulation and to this point are not infinitely variable devices. In U.S. Pat. No. 6,374,602 Prabhu discloses a bypass valve in-series with the Achten transformer to modulate flow into the transformer and out to a hydraulic motor actuator.

In the third embodiment of the rotatable port plate as shown in U.S. Pat. No. 7,028,470 to Achten, some of the problems prior art rotatable port plates is overcome with an actuator adjustment to pressure and control with the device discussed.

In this application, pressure and flow deliverability problems are overcome with all the transformers embodiments herein, using current art rotatably operable devices in a novel way for high efficiency operation. The fixed displacement transformers are selectable for a specific transformation over the whole range of pressure boost and pressure reduce, independent of direction of flow.

According to the invention there is provided a further efficiency improvement by a dual fluid flow arrangement with additional piping and switching for communicating fluid for free floating the deadweight of the WEC piston. The free float is realized by a sectionalizing the cylinders below the piston into two groups, a first known herein as Group A, to flow fluid directly to a low pressure accumulator, as shown herein in FIGS. 36 and 37, and thereby reducing fluid flow through the transformer from the second group, known herein as Group B, and thereby in effect realize a free float of the WEC piston independent of the amount of seawater in the piston chamber. Group A functions analogous to a flywheel with an adjustable mass, controllable by varying the volume and gas pressure of the Group A accumulator, also analogous to a gas shock in a motor vehicle, to return the piston to the top position with no rotary device losses, transferring energy more efficiently than by converting fluid flow and pressure through the fluid transformer in the Group B circuit.

According to the invention there is provided a further efficiency improvement by sectionalizing the cylinders below the WEC piston into three groups, with the third group, known herein as Group C, transferring fluid directly to the high pressure accumulator as shown herein in FIG. 38, with Groups A and B continuing to flow fluid as described.

The best mode of operation includes a method of control which includes an adaptive control algorithm which includes a state estimator together with optimal control and is known classically as suboptimal adaptive control (ref. Andrew P. Sage above).

While prior art shows it is possible to recover some regenerative energy without a fluid transformer, artisans will appreciate the advantages of a smooth functioning transformer that is able to boost or reduce pressure while communicating between a common pressure rail and the hydraulic actuator. U.S. Pat. No. 7,124,576 to Cherney discloses the use of an accumulator to even out the cyclic load on a variable displacement hydraulic pump in an earthmover application, by forcing fluid to the accumulator by higher pressure pumping in the low energy retraction phase, and switching the accumulator to the inlet of the pump during the high energy extension phase and thereby reducing the load on the pump. This method by Cherney is analogous to adding inertia to a flywheel like for example in an electrically driven pulp-to-log pressing machine, where storing energy in the flywheel in the low energy phase helps keep the induction motor from becoming badly overloaded in the final step of the press to a log phase.

Artisans will appreciate the inventive fluid power transformer facilitates the application of an extra lift on a heavy load in a controllable and predictable way, by boosting the pressure over that of the accumulator to in-effect break-away a stubborn load, like for example to accelerate the piston of the WEC on the upward stroke and exhaust the chamber in readiness for the power-stroke. This is in contrast with the disclosure by Achten, where, "The motor could develop an inadmissible speed, or inadmissibly much power could be used from the high-pressure line." The inventive fluid power transformer is essentially a pressure matching device between the accumulator or Common Pressure Rail and the actuator(s) that can more efficiently communicate fluid of higher or lower pressure from sending end to receiving end of the line of transmission and thereby store more regenerative energy than otherwise possible and convert it to another use. The transformer can also efficiently combine hybrid-hydraulic with hybrid-electric and store energy in media such as ultracapacitors as they come into practise. The objective of the fluid power transformer in the WEC application is to capture regenerative energy from a wide range of ocean waves, from small to large including strong waves of varying speed, and convert that energy to flicker-free electric power. That completes the analysis of prior art fluid power transformation. Going now to the application of the inventive fluid power transformer to the ocean wave energy converter, WEC. The WEC Figures are interjected with the Figures of a similar application using double-acting helical hydraulic cylinders.

Artisans will appreciate the best mode of switching arrangement for a Class C fluid transformer is as shown in FIGS. 14 to 15 for single-acting cylinders and FIGS. 32 to 35 for double-acting cylinders applied to the WEC, and generally as shown in FIGS. 54 to 57.

The Class A and Class B fluid transformer switching arrangement shown generally in FIGS. 46 to 53 for single-acting and double-acting cylinders also applies to the WEC shown in FIGS. 6 to 15 for single-acting cylinders and FIGS. 16 to 31 for double-acting cylinders.

The inventive transformer can be studied as a stand alone device by comparing the multi-dimensional cubes of FIGS. 46 to 57. The inventive transformer is described immediately below in the context of the WEC system and priority thereof.

In one aspect of the WEC invention, a sensor system detects characteristics of incoming waves, such as by detecting changes in pressure as an incoming wave passes over an array of sensors. The sensors can be mounted on the ocean floor seaward from the WECs. A computer system calculates characteristics of the incoming waves, such as wave height and speed from data read from the sensors. Such information is used to control aspects of the WECs and other components of the energy conversion system. For example, preferably the sensor system and computer calculation are used for discrete switching of hydraulic fluid flow and operation of hydraulic components associated with each WEC, the object being to efficiently convert potential and kinetic energy of selected ocean waves and to transmit power to consumers on shore.

It is apparent that the inventive transformer operates independent of ancillary functions. Another aspect of the WEC invention, includes an upper deflector, under computer control, positioned to capture energy of an incoming wave and direct it downward toward the vertically reciprocating piston during the downward power stroke. The deflector is retractable, under computer control, at an appropriate time, such as coincidental with a wave trough, when the piston is moved back up. In another application, the fluid power transformer is applied to a novel ocean wave making machine. As an aid to understanding the inventive transformer with the best method of actuator control, a further set of drawings and description is provided for the multi-dimensional cube representation. The fluid flow figures of the WEC application are repeated with marking to show the switching states of the transformer and the quadrants of motion that compare to the multi-dimensional cube.

BRIEF DESCRIPTION OF THE DRAWINGS

The foregoing aspects and many of the attendant advantages of this fluid transformer invention will become more readily appreciated as the same become better understood by reference to the description which follows when taken in conjunction with the accompanying drawings, wherein.

Figure 1:
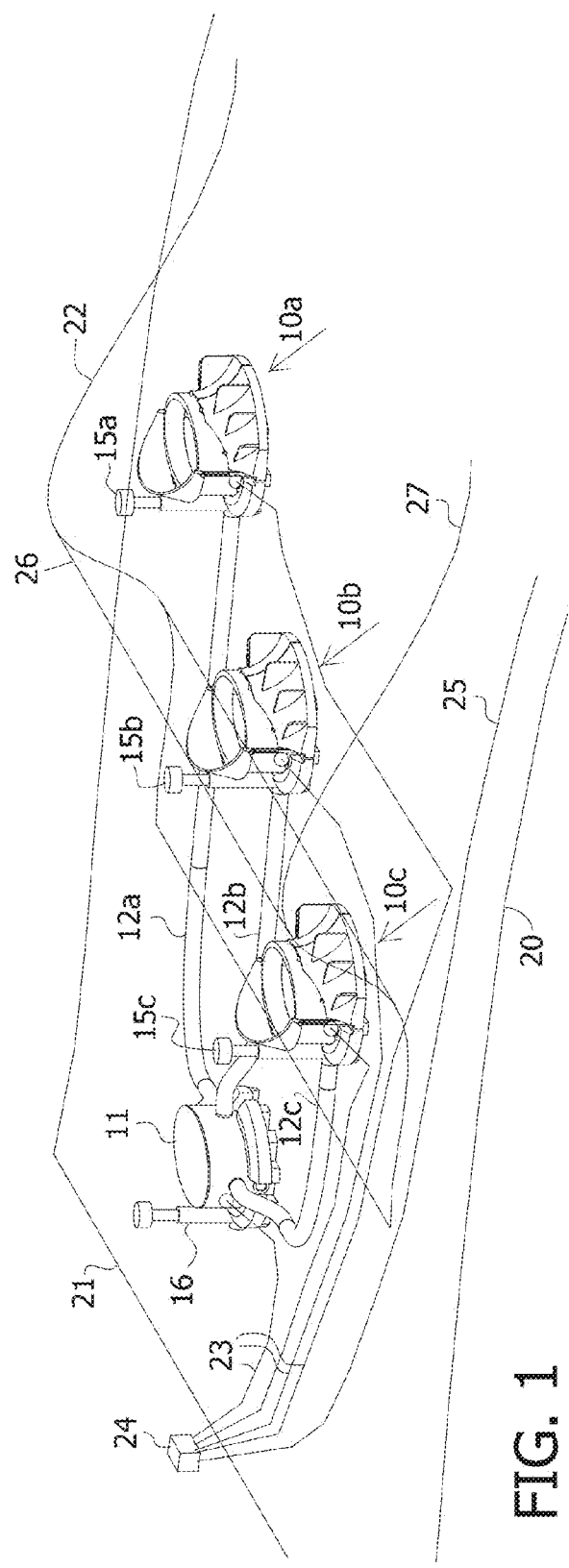
FIG. 1 is a perspective view of components of a wave energy conversion system in accordance with the present invention showing three wave energy converters (WECs) on the ocean floor near shore, connected by cables laid on the sea bed to a utility on shore, with parts shown diagrammatically.
Figure 6:
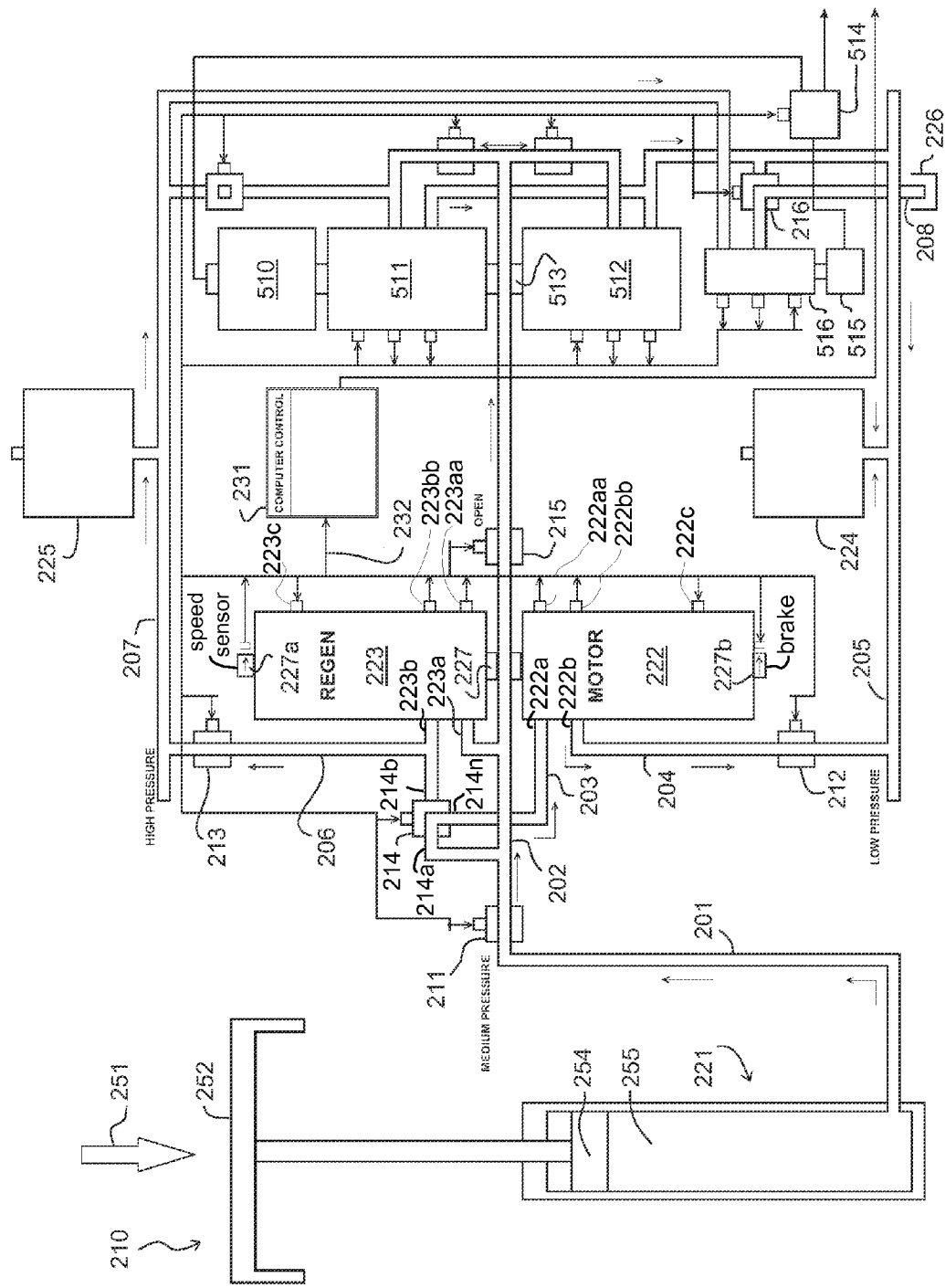
Figure 7:
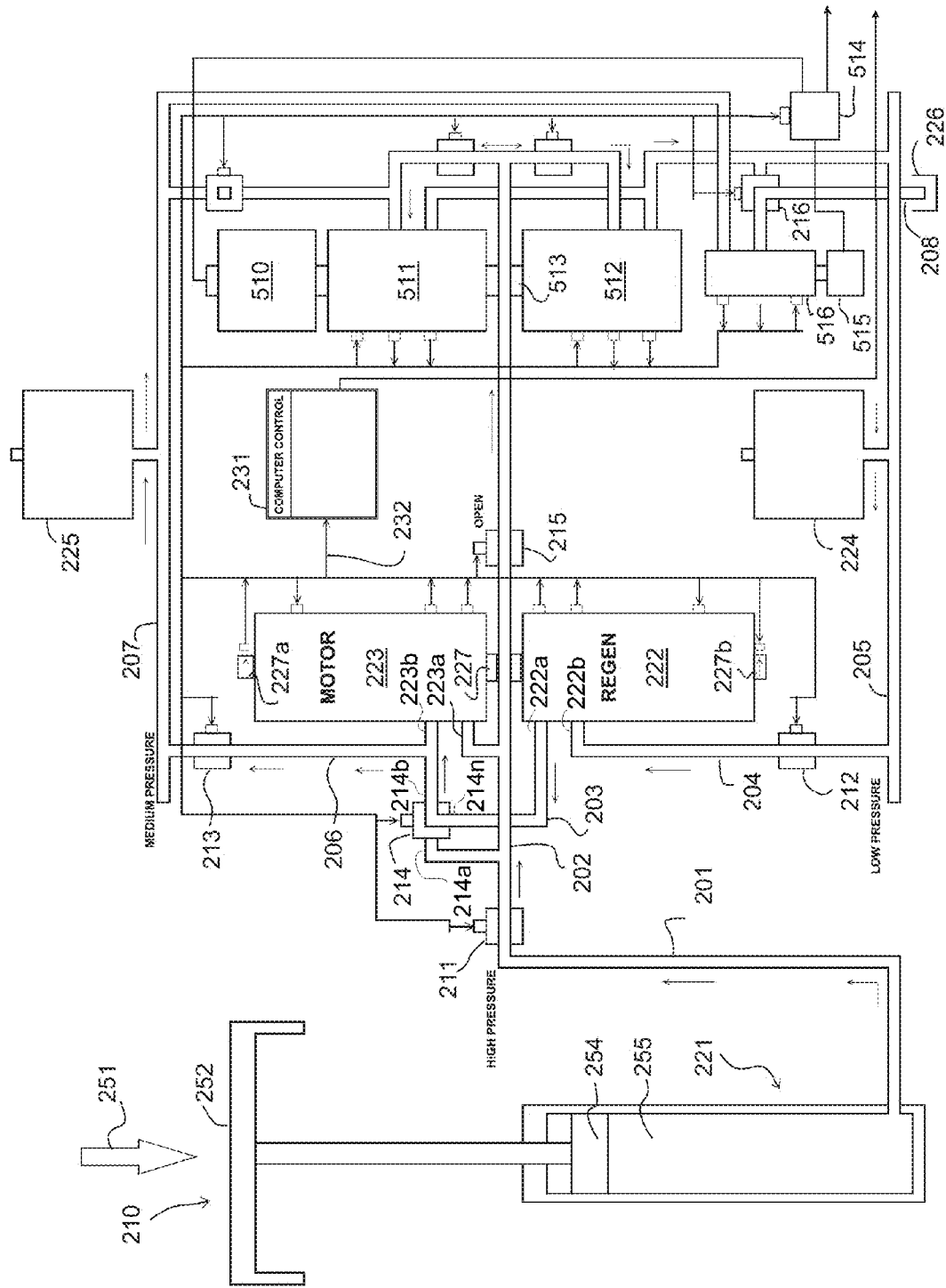
Figure 8:
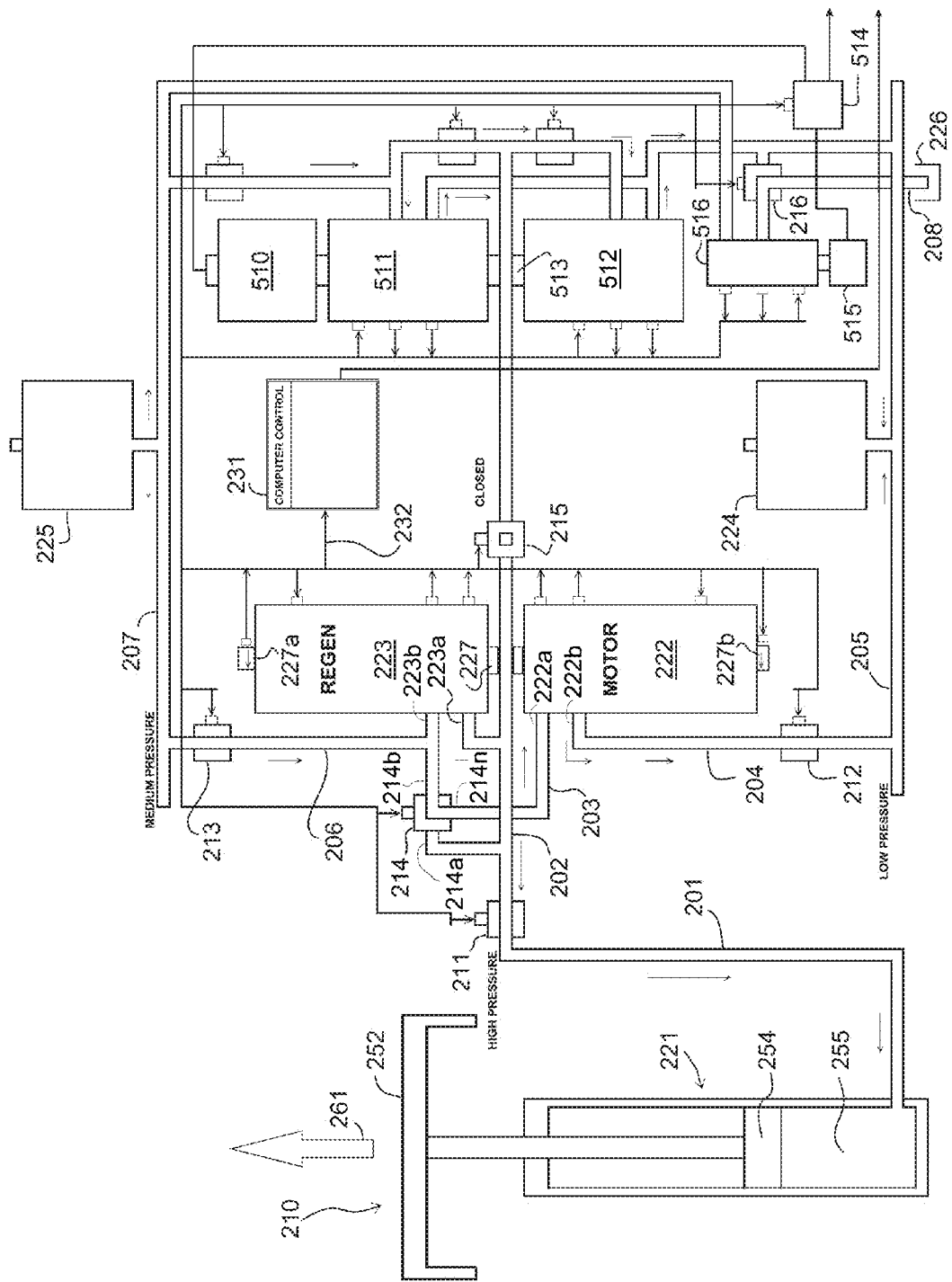
Figure 9:
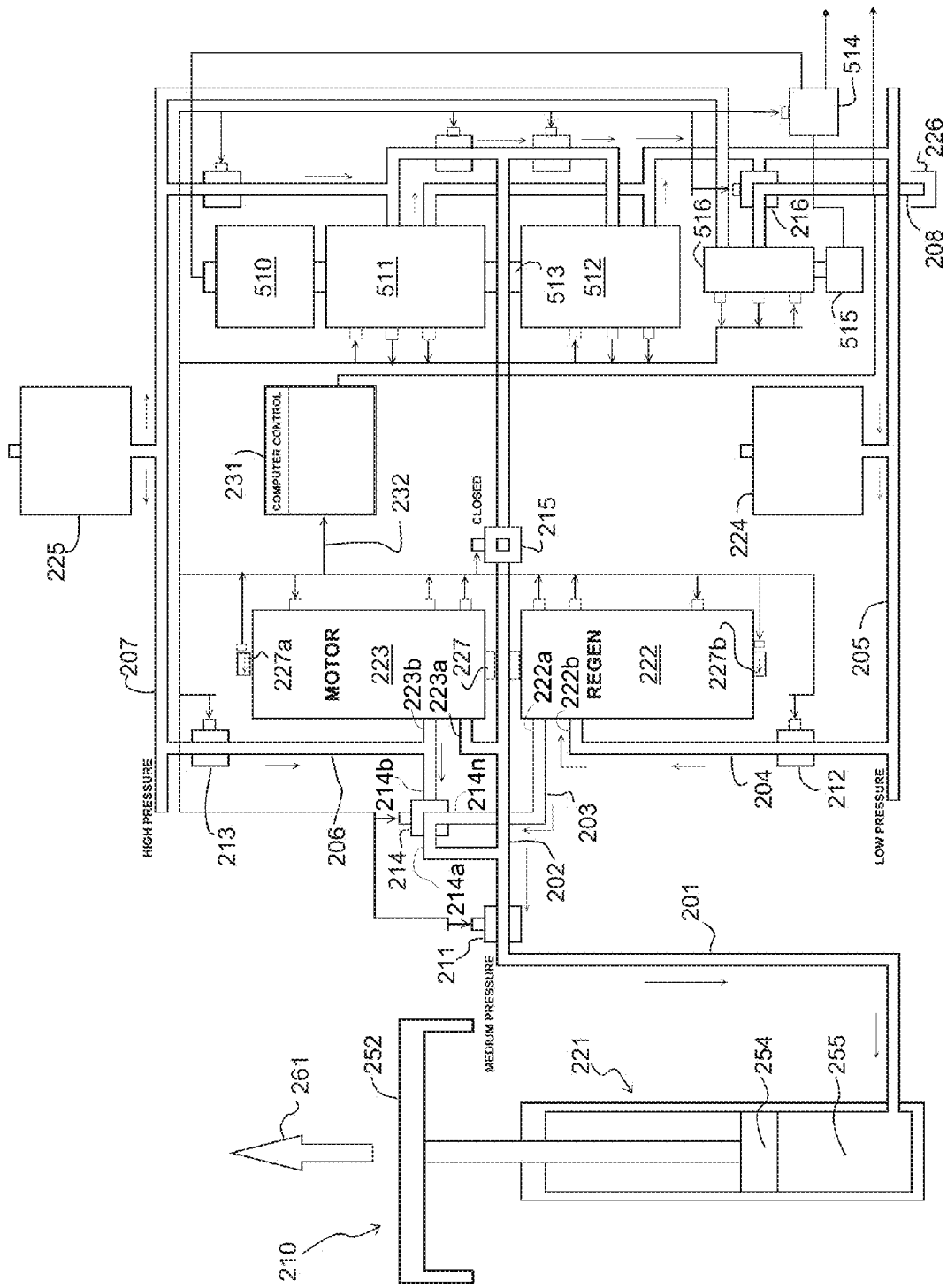
Figure 10:
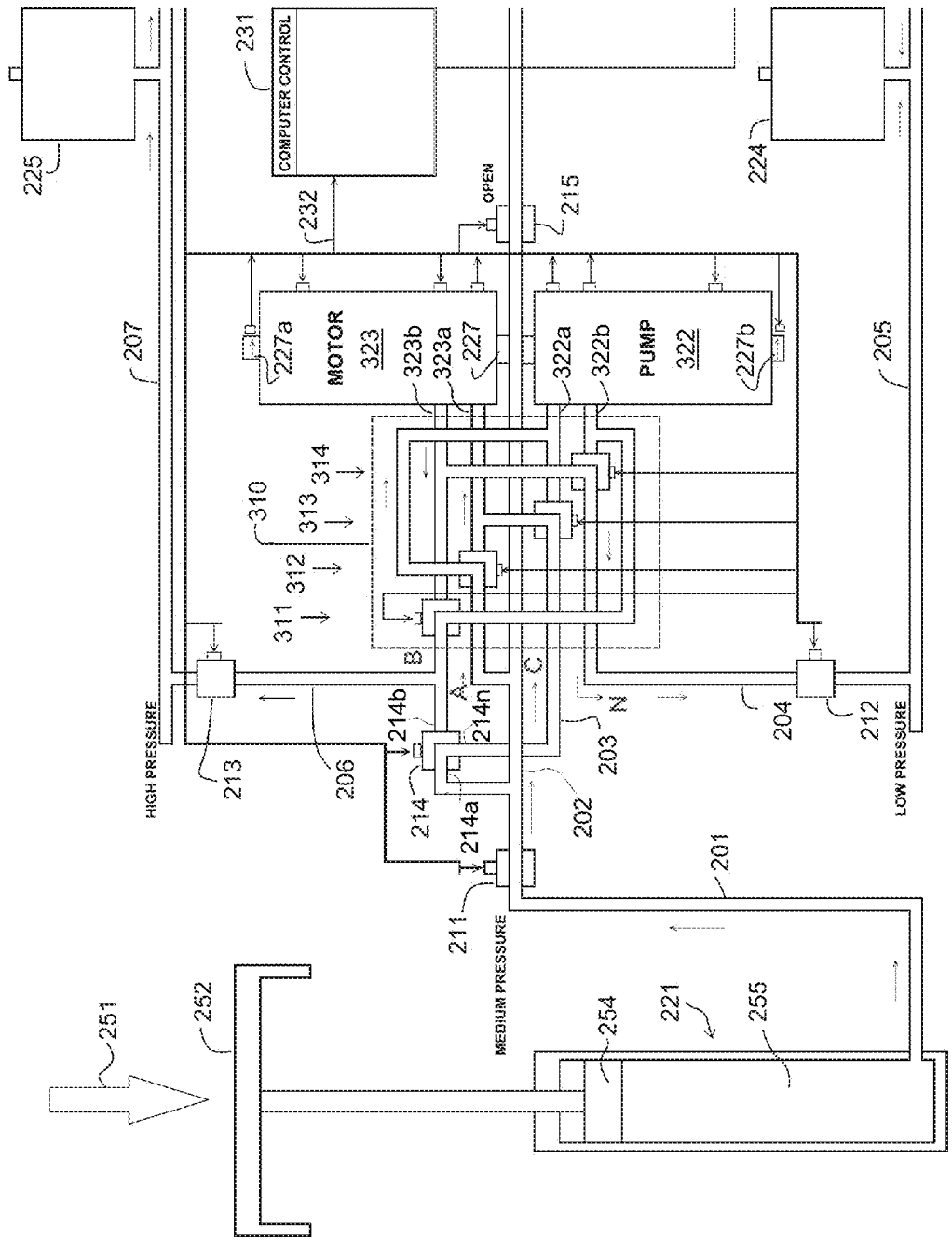
Figure 11:
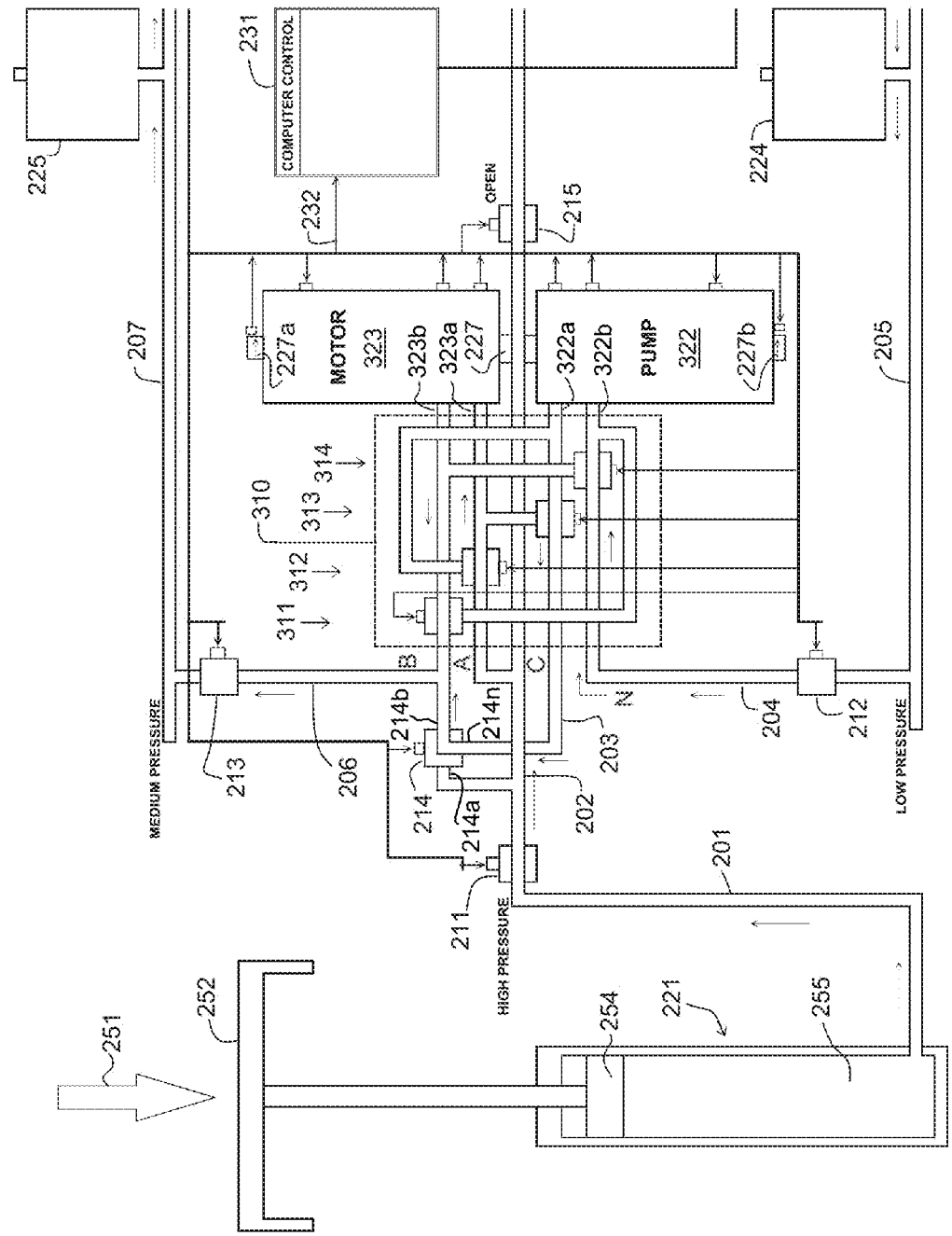
Figure 12:
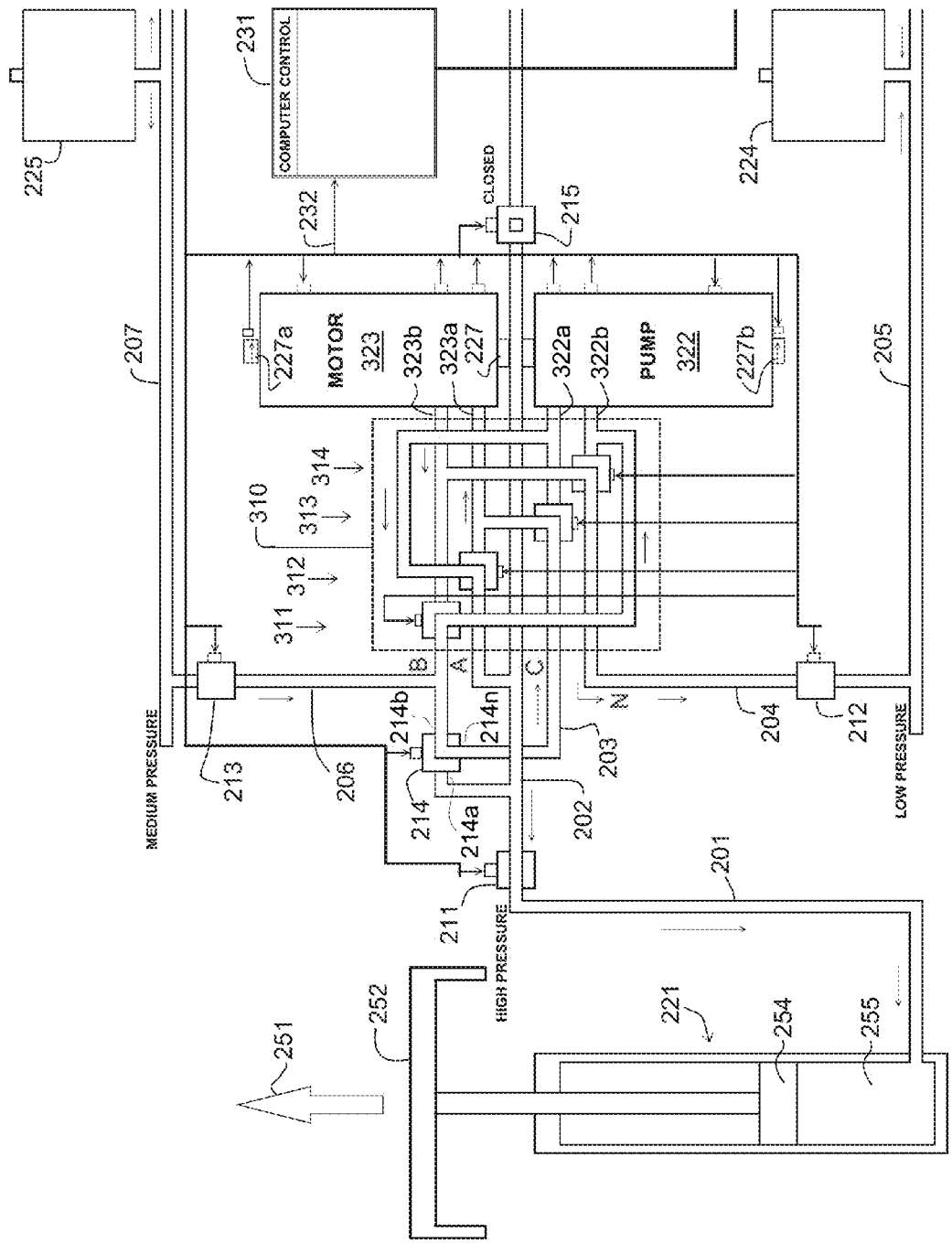
Figure 13:
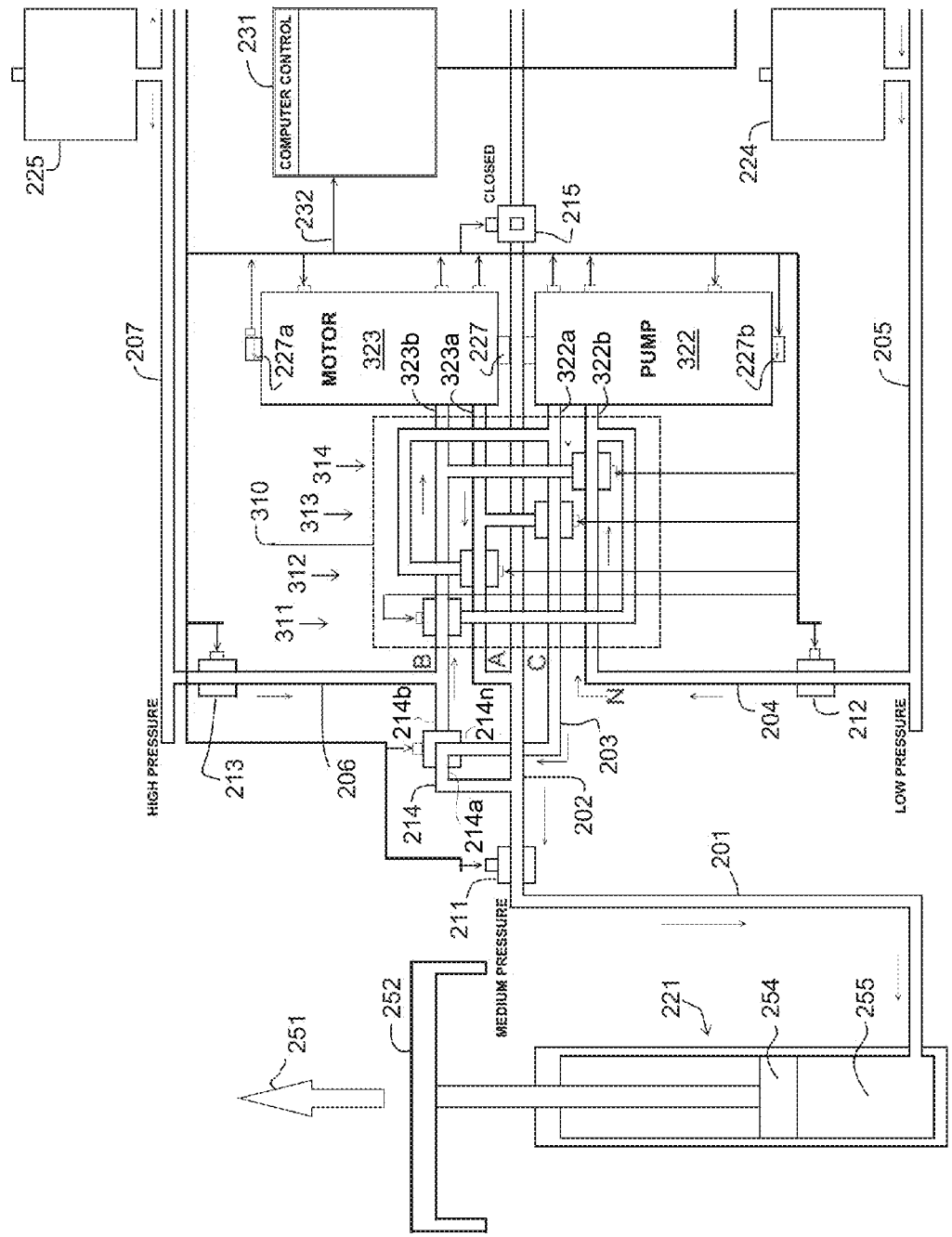
Figure 14:
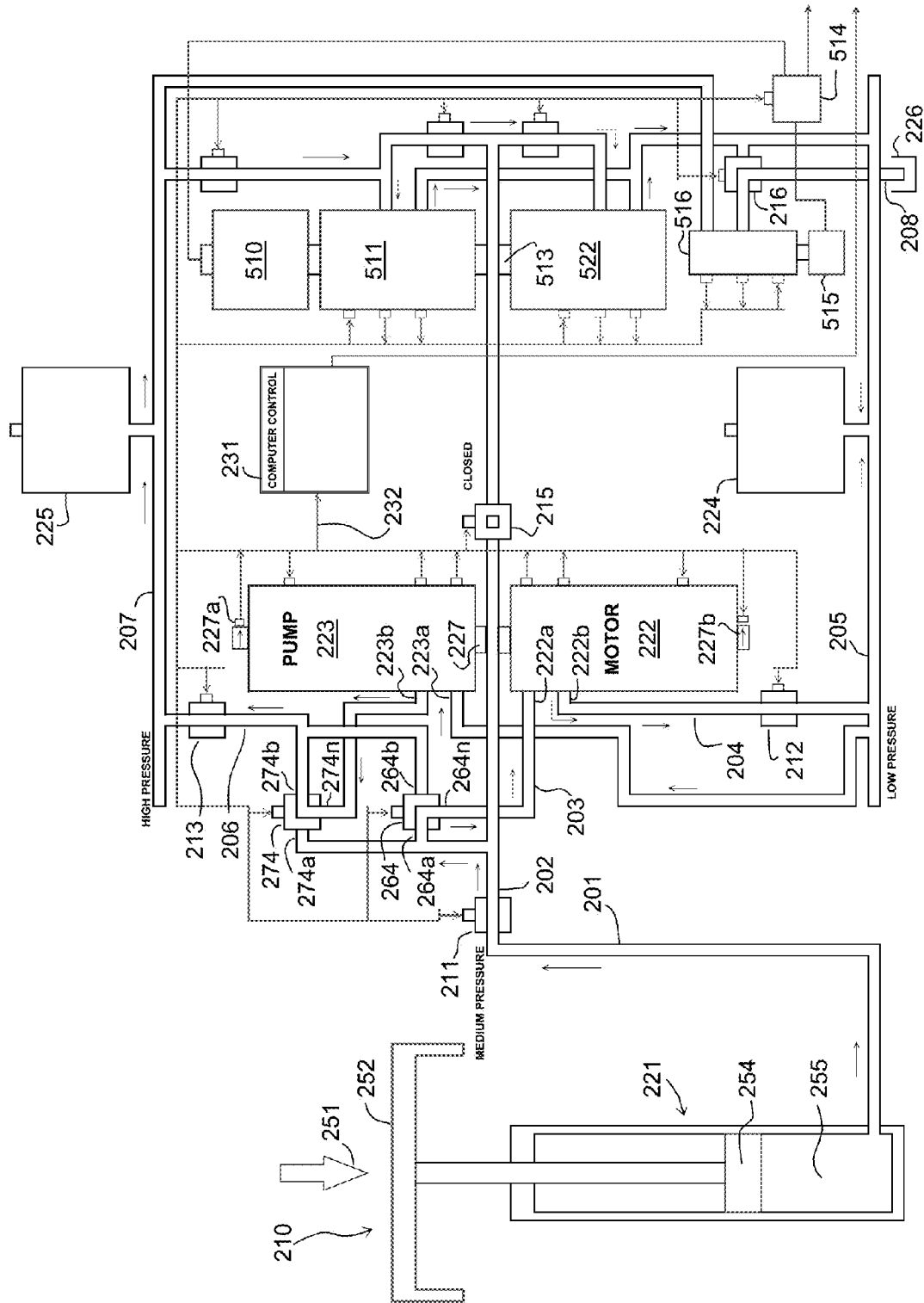
Figure 15:
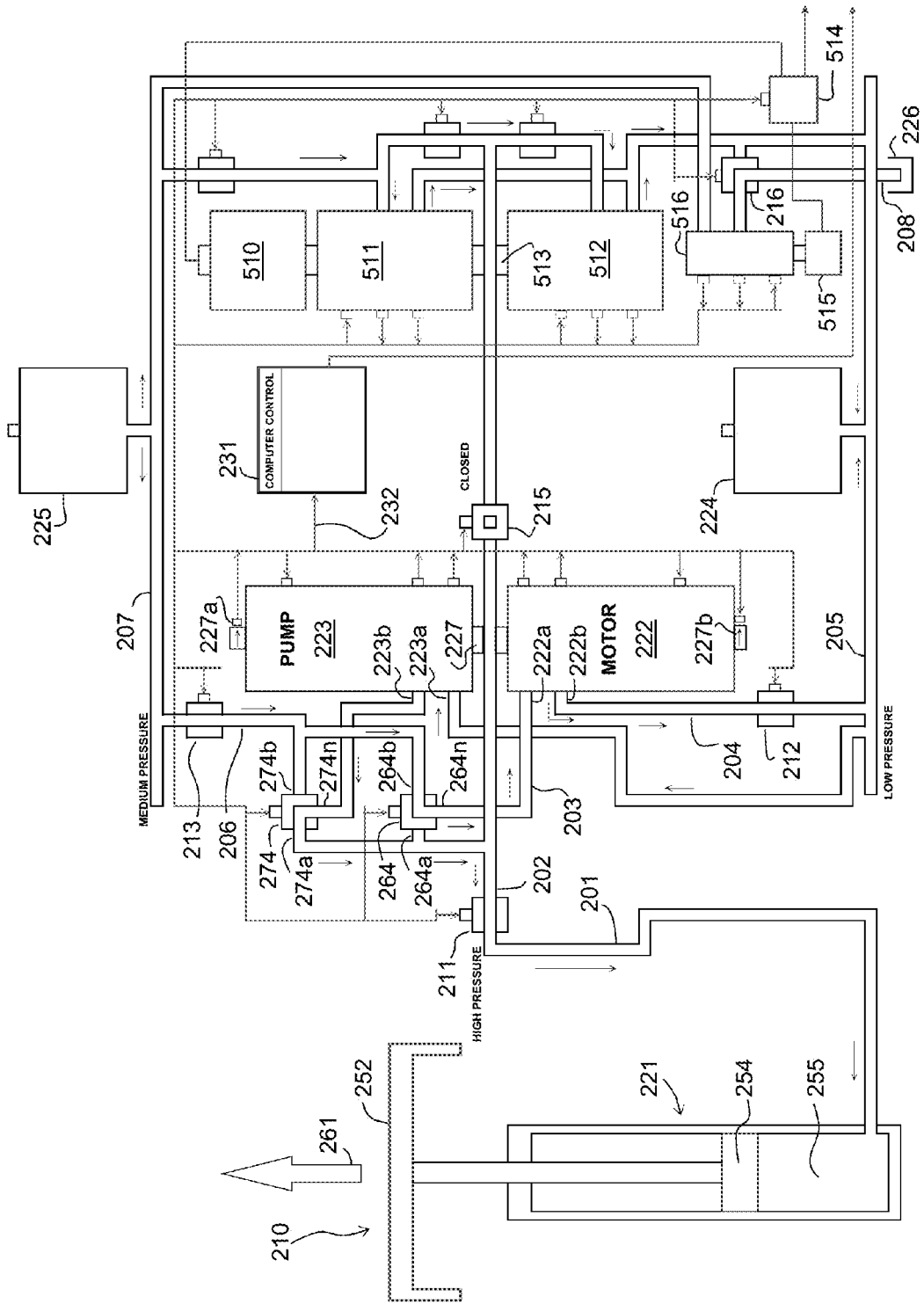
Figure 16:
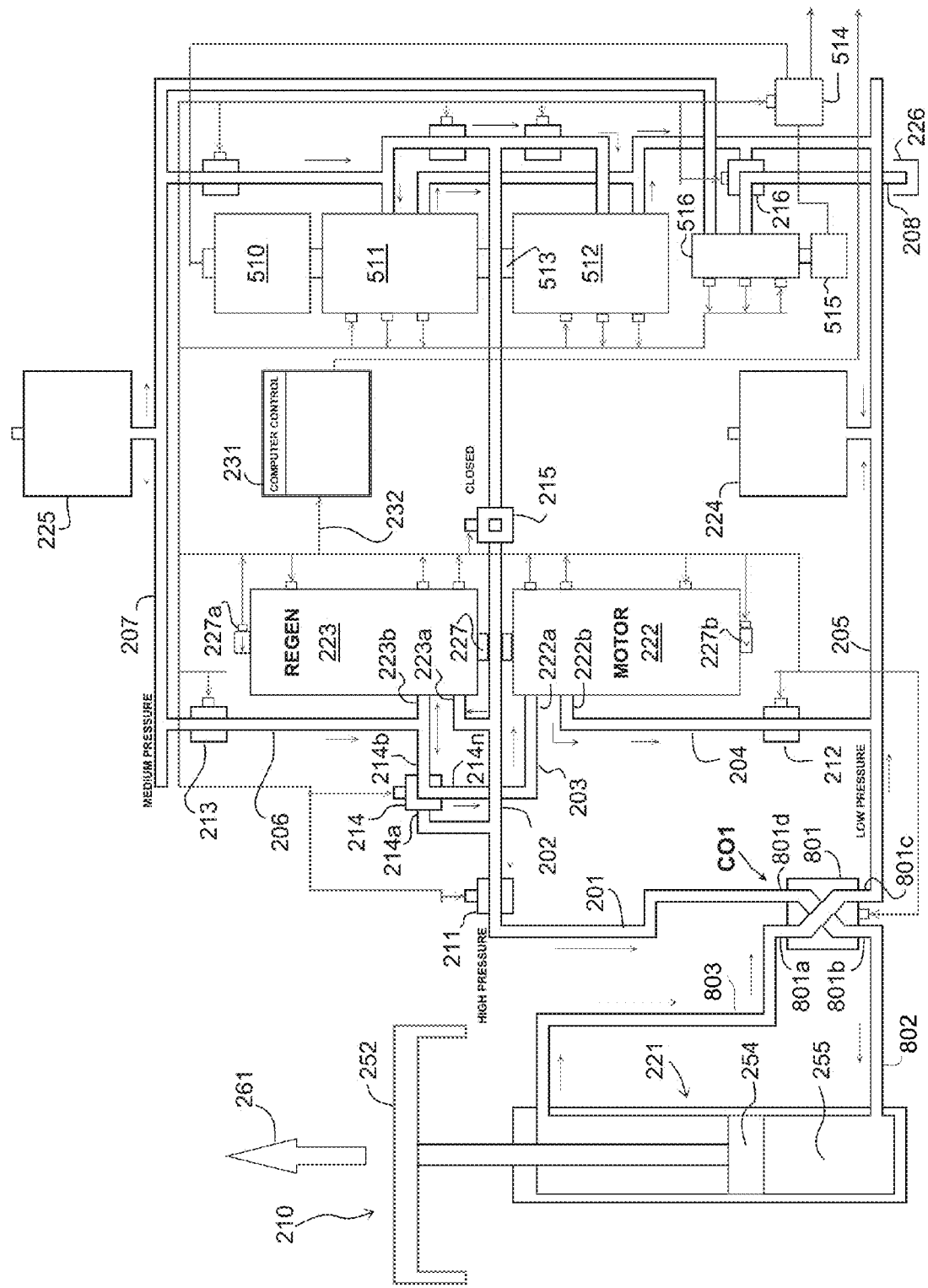
Figure 17:
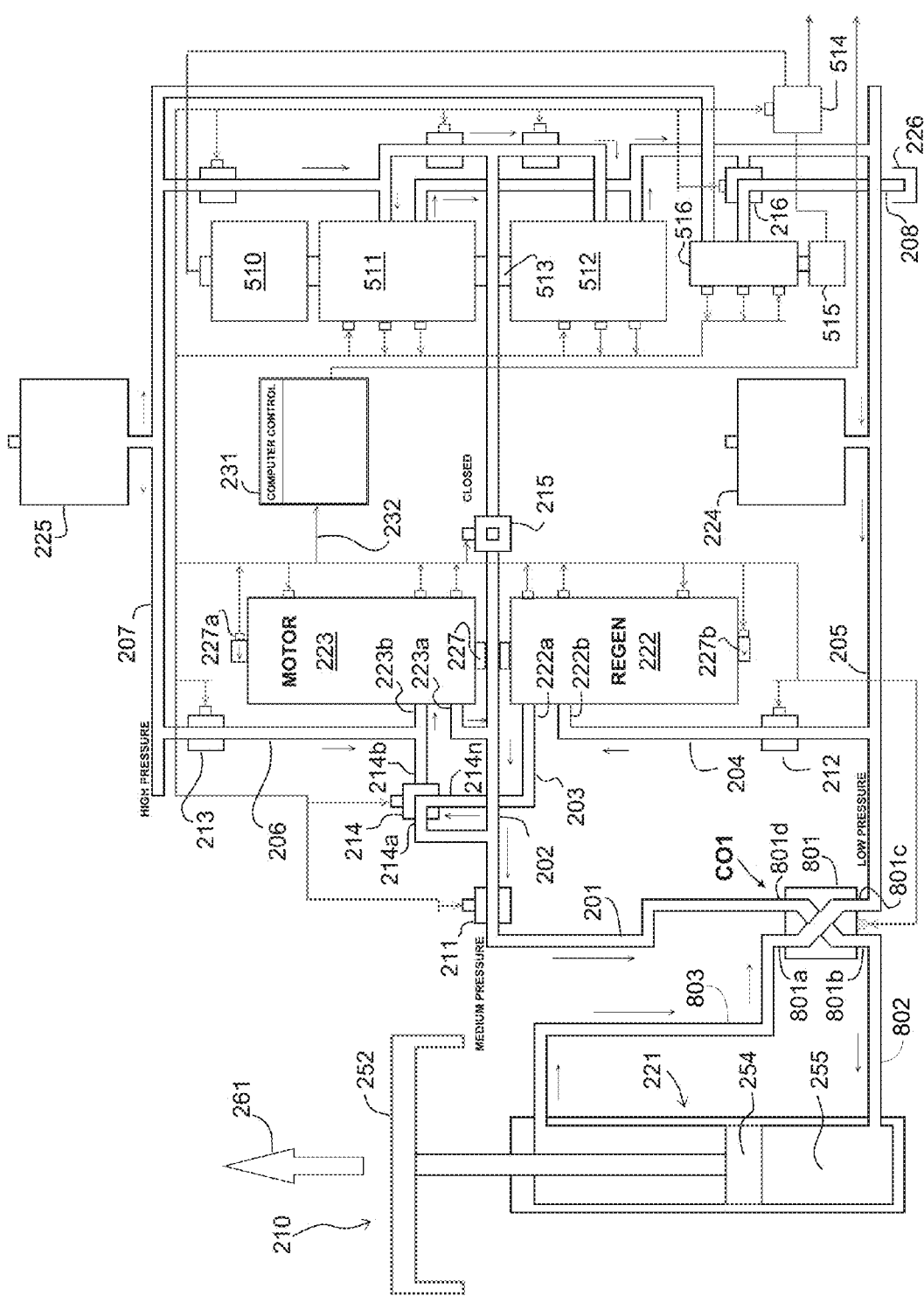
Figure 18:
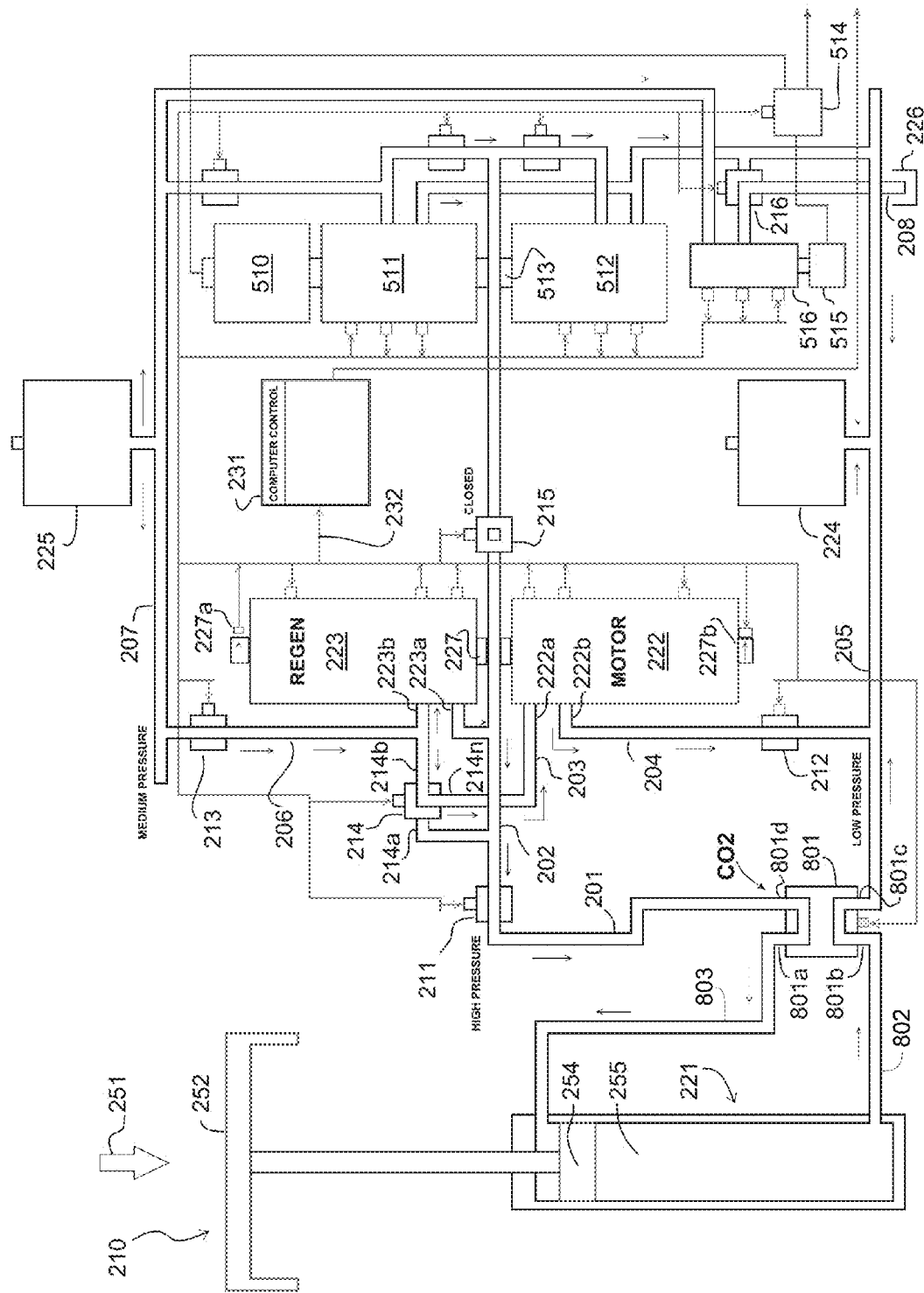
Figure 19:
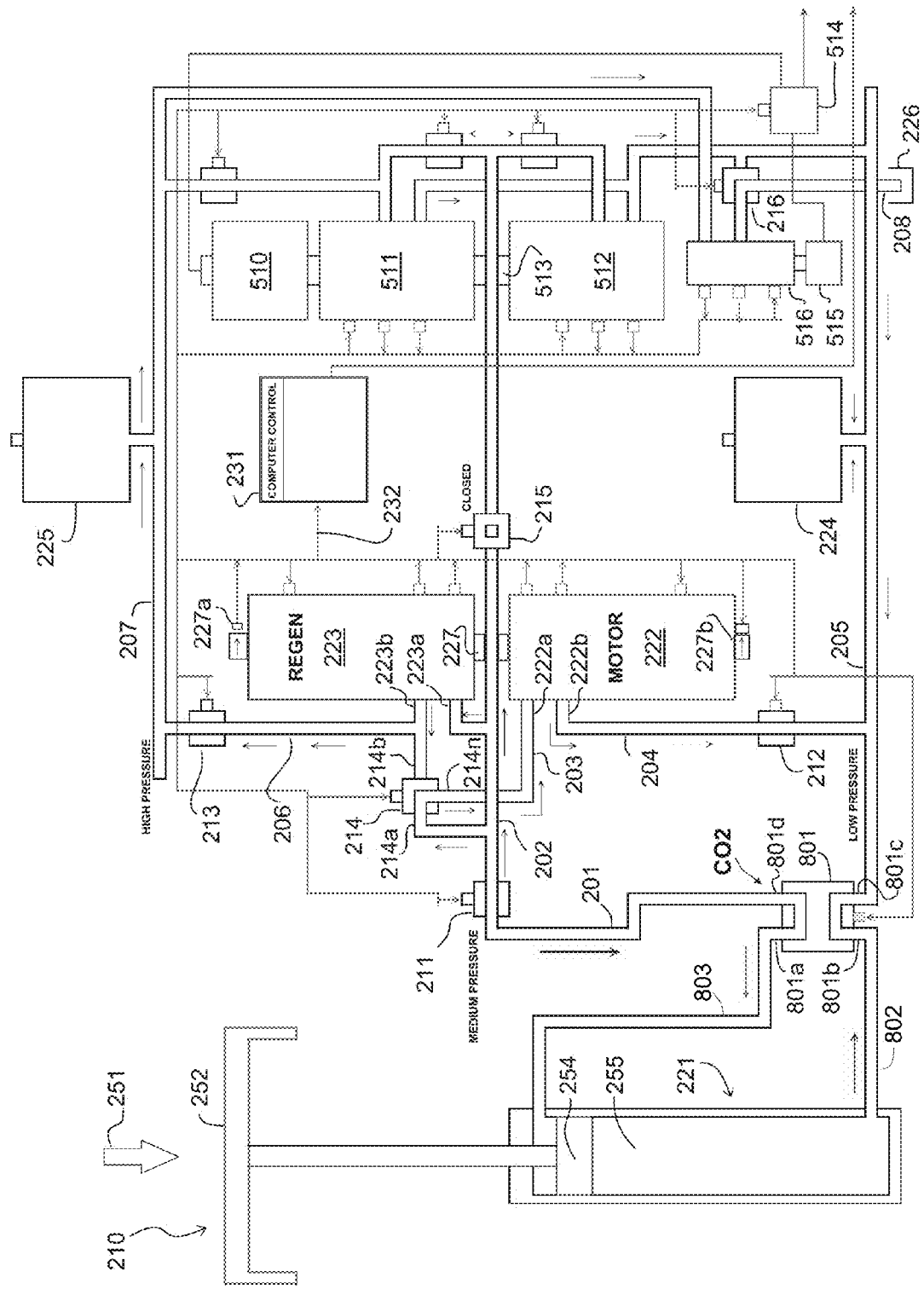
Figure 20:
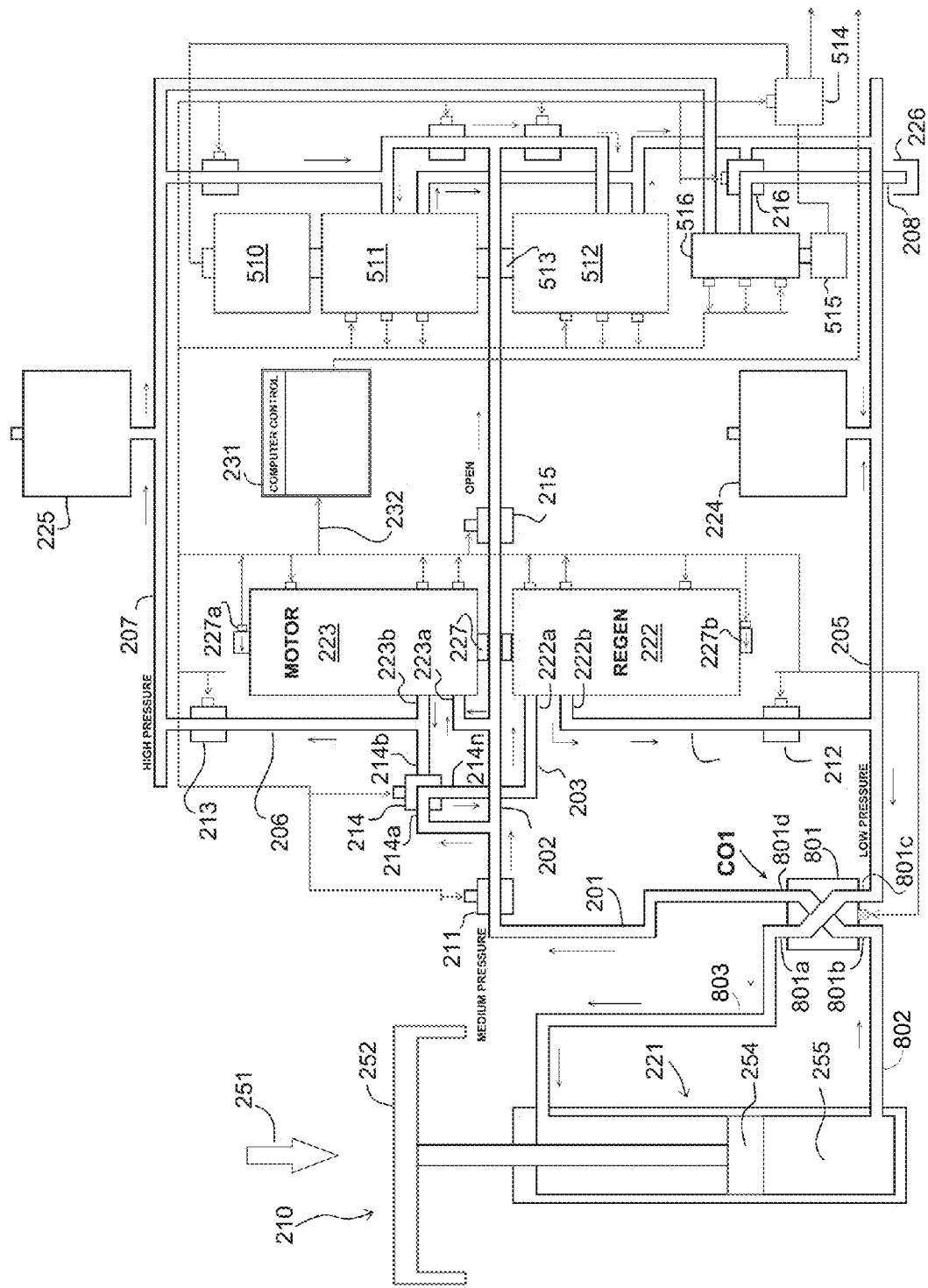
Figure 21:
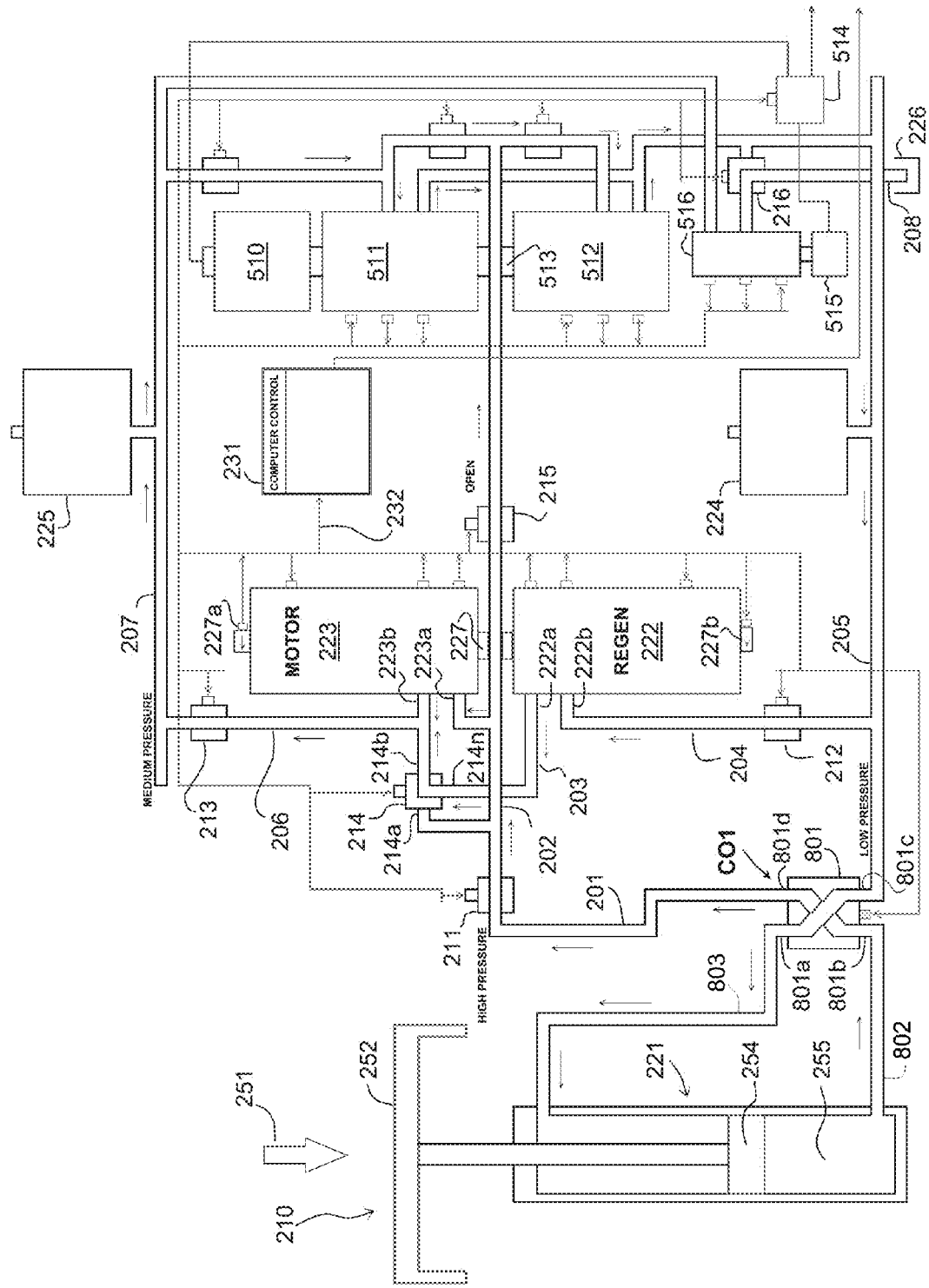
Figure 22:
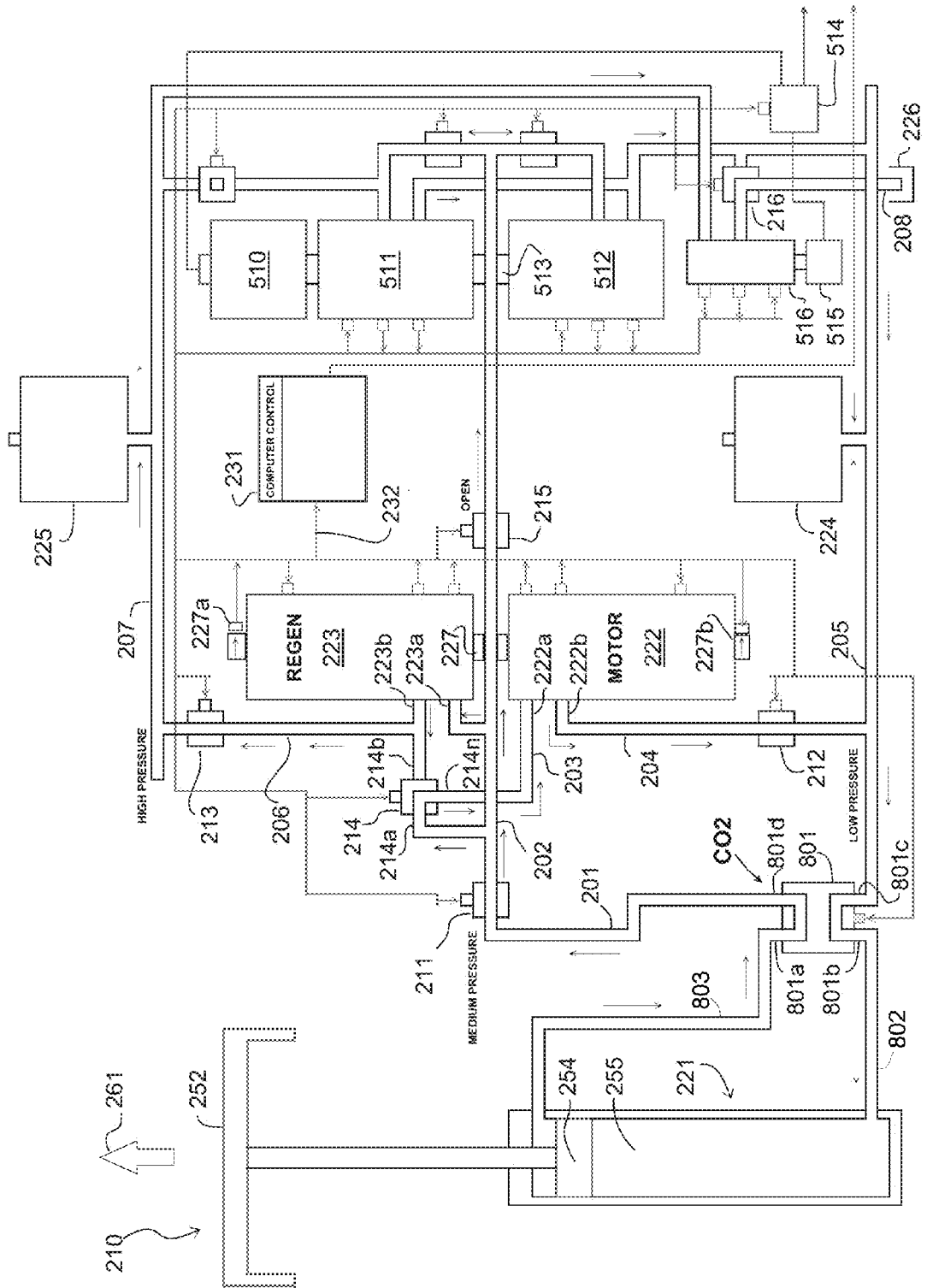
Figure 23:
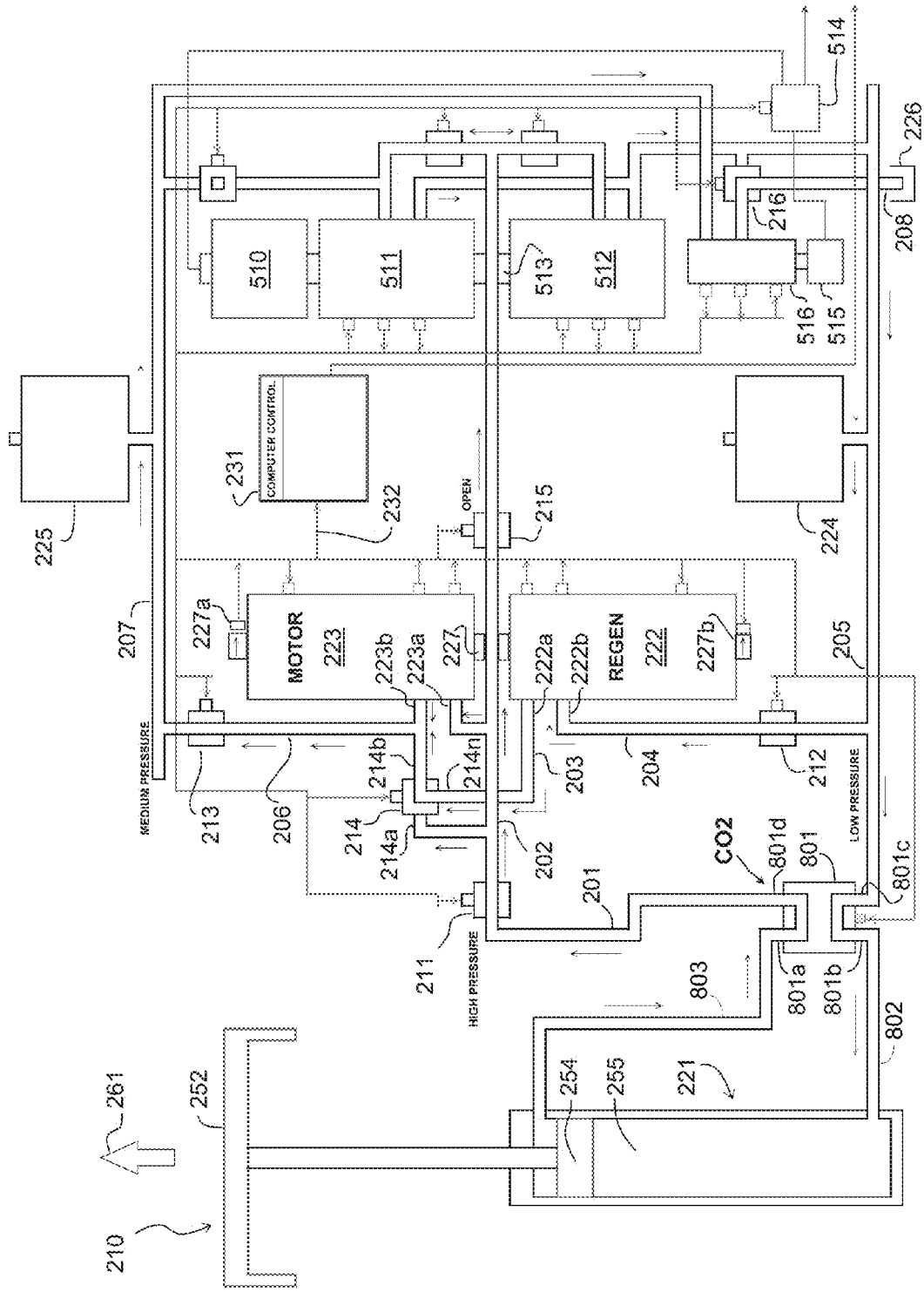
Figure 24:
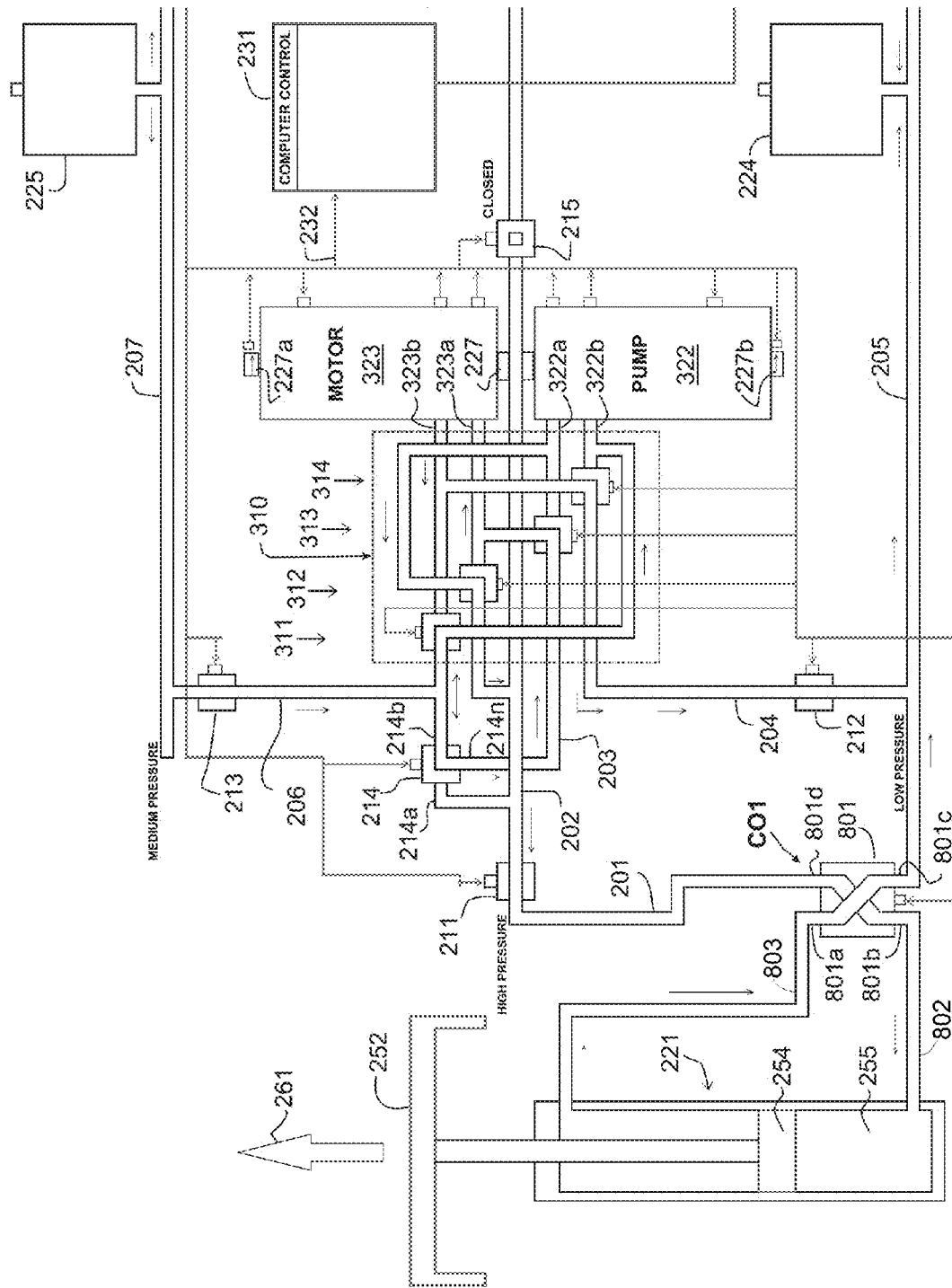
Figure 25:
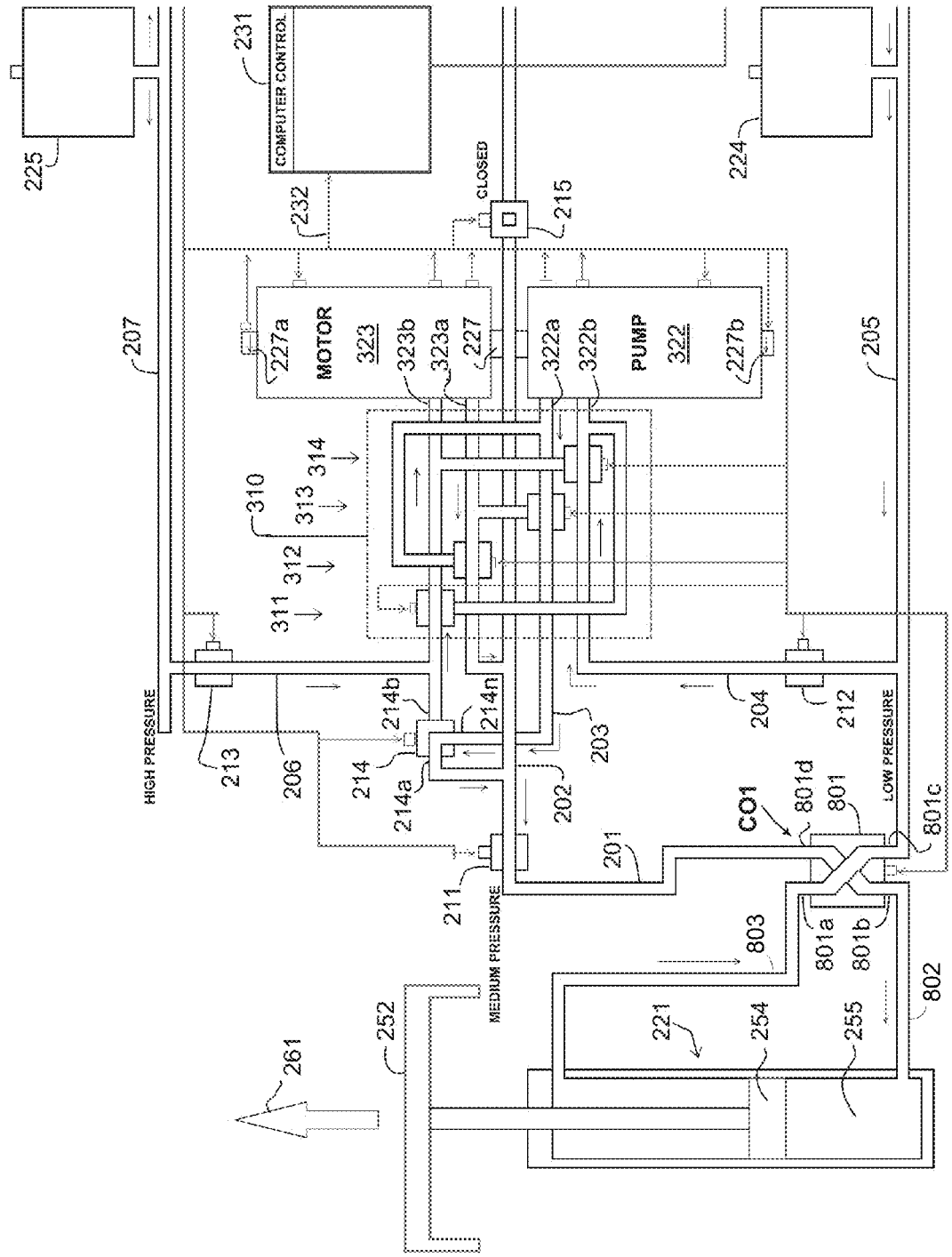
Figure 26:
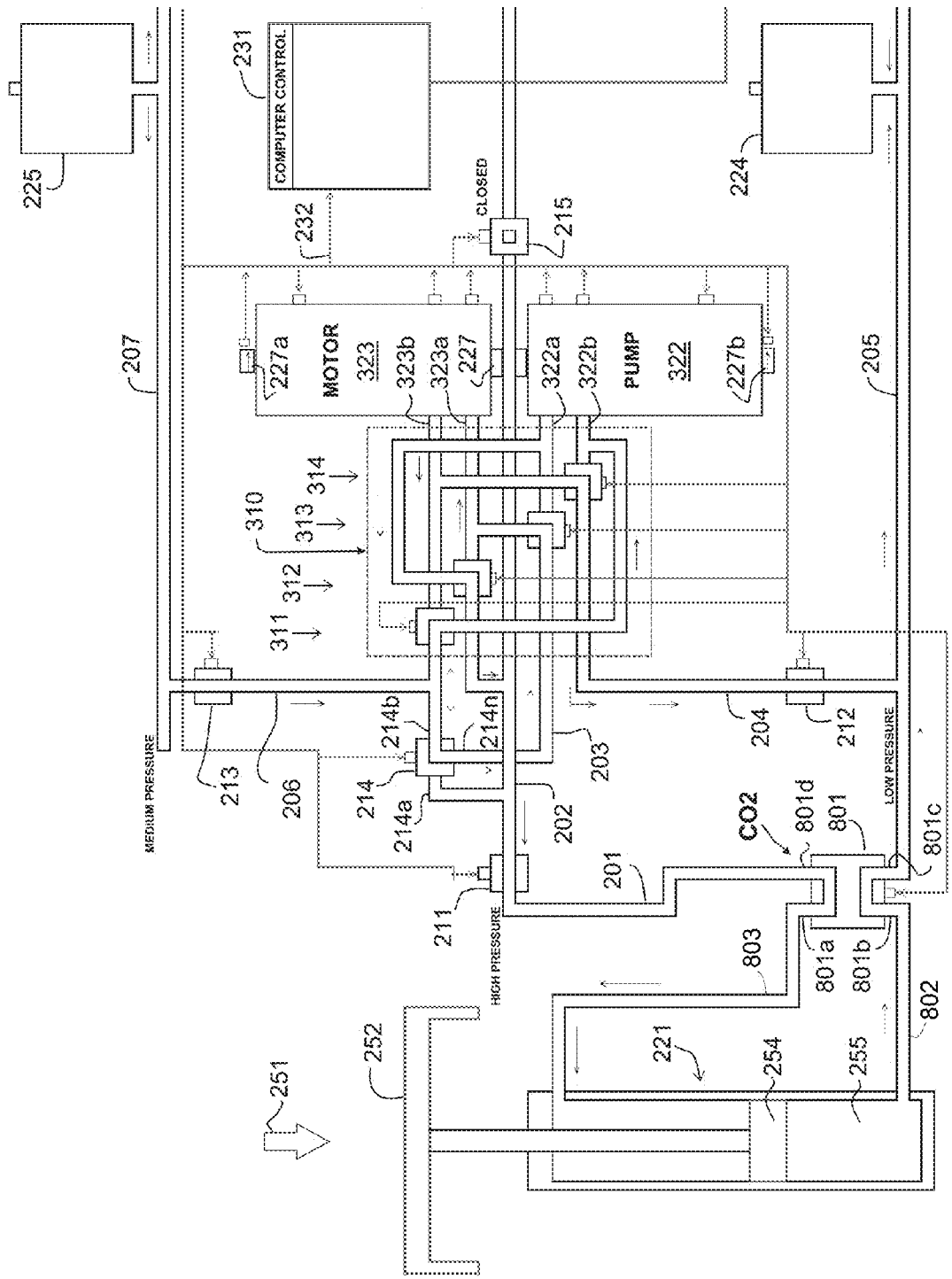
Figure 27:
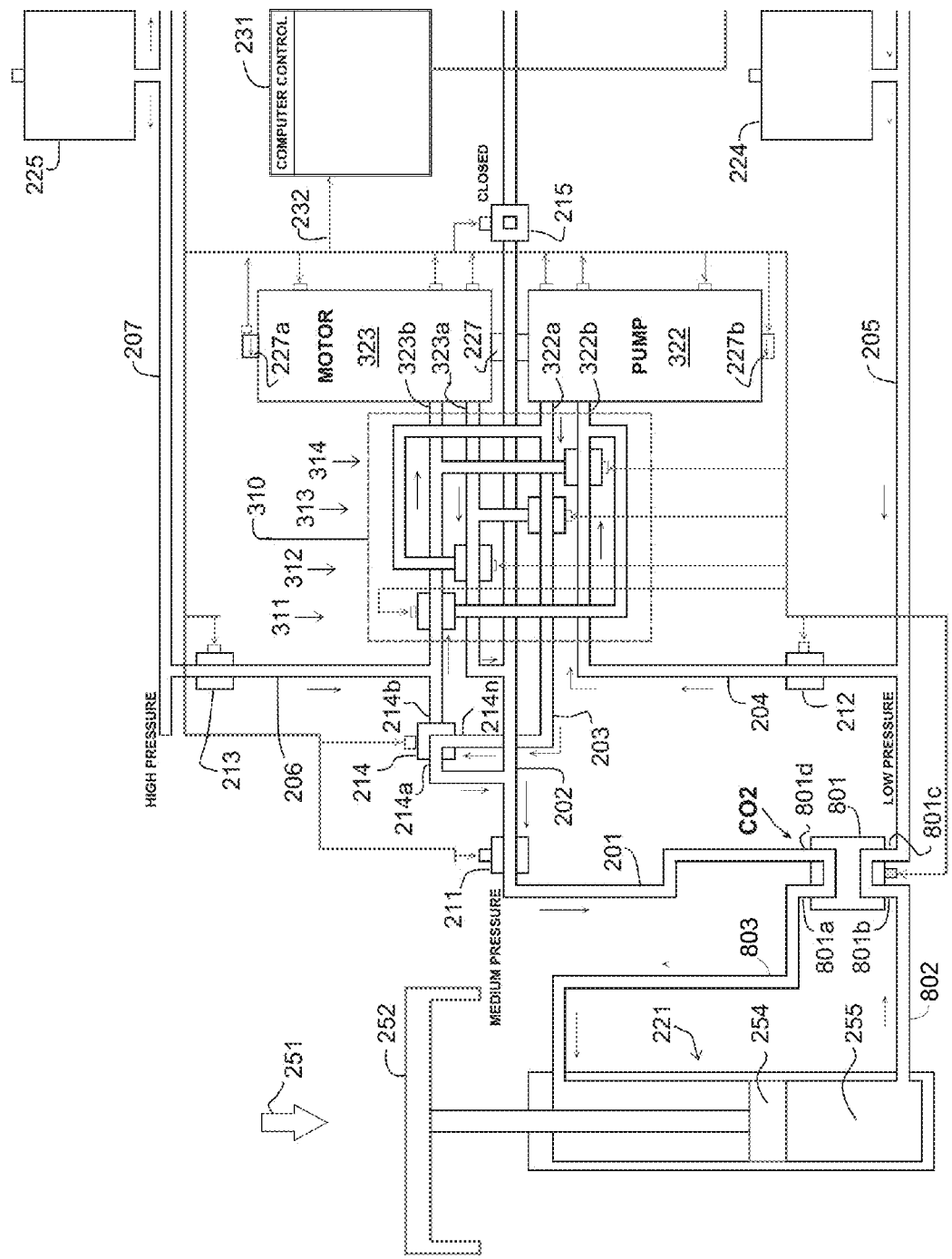
Figure 28:
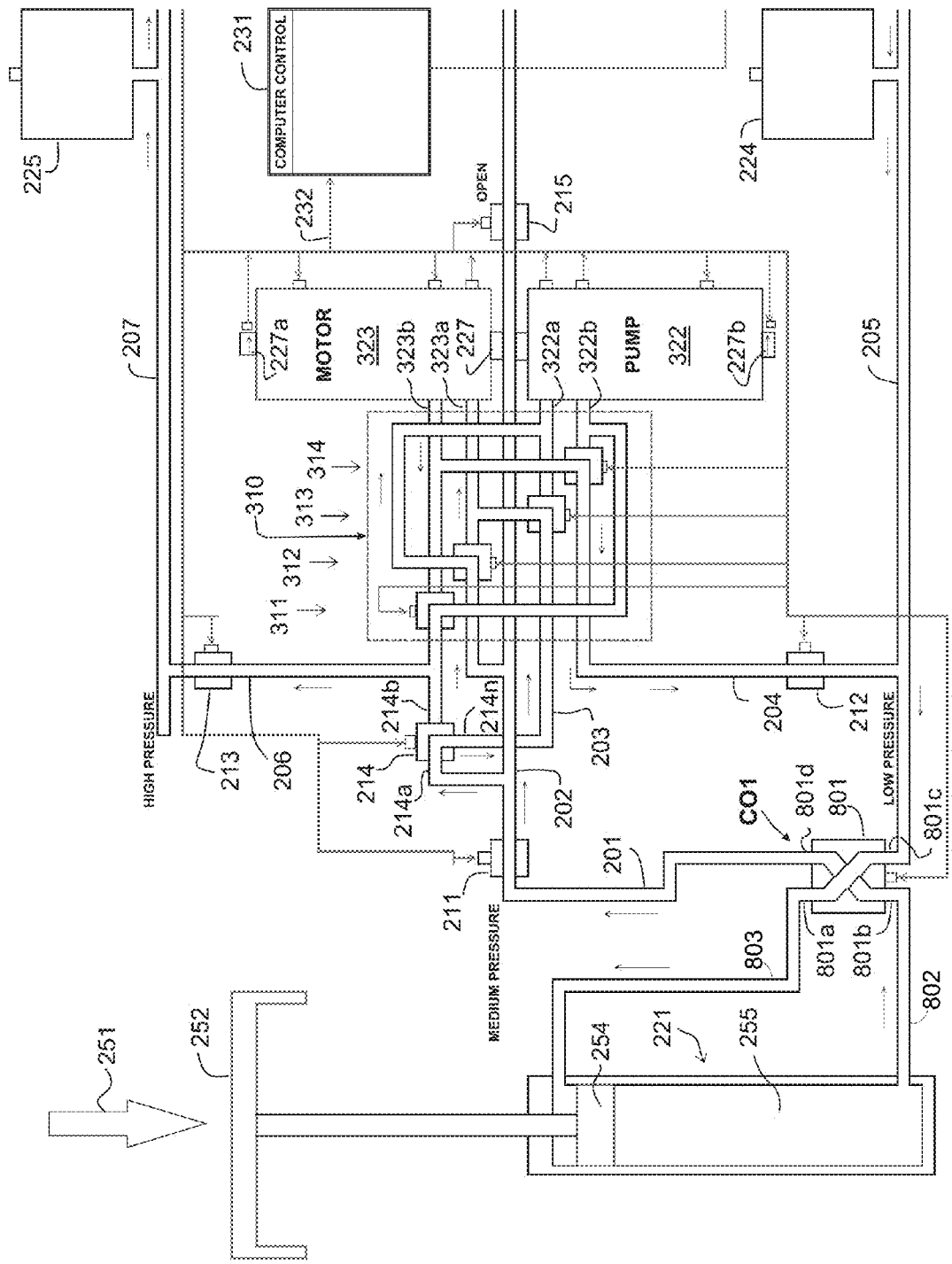
Figure 29:
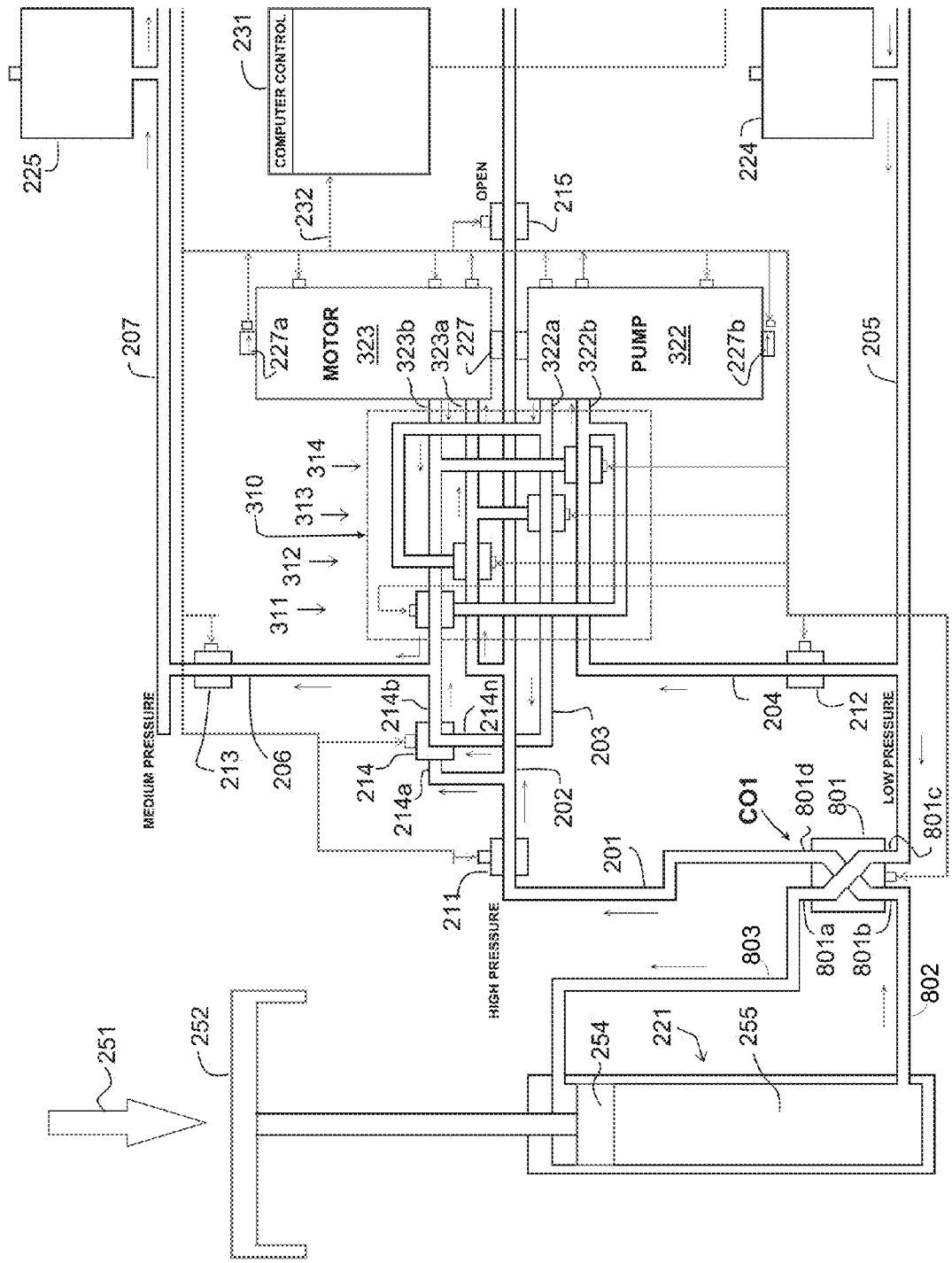
Figure 30:
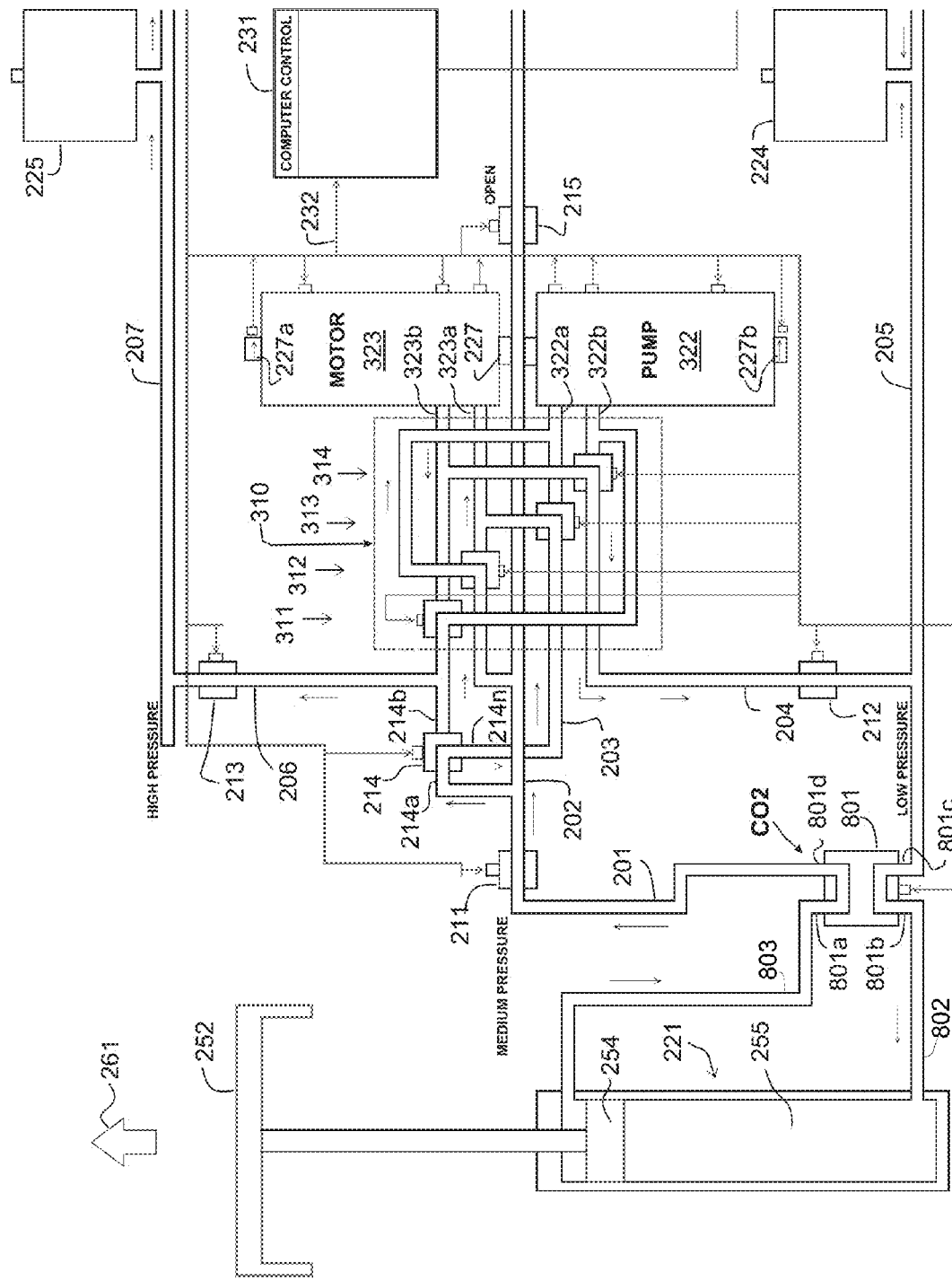
Figure 31:
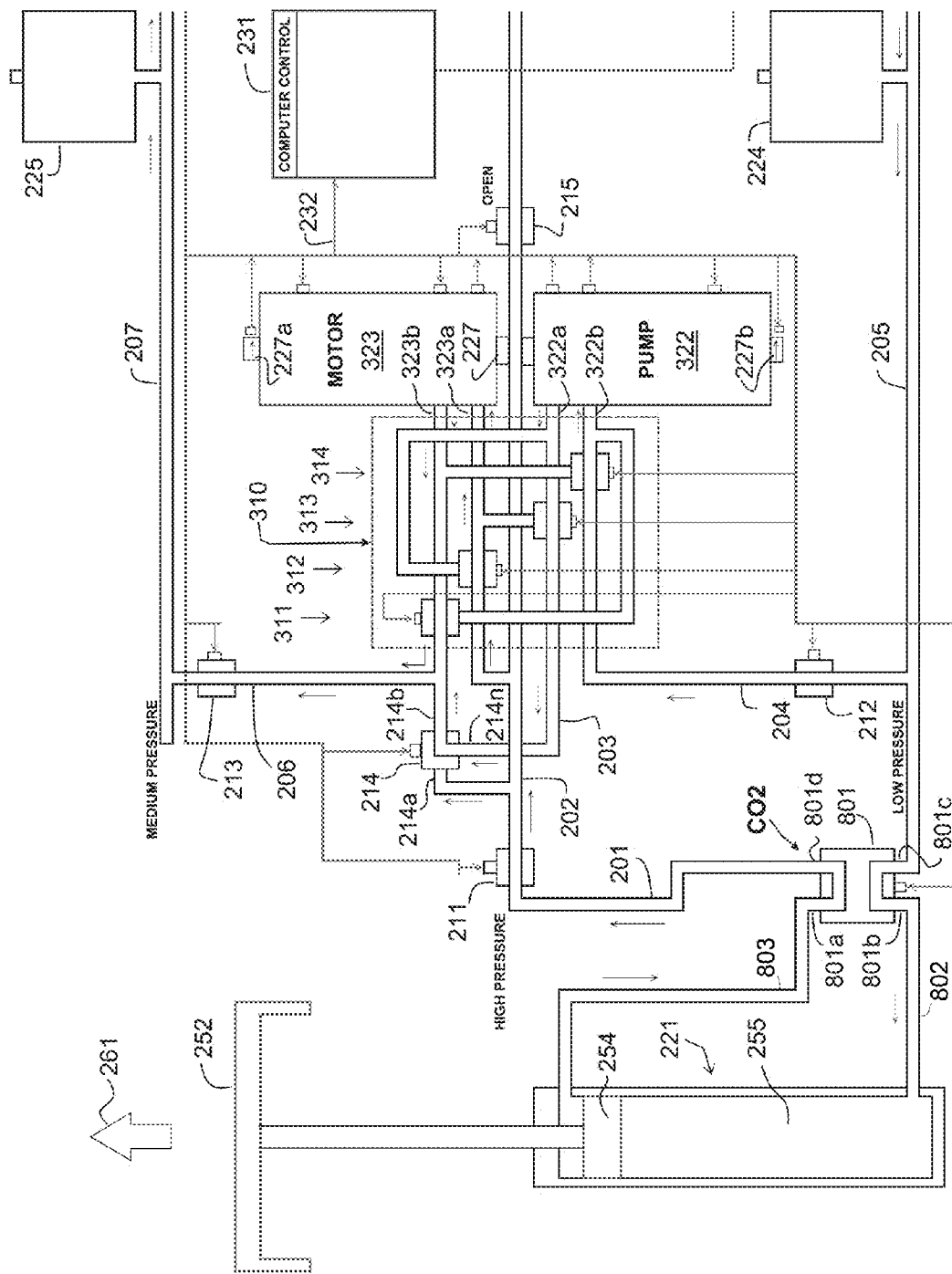
Figure 32:
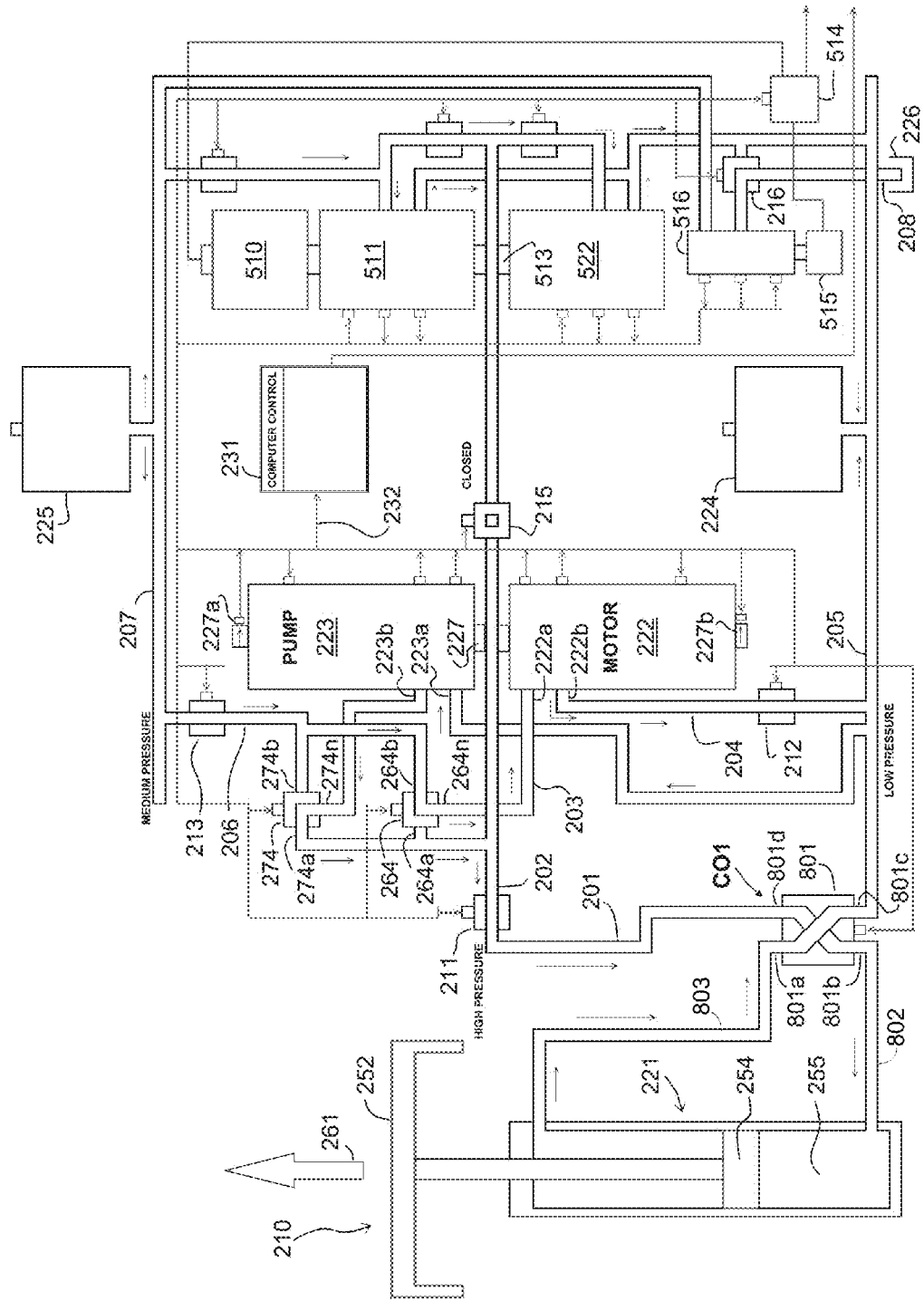
Figure 33:
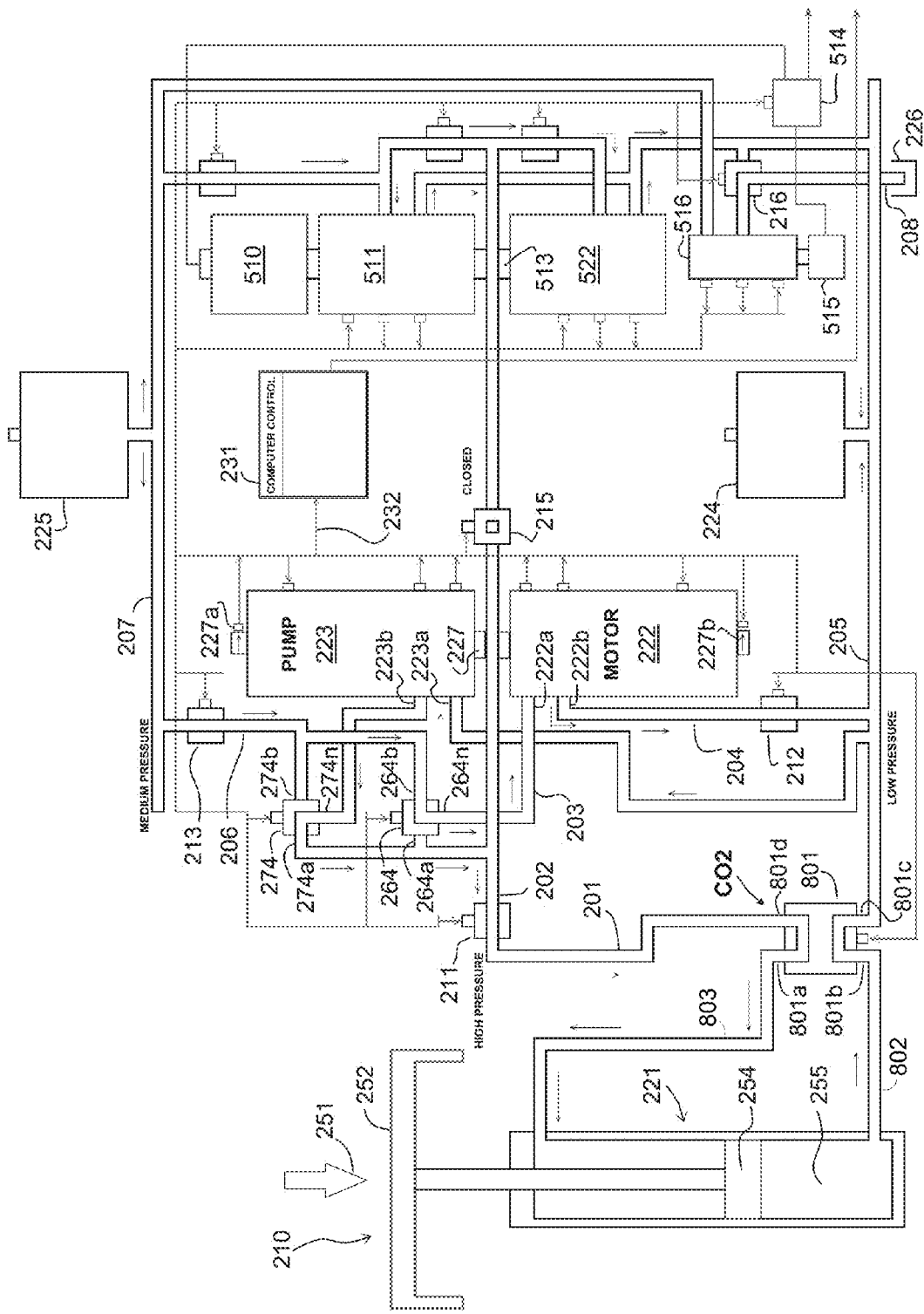
Figure 34:
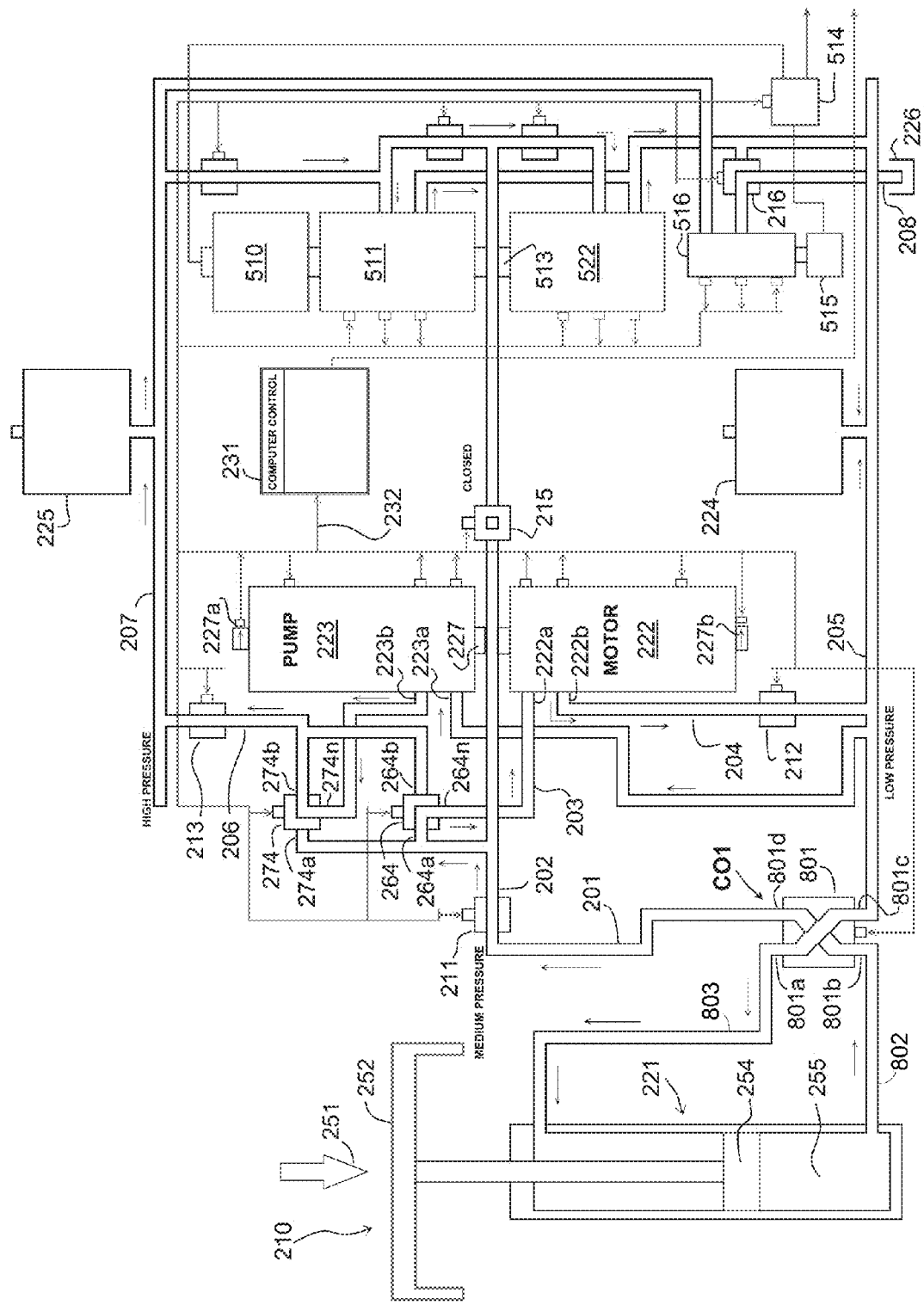
Figure 35:
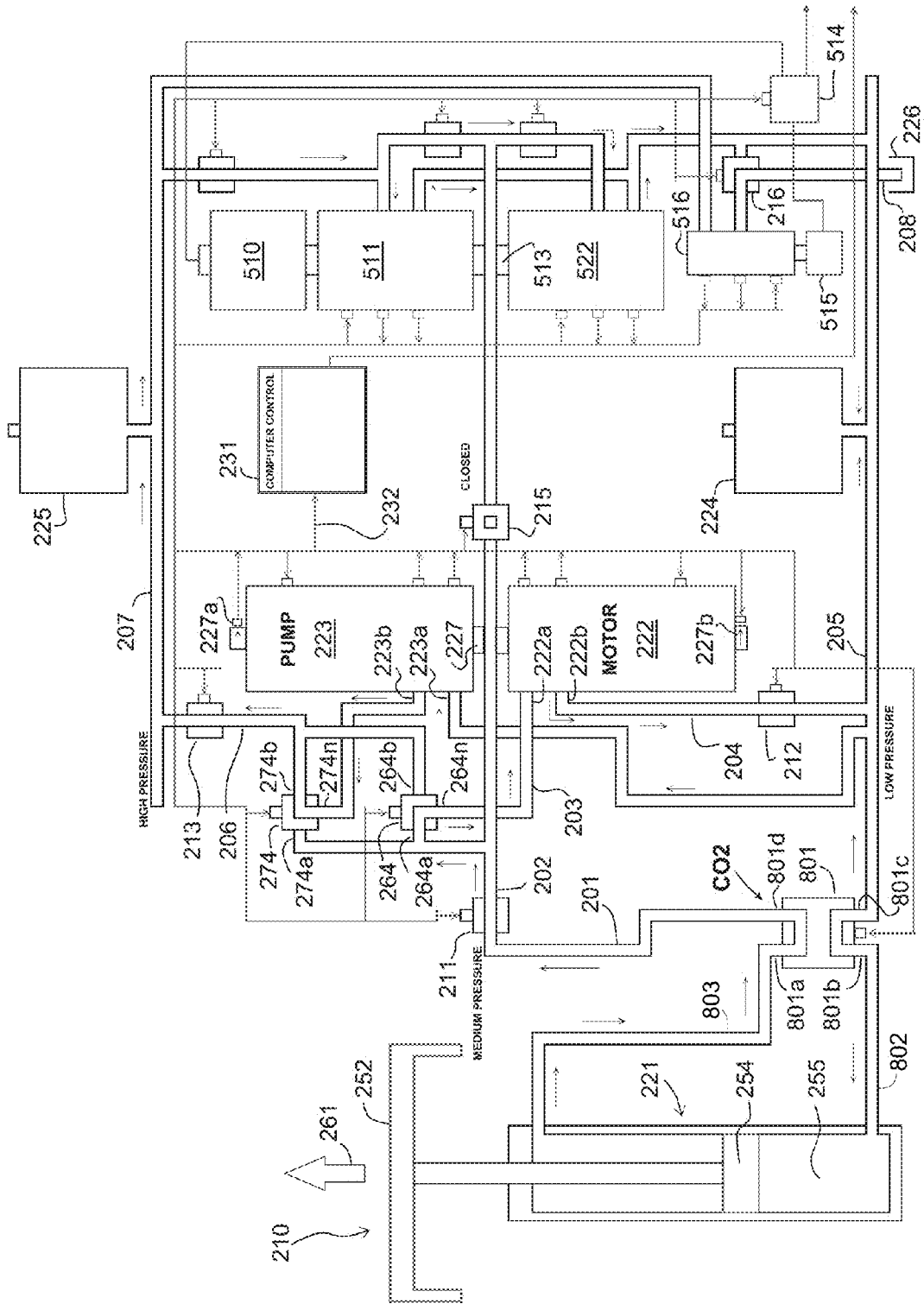
Figure 36:
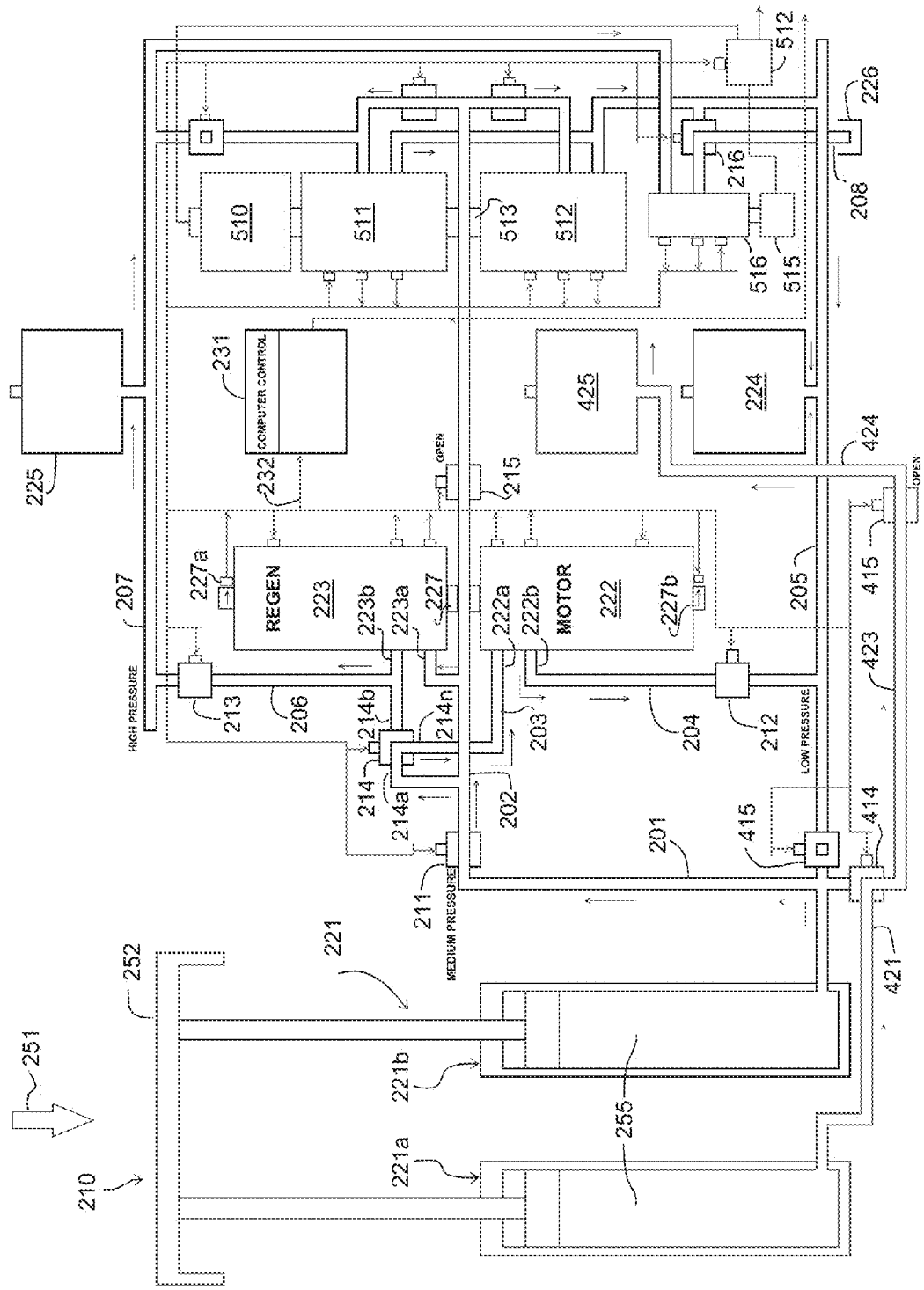
Figure 37:
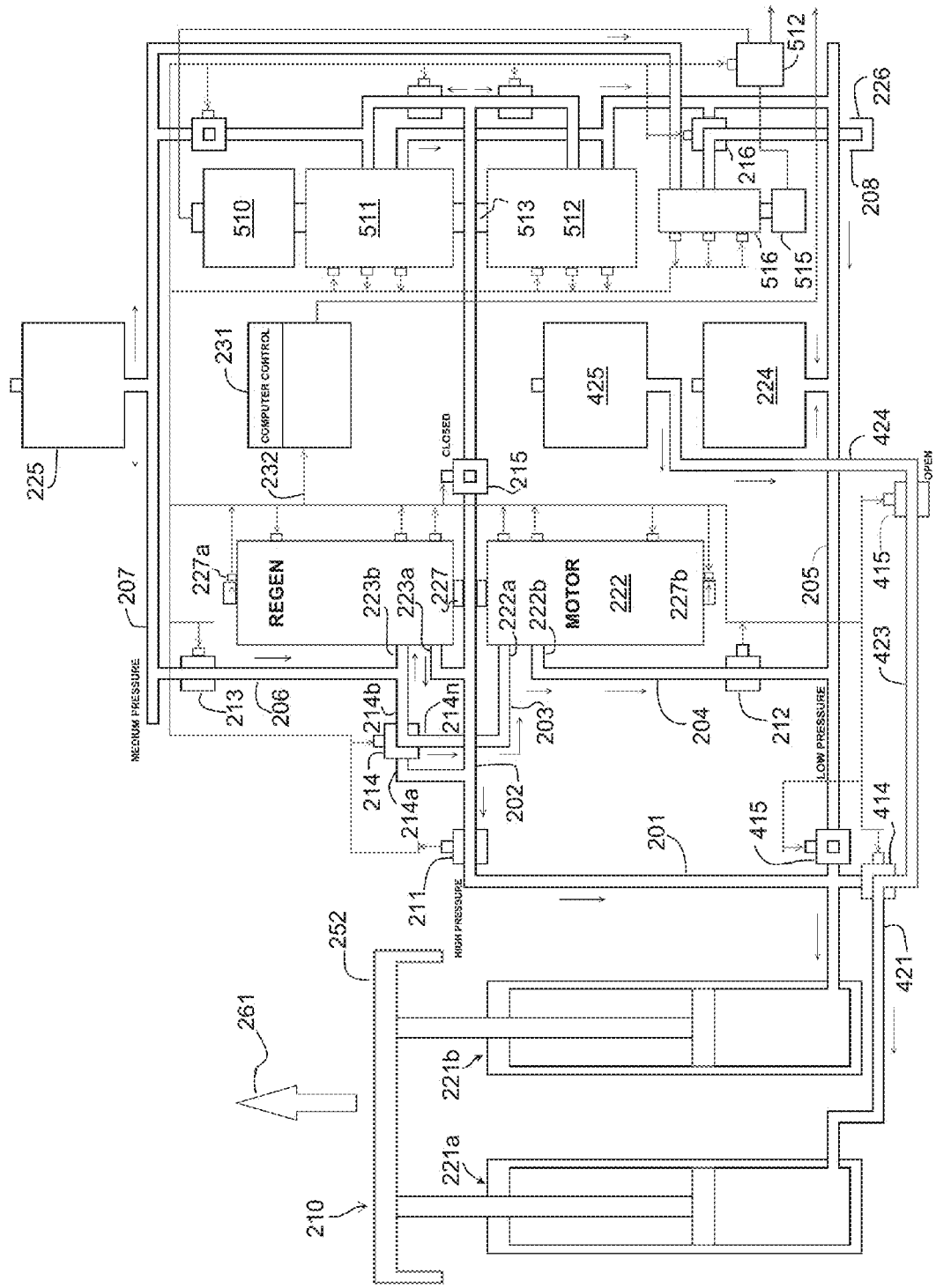
Figure 38:
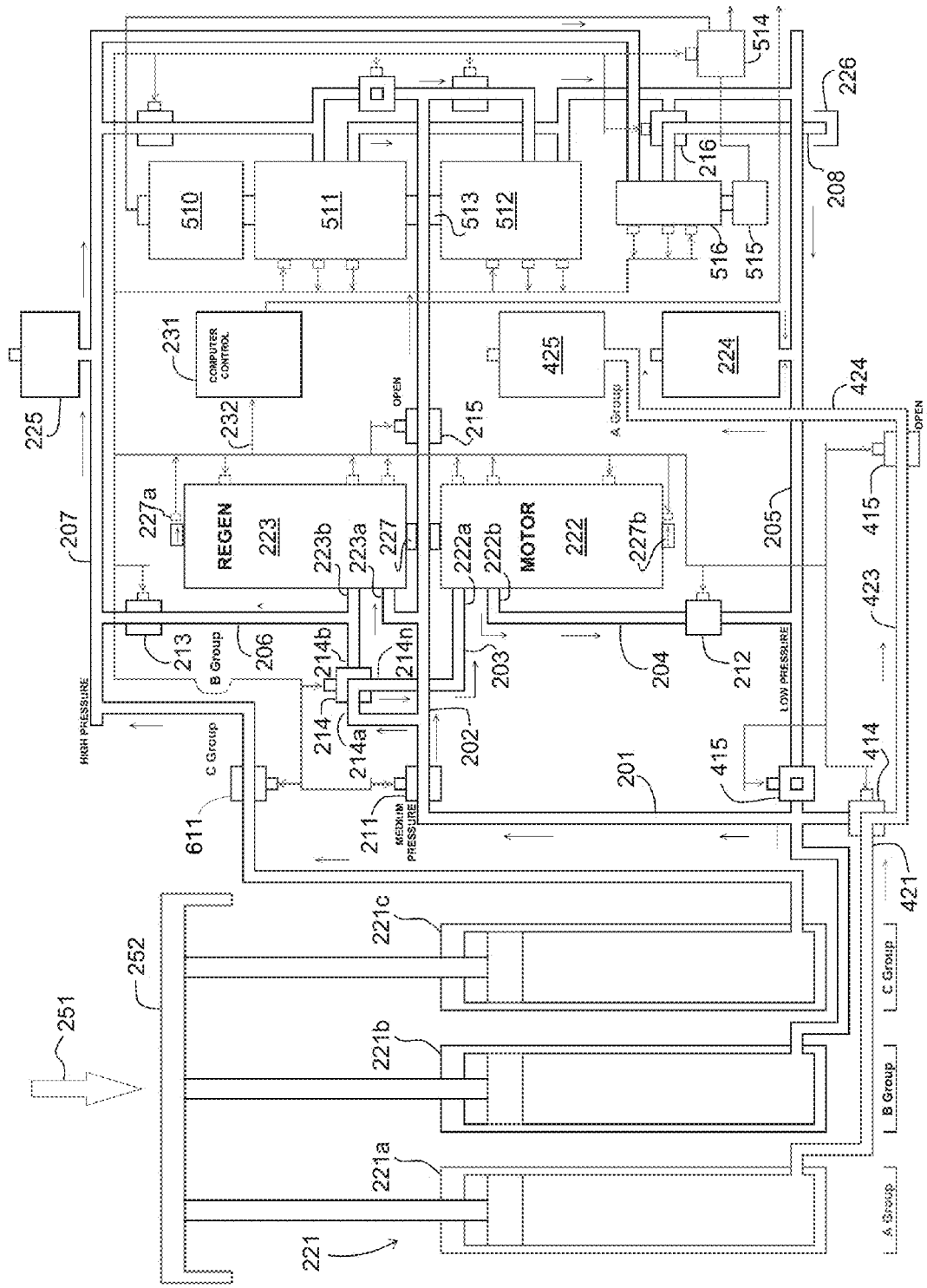
Figure 39:
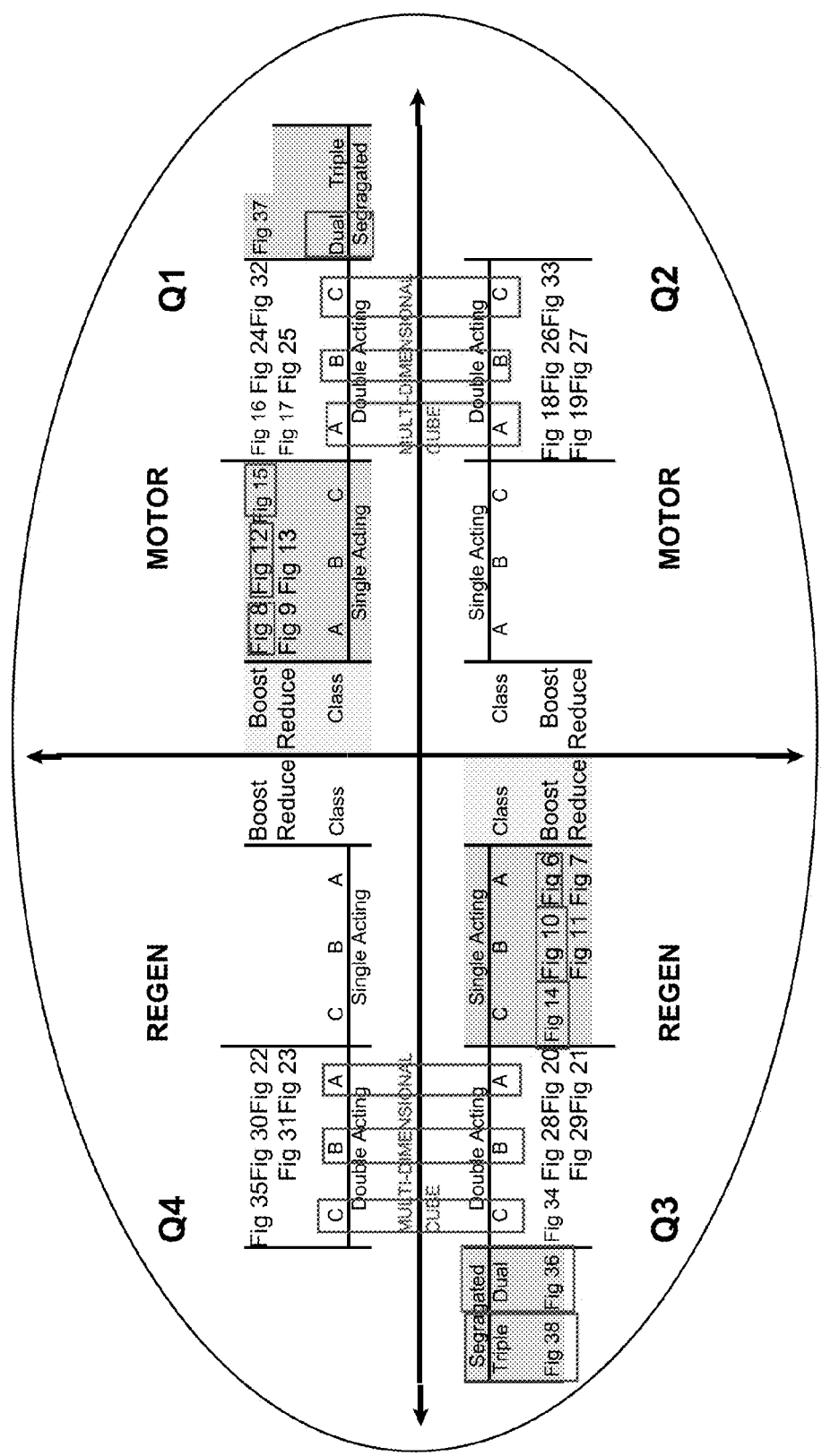
Figure 40:
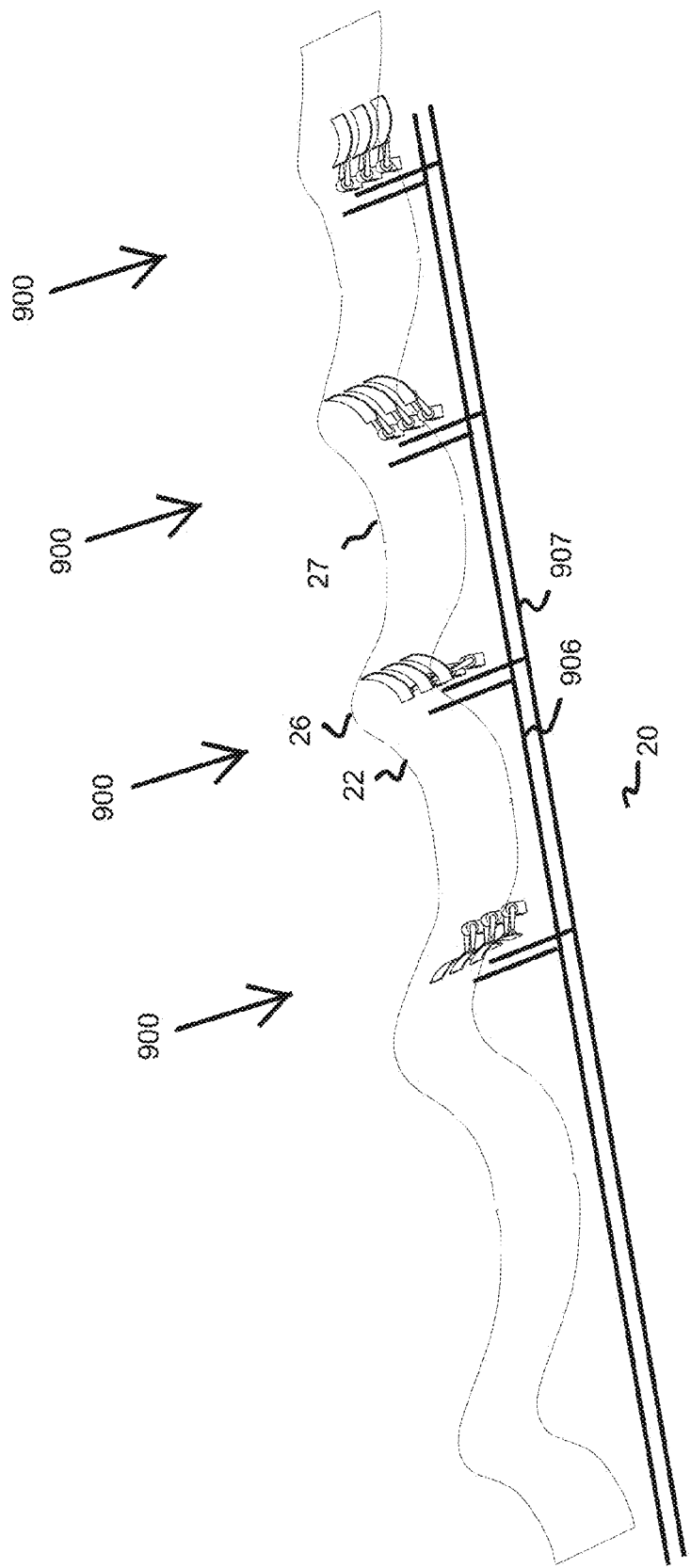
Figure 41:
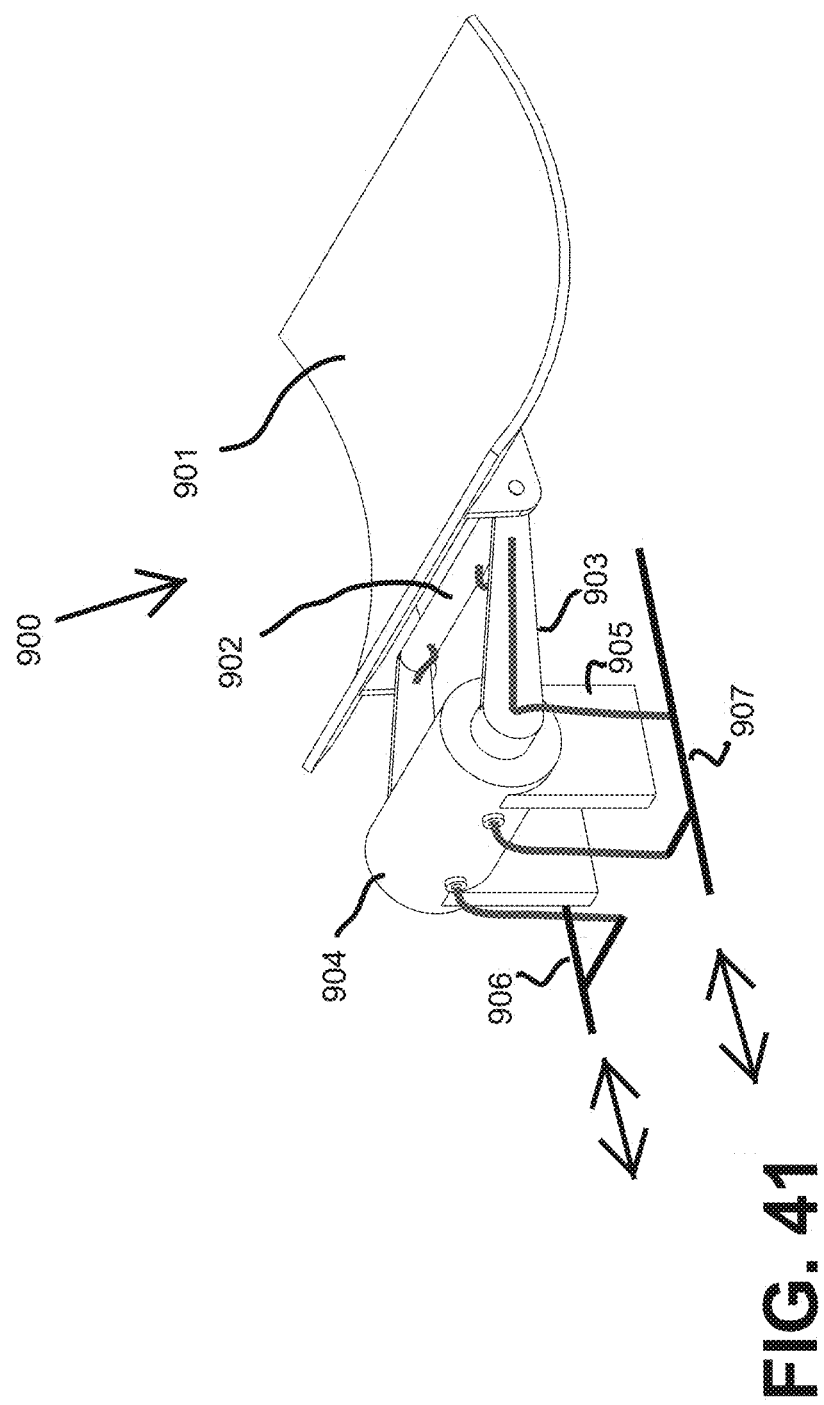
Figure 42:
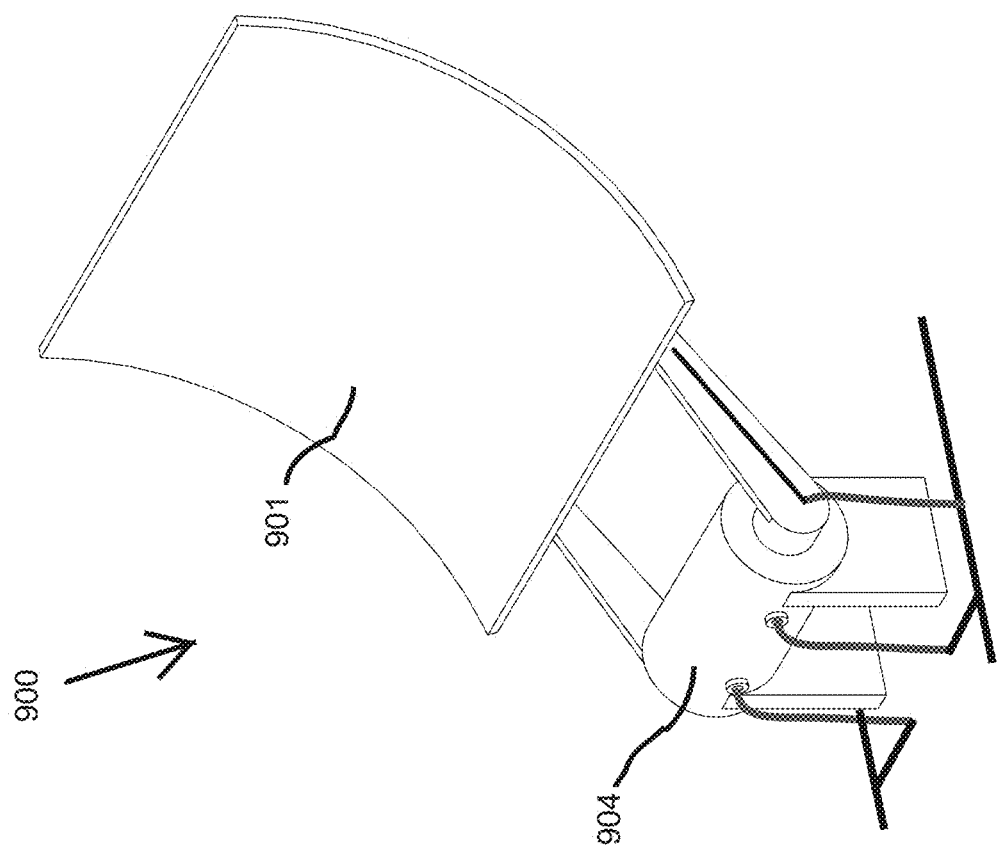
Figure 43:
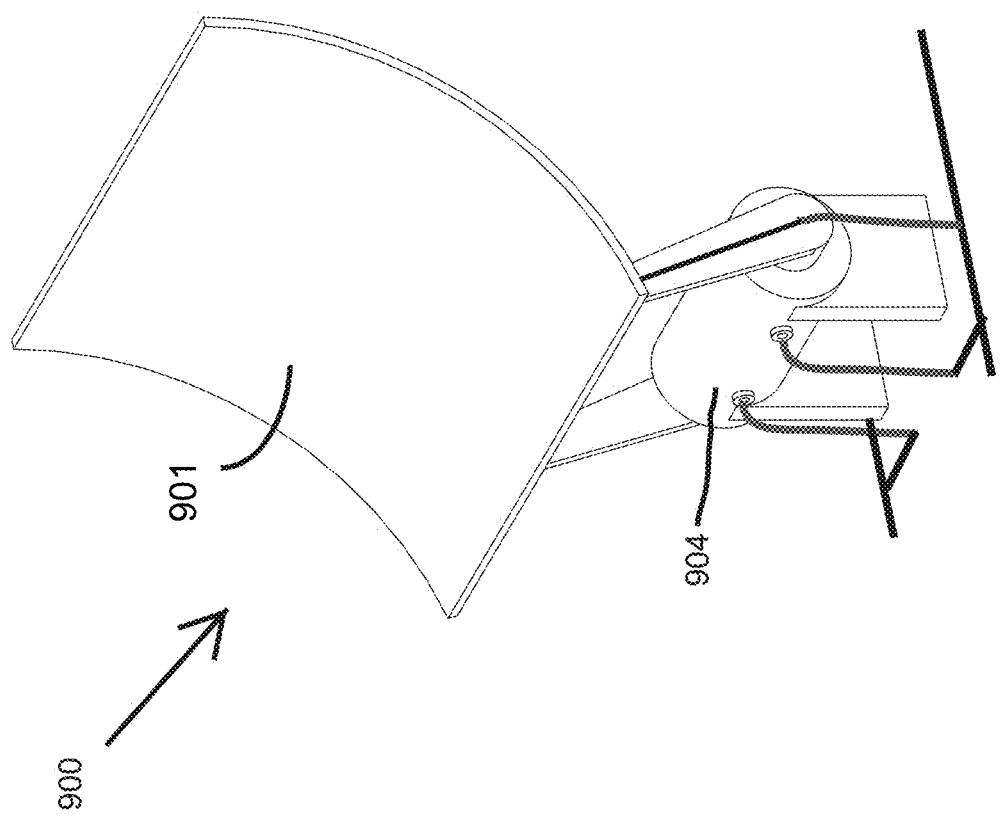
Figure 44:
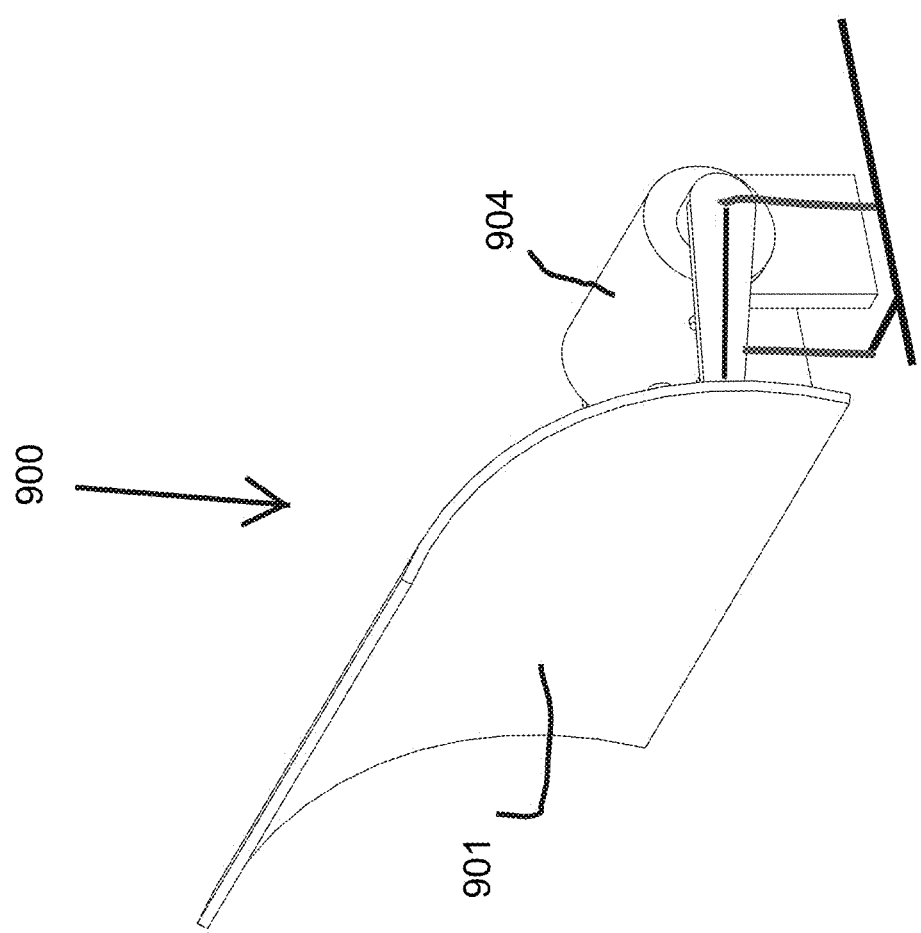
Figure 45:
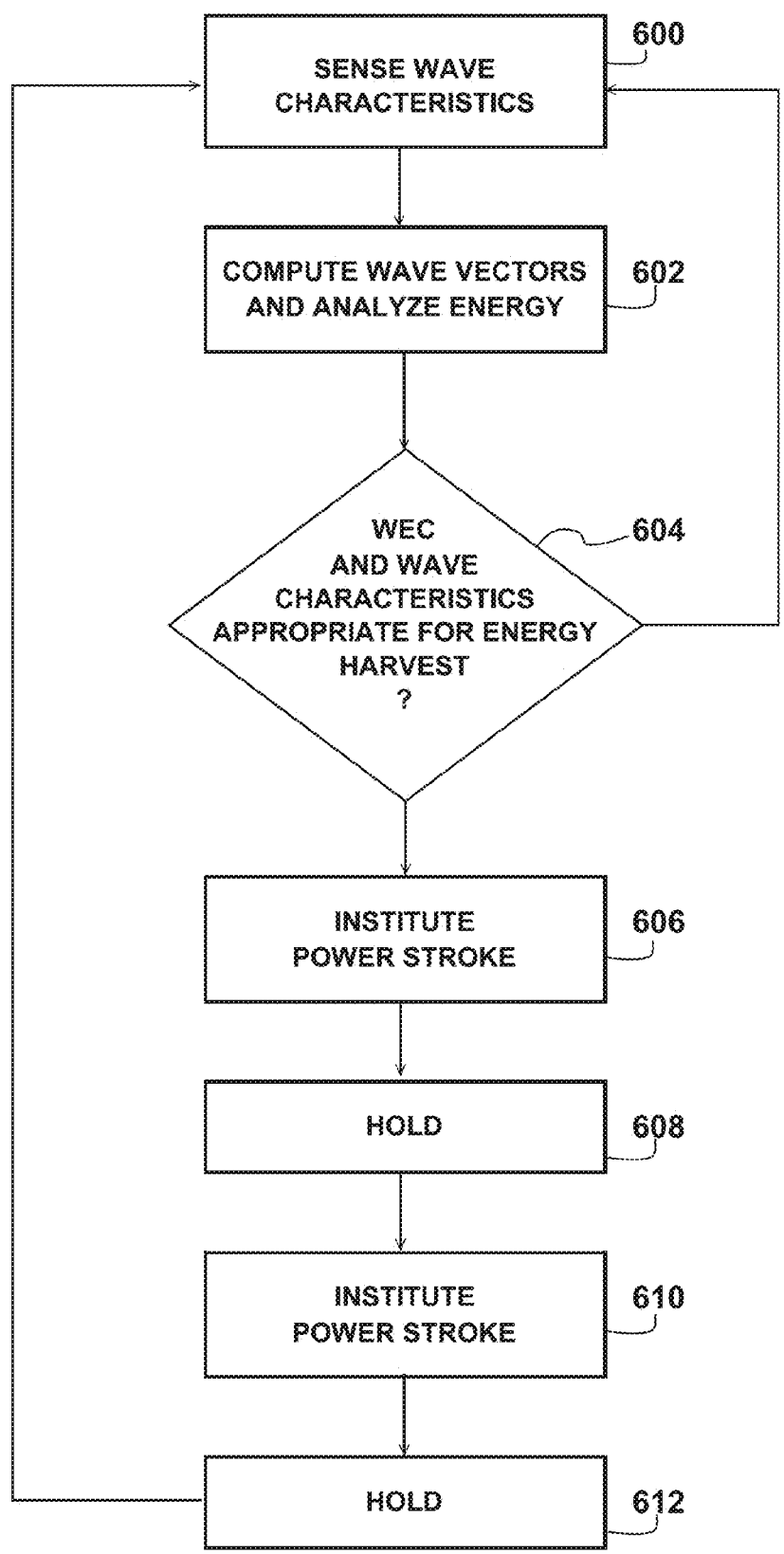
Figure 46:
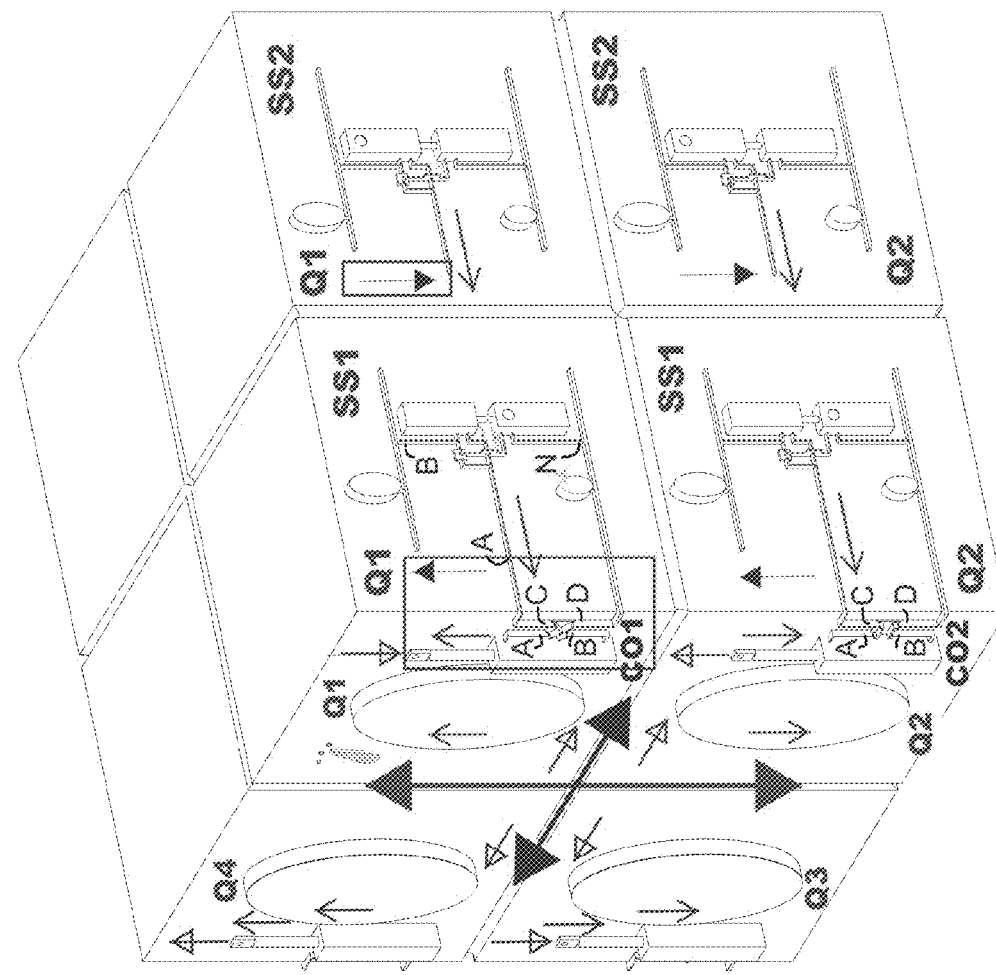
Figure 47:
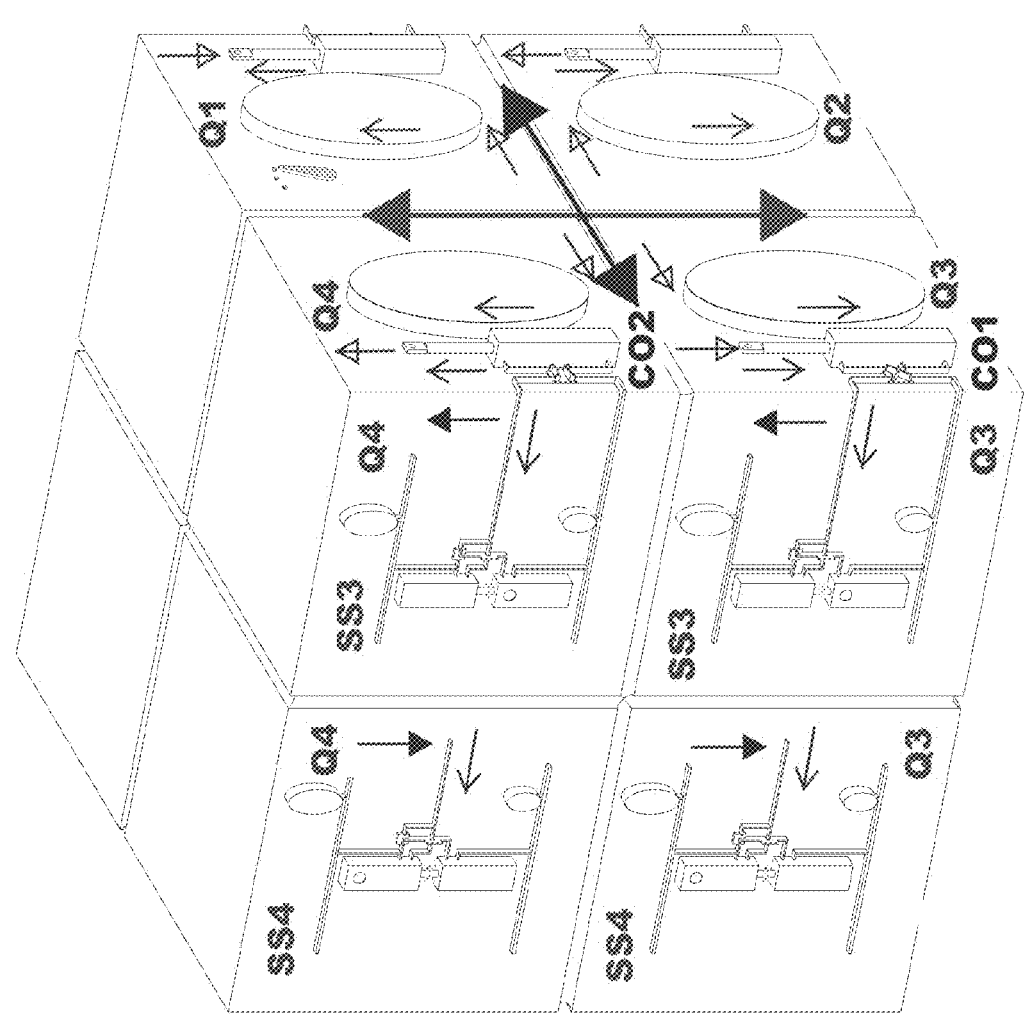
Figure 48:
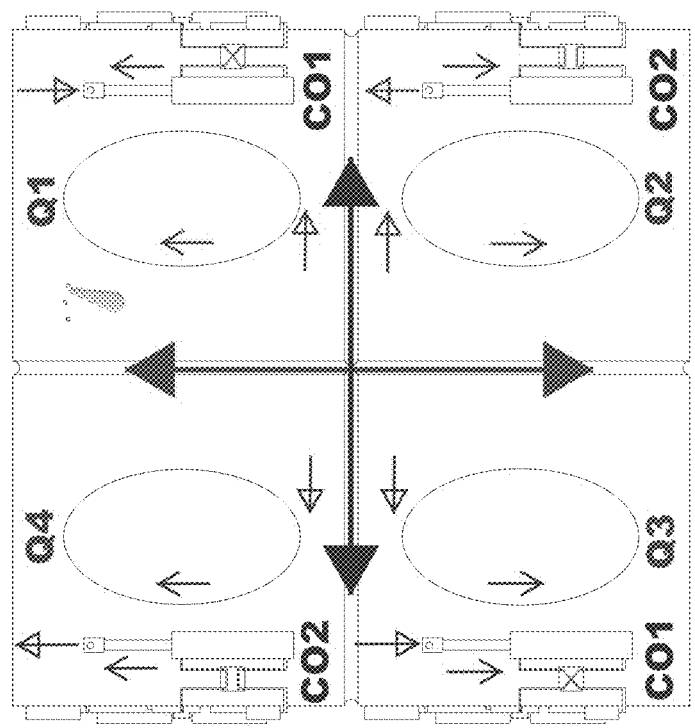
Figure 49:
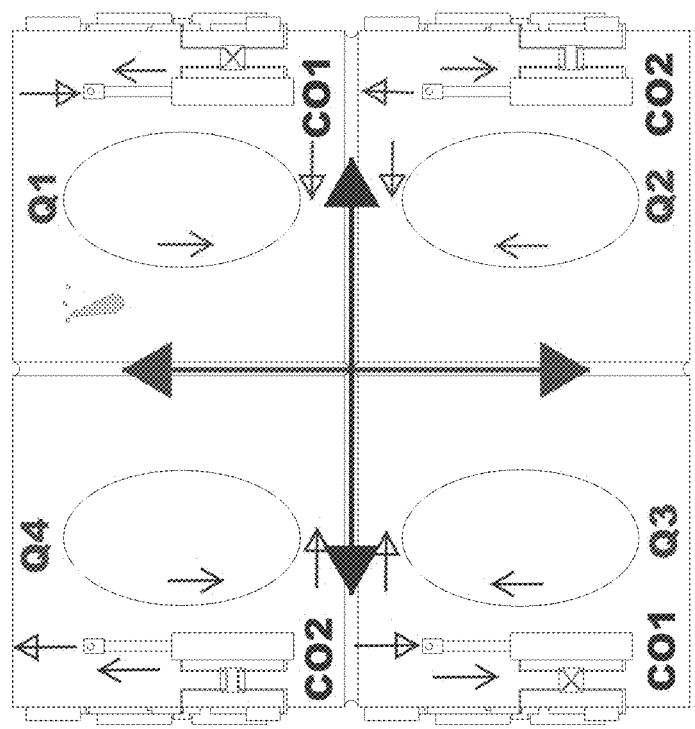
Figure 50:
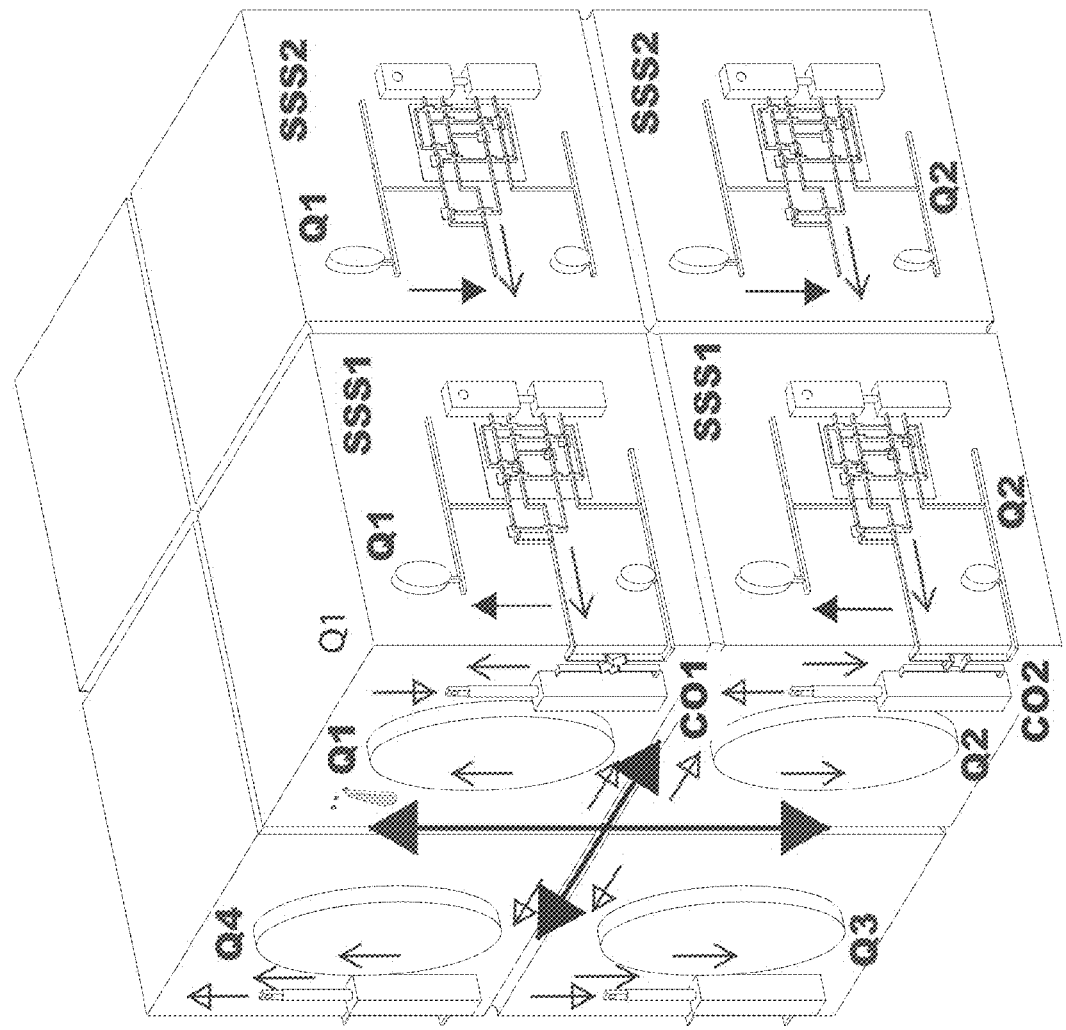
Figure 51:
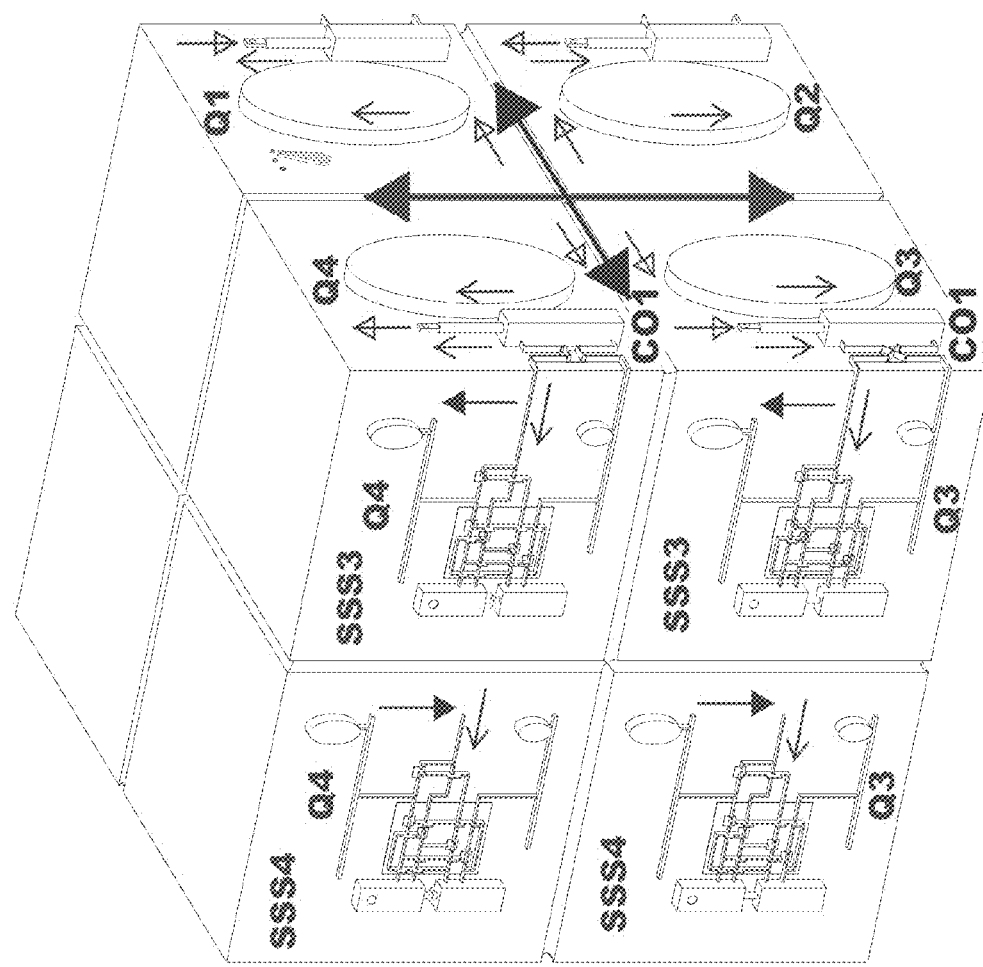
Figure 52:
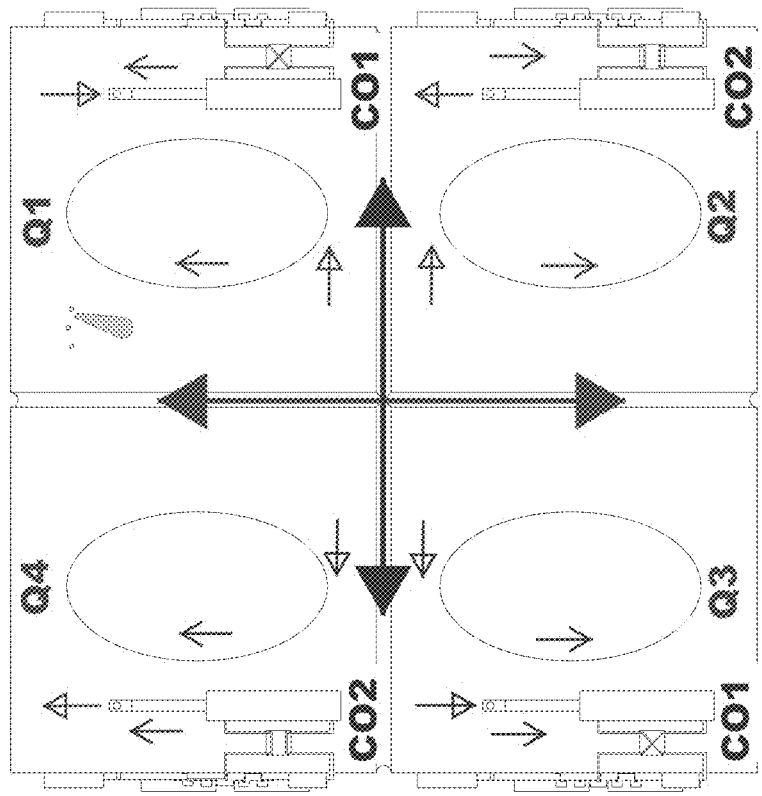
Figure 54:
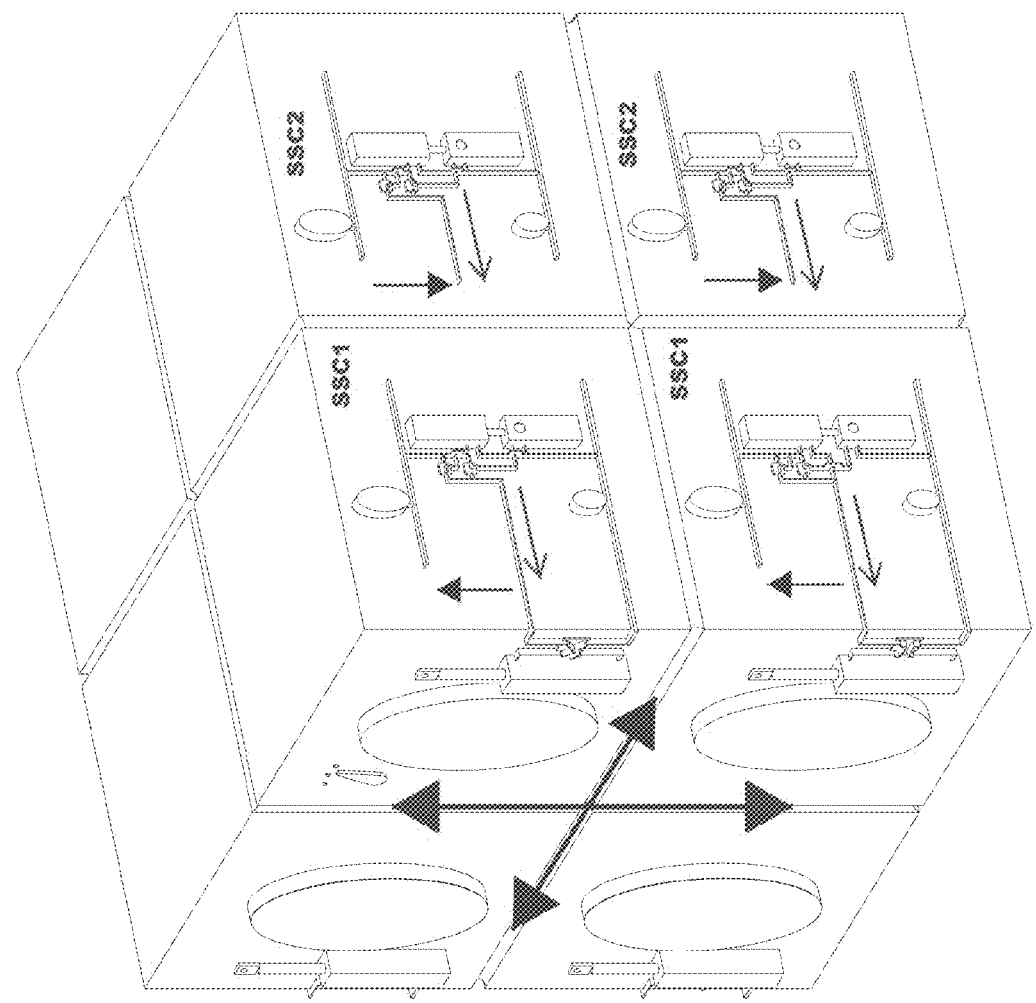
Figure 55:
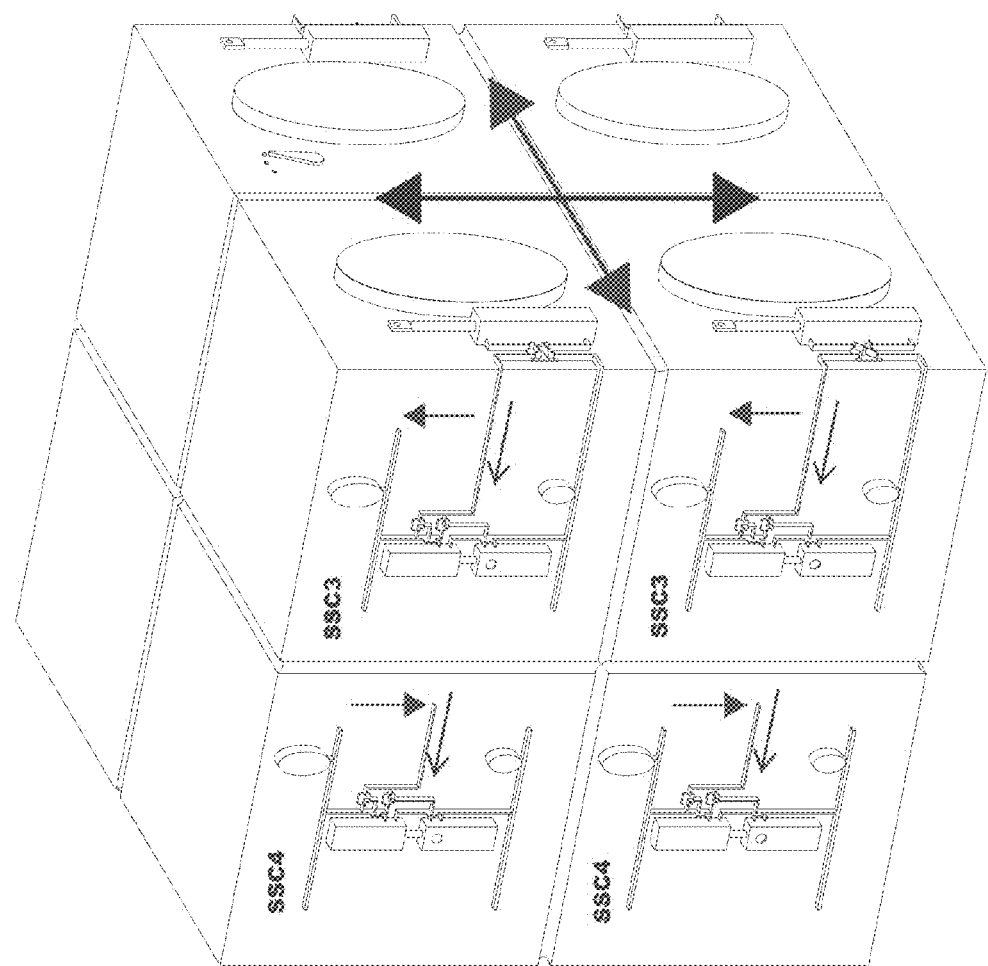
Figure 56:
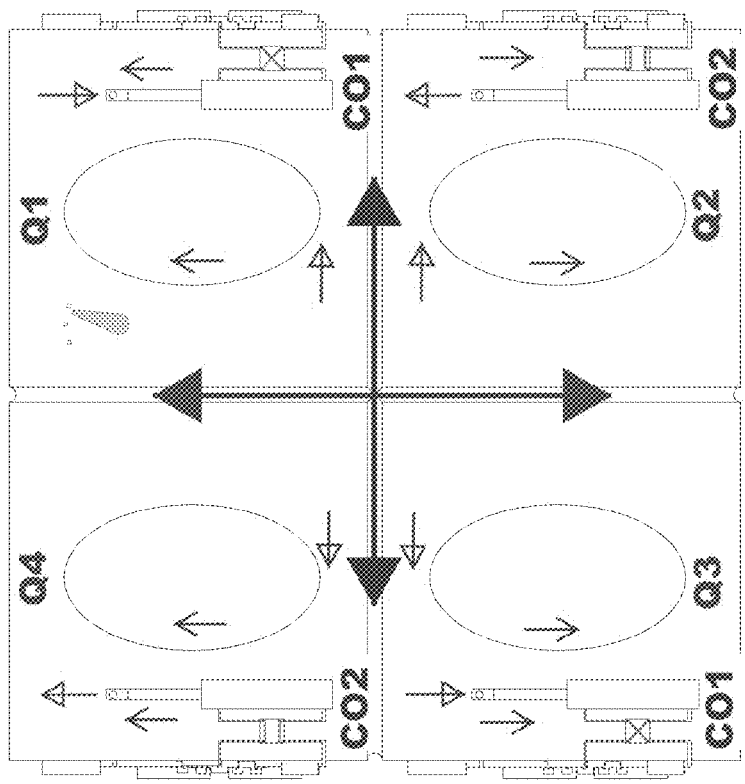
Figure 57:
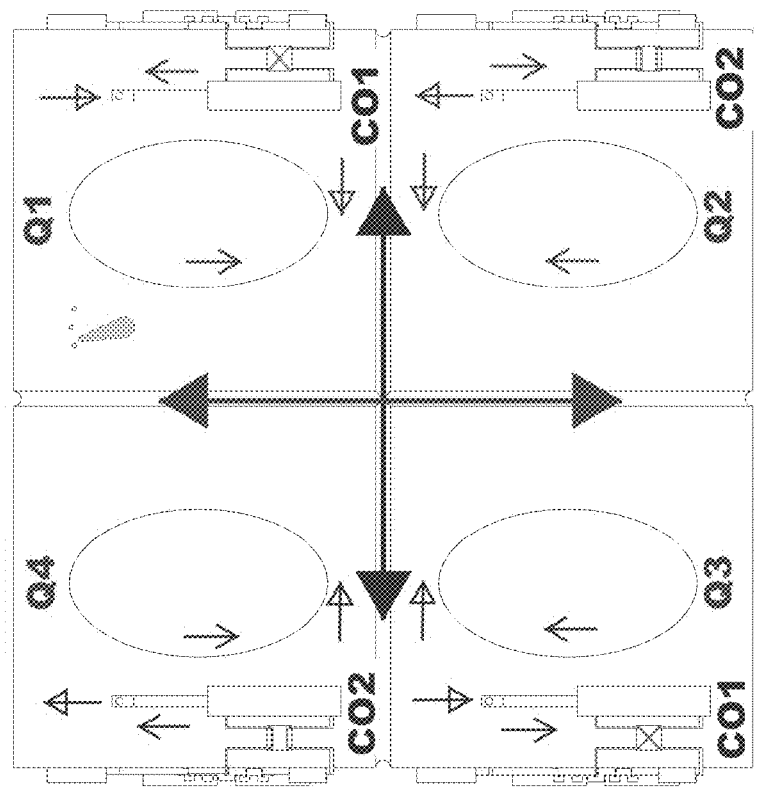
Figure 58:
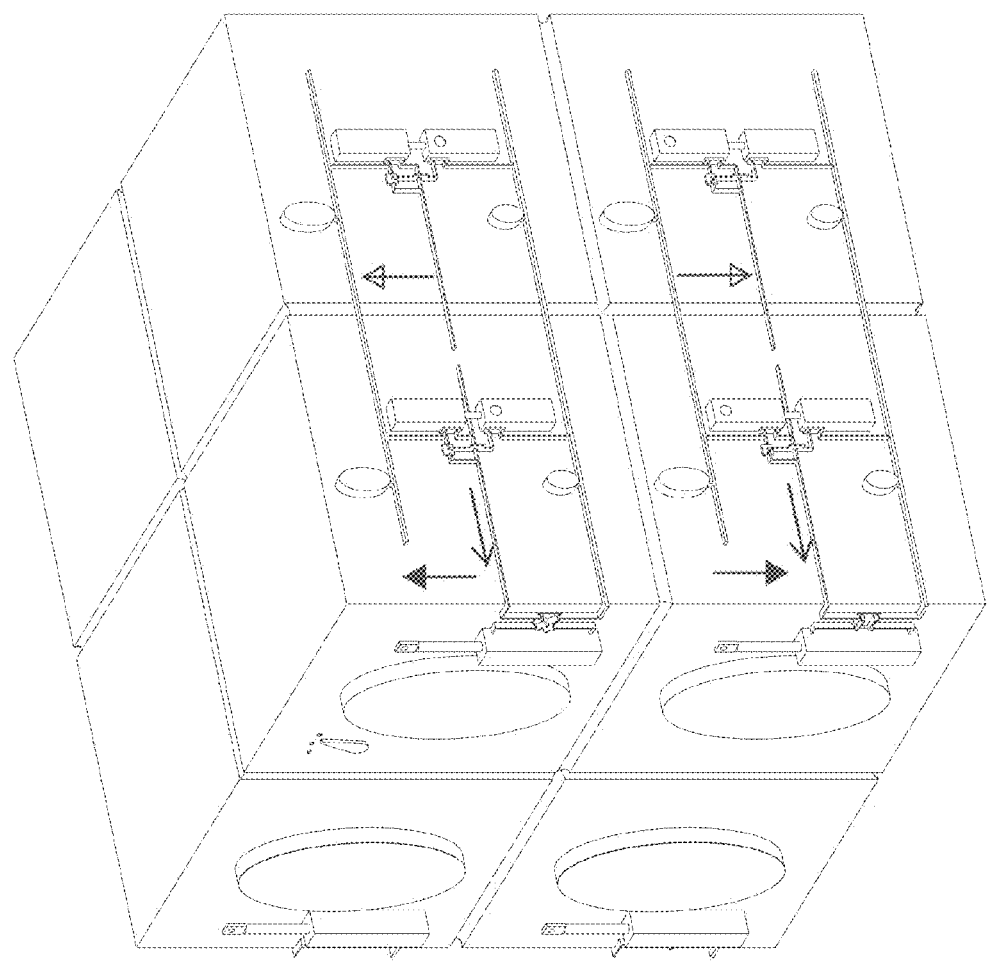
Figure 59:
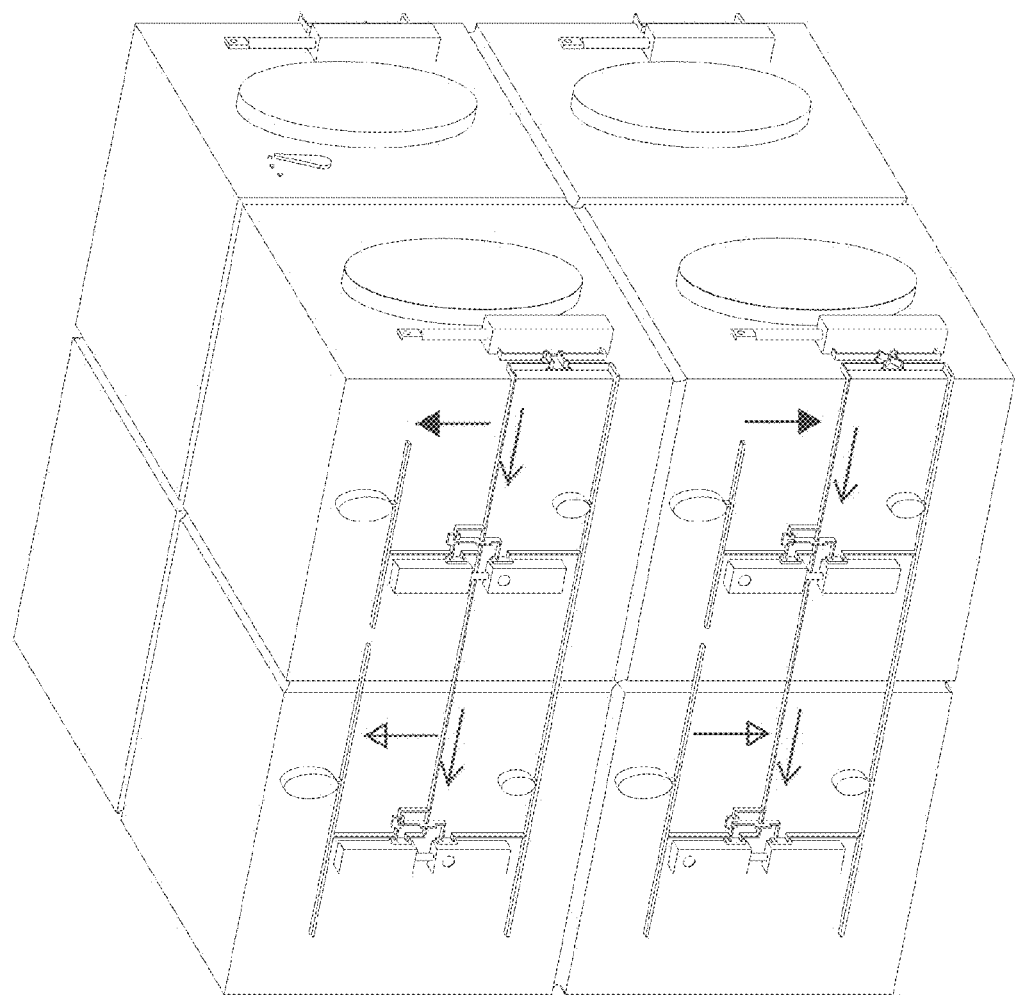
Figure 60:
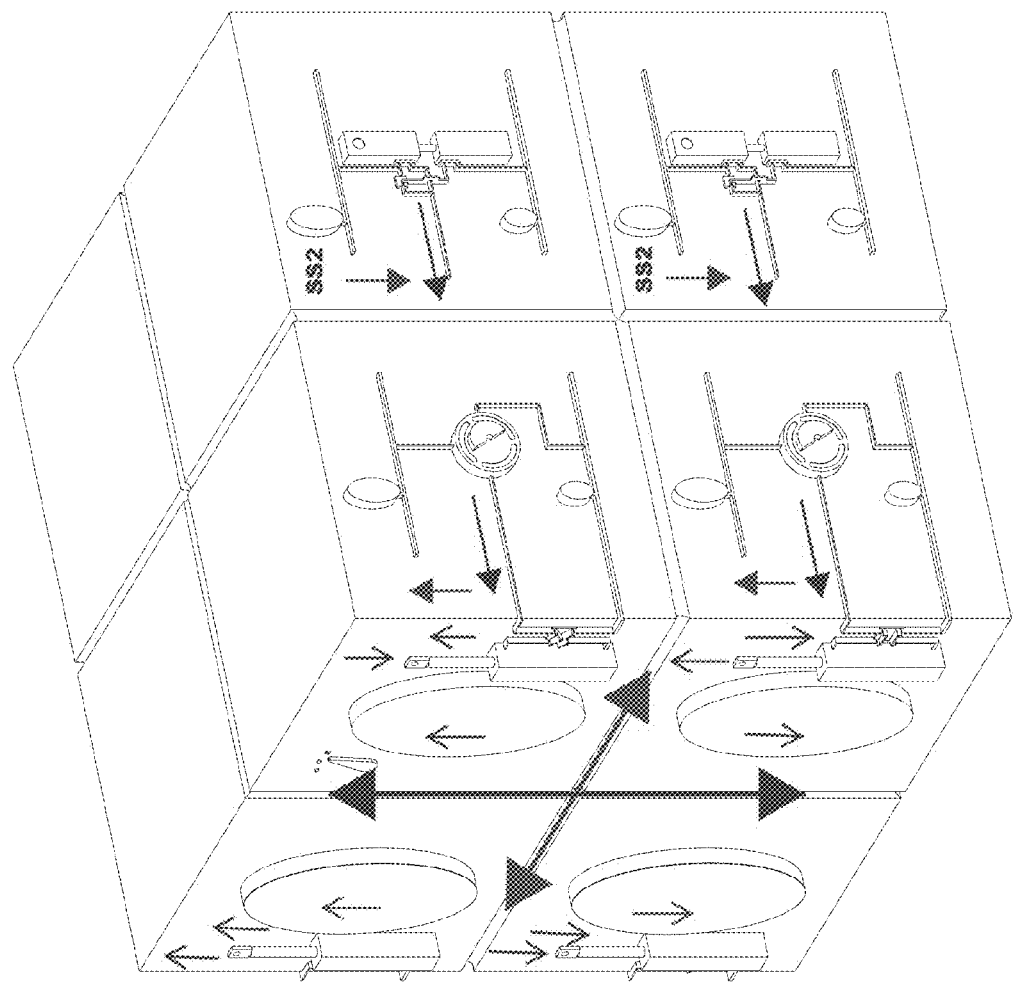
Figure 61:
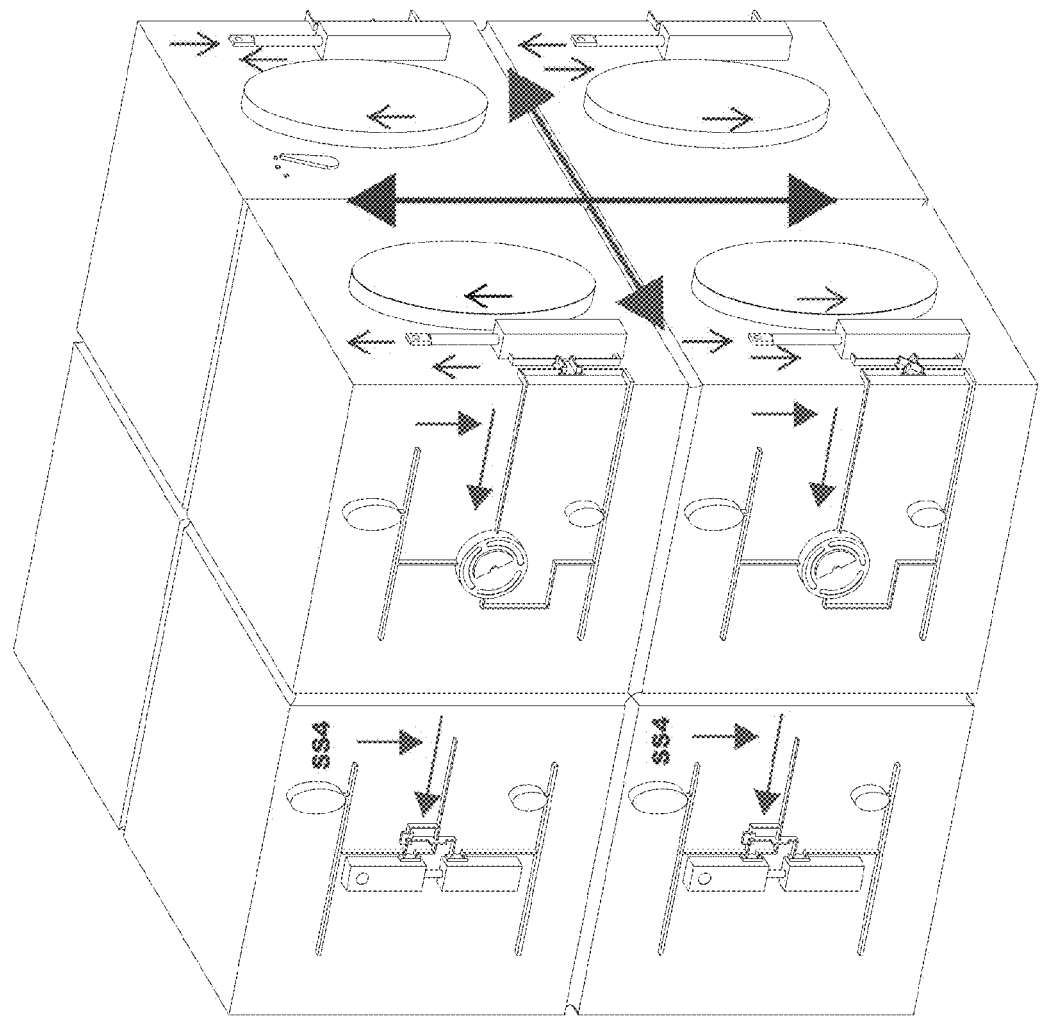

The ten figures that follow, FIGS. 6-9, and 10-15, apply to single-acting multi-hydraulic cylinder arrangements suited to the WEC, where the assembly of hydraulic cylinders is represented by a single cylinder for each group, FIGS. 36-37 to a dual cylinder group, and FIG. 38 to a triplex cylinder group;

FIG. 6 is a schematic representation of hydraulic fluid energy conversion equipment of a wave energy conversion system in accordance with the present invention, with a WEC operating in power stroke to boost pressure through a Class A fluid power transformer and transmit fluid to storage in an accumulator, as shown in switching arrangement SS3 in quadrant Q3, also shown in FIG. 47;

FIG. 7 is a schematic representation similar to FIG. 6 with the WEC operating in a power stroke (equivalent to regenerative stroke), except with pressure being reduced through the Class A fluid power transformer and fluid flowing to storage in the accumulator, as shown in switching arrangement SS4 in quadrant Q3, also shown in FIG. 47;

FIG. 8 is a schematic representation similar to that of FIG. 6, with the WEC operating in return stroke (equivalent to motor stroke) with pressure from the accumulator being boosted through the Class A fluid power transformer and fluid flowing to the cylinder assembly to lift the piston to its top position, as shown in switching arrangement SS1 in quadrant Q1, also shown in FIG. 46;

FIG. 9 is a schematic representation similar to FIG. 8, with the WEC operating in the return stroke (equivalent to motor stroke), except with pressure from the accumulator being reduced through the Class A fluid power transformer and fluid flowing to the cylinder assembly to lift the piston to top position, as shown in switching arrangement SS2 in quadrant Q1, also shown in FIG. 46;

FIG. 10 is a schematic representation of a second embodiment of wave energy 10 conversion system in accordance with the present invention, with a WEC operating in a power stroke (equivalent to regenerative stroke), with pressure to an accumulator being boosted through a Class B fluid power transformer having a motor rotatably connected to a pump, after passing through a fluid transposing switch, as shown in switching arrangement SSS3 in quadrant Q3, also shown in FIG. 51;

FIG. 11 is a schematic representation similar to FIG. 10 with the WEC operating in the power (equivalent to regenerative mode) stroke, but with pressure to the accumulator being reduced through the Class B fluid power transformer after passing through a fluid transposing switch 310, as shown in switching arrangement SSS4 in quadrant Q3, also shown in FIG. 51;

FIG. 12 is a schematic representation similar to FIG. 11 with the WEC operating in the return stroke (equivalent to motor stroke), with pressure from the accumulator being boosted through the Class B fluid power transformer after passing through a fluid transposing switch, as shown in switching arrangement SSS1 in quadrant Q1, also shown in FIG. 50;

FIG. 13 is a schematic representation similar to FIG. 12 with the WEC operating in the return stroke (equivalent to motor stroke), with pressure from the accumulator being reduced through the Class B fluid power transformer after passing through a fluid transposing switch, as shown in switching arrangement SSS2 in quadrant Q1, also shown in FIG. 50;

FIG. 14 is a schematic representation of the Class C transformer in pressure boost in Q3, similar to FIG. 6;

FIG. 15 is a Class C representation in pressure reduce in Q1, similar to FIG. 8;

FIG. 16 is a schematic representation of the Class A transformer in pressure boost in Q1, similar to FIG. 8 except double-acting;

FIG. 17 is a Class A representation in pressure reduce in Q1, similar to FIG. 9 except double-acting;

FIG. 18 is similar to FIG. 16 except in Q2;

FIG. 19 is similar to FIG. 17 except in Q2;

FIG. 20 is a Class A representation in pressure boost in Q3, similar to FIG. 10 except double-acting;

FIG. 21 is a Class A representation in pressure reduce in Q3, similar to FIG. 11 except double-acting;

FIG. 22 is similar to FIG. 20 except in Q4;

FIG. 23 is similar to FIG. 21 except in Q4;

FIG. 24 is a Class B representation in pressure boost in Q1, similar to FIG. 12 except double-acting;

FIG. 25 is a Class B representation in pressure reduce in Q1, similar to FIG. 13 except double-acting;

FIG. 26 is similar to FIG. 24 except in Q2;

FIG. 27 is similar to FIG. 25 except in Q2;

FIG. 28 is similar to FIG. 24 except in Q3;

FIG. 29 is similar to FIG. 25 except in Q3;

FIG. 30 is similar to FIG. 28 except in Q4;

FIG. 31 is similar to FIG. 29 except in Q4;

FIG. 32 is a schematic representation similar to that of FIG. 34, except with the WEC operating in return stroke (equivalent to motor stroke), in quadrant Q1, with pressure from the accumulator being boosted through a Class C fluid power transformer (also shown in FIG. 54 SSC1), and is similar to FIG. 8 which employs a Class A fluid power transformer in switching state SS1 and to FIG. 12 which employs a Class B fluid power transformer in switching state SSS1;

FIG. 33 is a Class C representation in pressure boost in Q2;

FIG. 34 is a schematic representation of hydraulic fluid energy conversion equipment of a wave energy conversion system in accordance with the present invention, with the WEC operating in power-stroke (equivalent to regeneration stroke) in quadrant Q3, to boost pressure through a Class C fluid power transformer (also shown in FIG. 55 SSC3) and transfer fluid to storage in an accumulator, and is similar to FIG. 6 which employs a Class A fluid power transformer in switching state SS3 (also shown in FIG. 47), and to FIG. 10 which employs a Class B fluid power transformer in switching state SSS3 (also shown in FIG. 51 SSC3);

FIG. 35 is a Class C representation in pressure boost in Q4;

FIG. 36 is a schematic representation of a third embodiment of wave energy conversion system in accordance with the present invention, with the WEC operating in power stroke, the WEC being represented by a piston with multi-cylinder assembly below divided into two groups, each represented by a single cylinder, with one cylinder group connected to transfer fluid directly to a fluid energy swing accumulator in this embodiment, and with pressure from the second cylinder group being boosted through the fluid power transformer and fluid flowing to storage in the high pressure accumulator, with operation in quadrant Q3 with fluid transformer in switching state SS3, with fluid transformer configuration also shown in FIG. 47;

FIG. 37 is a schematic representation similar to FIG. 36, except with the WEC operating in return stroke (equivalent to motor stroke) with fluid from the energy swing accumulator acting to return the piston to its top position, with operation in quadrant Q1, with fluid transformer in switching state SS1, with fluid transformer configuration also shown in FIG. 46;

FIG. 38 is a schematic representation of a fourth embodiment of wave energy conversion system in accordance with the present invention, with operation in quadrant Q3, with fluid transformer in switching state SS3 shown in FIG. 47;

FIG. 39 is a quadrant legend sheet that shows the arrangement of the figures in single acting and double acting in quadrants Q1 to Q4;

FIG. 40 is a perspective view, similar to FIG. 1, of components of another embodiment wave energy system, known herein as WEC-Type-II 900, each with two sets of helical hydraulic rotary actuators 902, 904, controlling a single deflector 901, similarly mounted on the ocean floor 20 near shore, and similarly connected by cables 906, 907 (not shown) laid on the seabed from a utility on shore, with parts shown diagrammatically;

FIG. 41 is a perspective view of one of the WEC-Type-II 900 with the two hydraulic rotary actuators 902, 904, positioned to where the deflector 901 is in it's lowest position in shallow water, namely in the start position to create waves and propel them to the left to a recreational area near shore, or alternatively in the final position after harvesting wave energy moving from offshore on the left of the figure to the right near shore;

FIG. 42 is similar to FIG. 41, except with the deflector 901 further advanced in wave making mode;

FIG. 43 is similar to FIG. 42, except with the deflector 901 even further advanced in wave making mode;

FIG. 44 is similar to FIG. 43, except with the deflector 901 even further advanced in wave making mode;

FIG. 45 is a flow diagram of operation of a wave energy conversion system in accordance with the present invention;

FIG. 46 is an isometric view of a multi-dimensional cube expression of a Class A fluid power transformer applied to translating and rotating actuator(s) in four-quadrants of motion viewed substantially from the motoring side showing quadrants Q1 and Q2, and switching states SS1 and SS2 for boosting and reducing pressure, respectively, (return stroke, equivalent to motor stroke) and as shown in FIGS. 8 and 9, respectively;

FIG. 47 is similar to FIG. 46 except viewed substantially from the regenerating side, showing quadrants Q3 and Q4 and switching states SS3 and SS4 for boosting and reducing pressure, respectively, and as shown in FIGS. 6 and 7, respectively;

FIG. 48 is similar to FIG. 46 except viewed from the actuator device side with the transformer(s) in edge view, on the right and left, and the actuator(s) in translation and in rotation, showing quadrants Q1 to Q4, with the swashblock actuator in the forward position, and the cross-over switch in positions CO1, CO2, CO1 and CO2, respectively;

FIG. 49 is similar to FIG. 48 except with the swashblock actuator arm moved to the reverse position with motor rotation reversed;

FIGS. 50 to 53 show the Class B transformer in switching states SSS1 to SSS4, respectively, corresponding to switching states SS1 to SS4, respectively, as shown in FIGS. 46 to 49 for the Class A transformer, and as shown in FIGS. 12 and 13 and 10 and 11, respectively for the Class B transformer;

FIGS. 54 to 57 show the Class C transformer in a form of expression similar to the expressions of Class A and Class B transformer embodiments shown in FIGS. 46 to 49 and FIGS. 50 to 53 respectively;

FIGS. 58 and 59 shows two Class A transformers in paralleling mode in readiness for the final step of closing the last switch, which also applies to all the other inventive transformers in this application, including fixed displacement types with the addition of the 4-way fluid transposition switch shown at the motor and pump terminals;

FIGS. 60 and 61 show the closest related art, from the Achten transformer application, in motoring and regenerating mode together with the inventive Class A transformer in SS2 and SS4, respectively.

Figure 62:
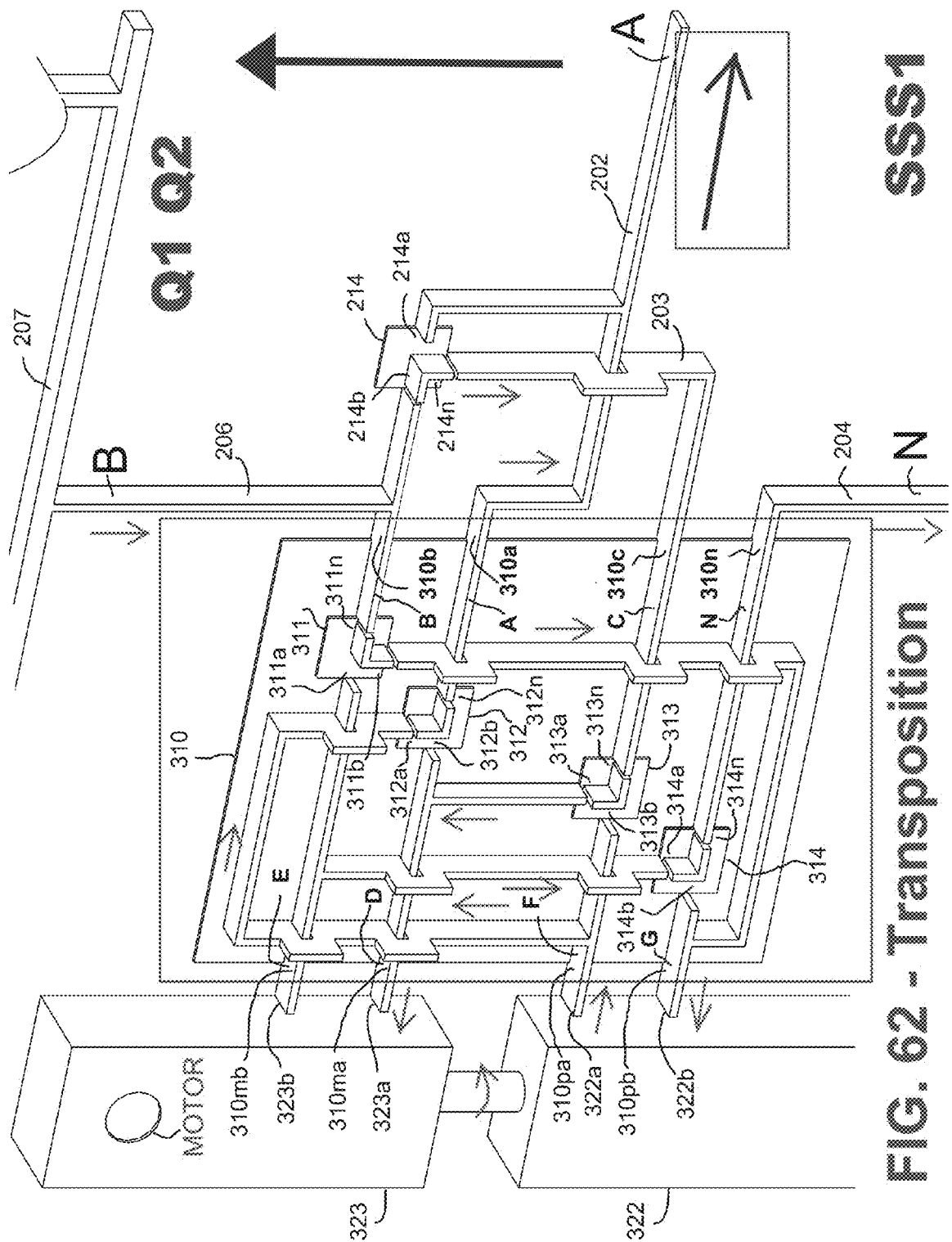
Figure 63:
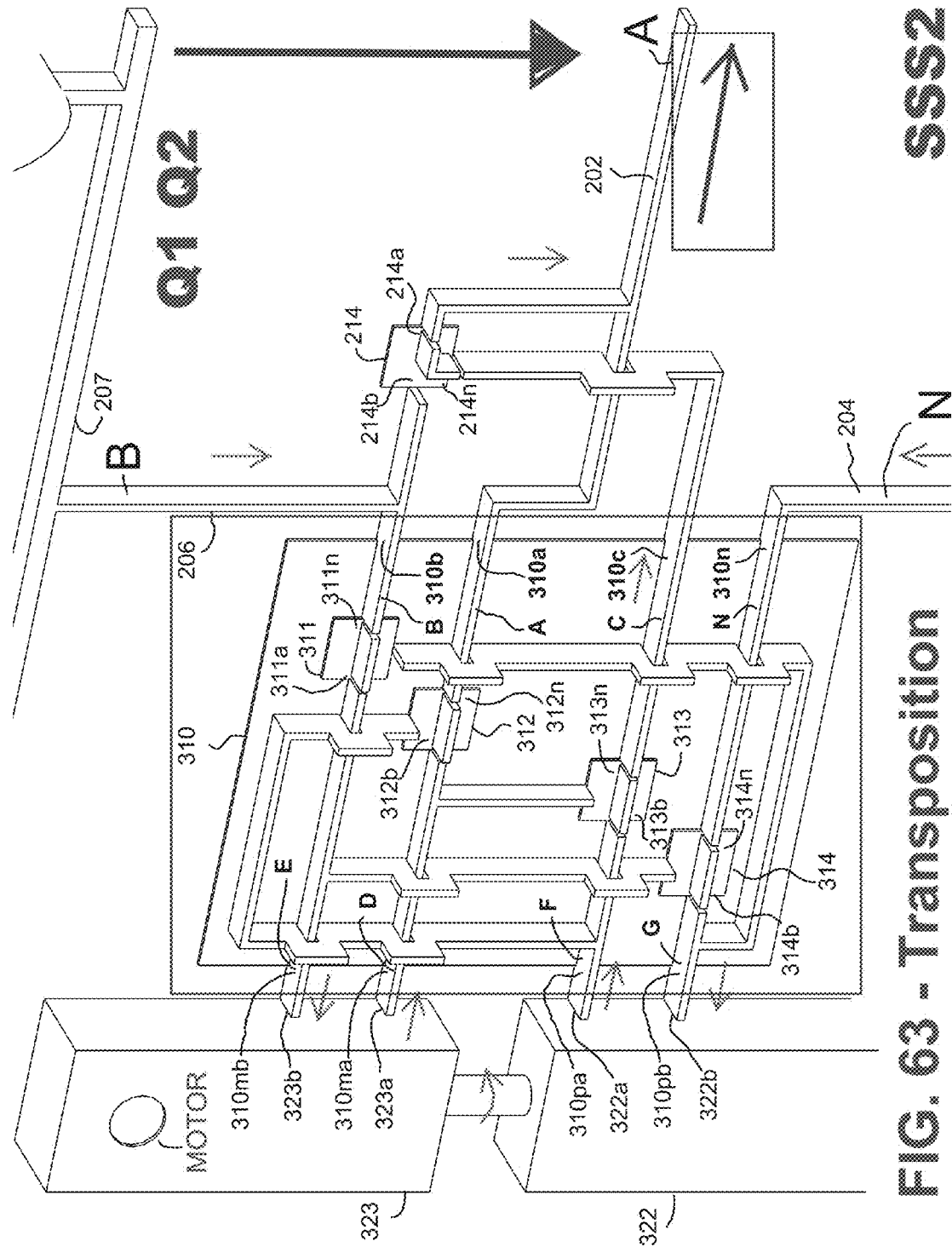

FIG. 62 and FIG. 63 are multi-dimensional cube representations of the switching states SSS1 and SSS2 of FIGS. 12 and 13, respectively.

Figure 64:
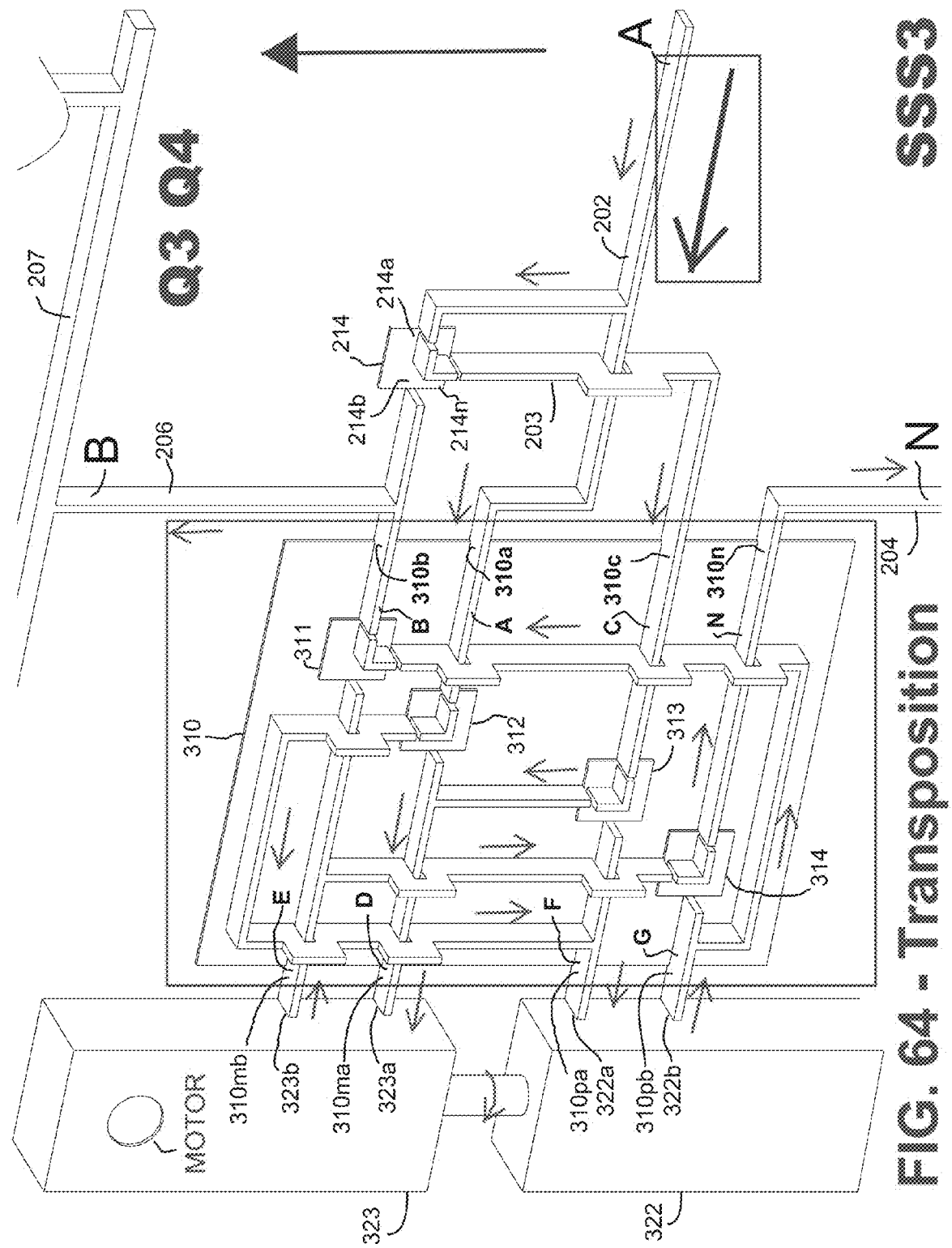
Figure 65:
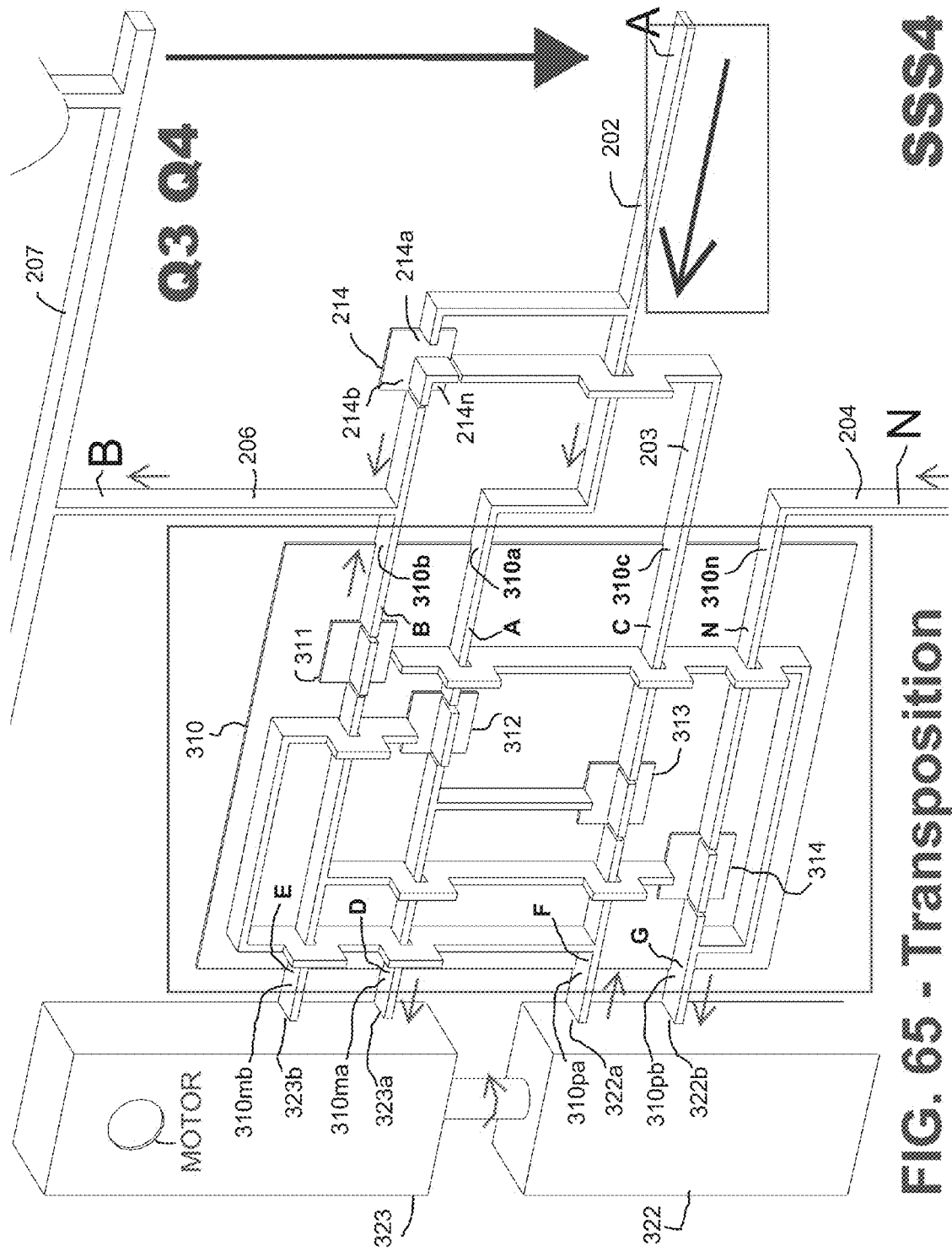

FIG. 64 and FIG. 65 are multi-dimensional cube representations of switching states SSS3 and SSS4 of FIGS. 10 and 11, respectively.

Figure 66:
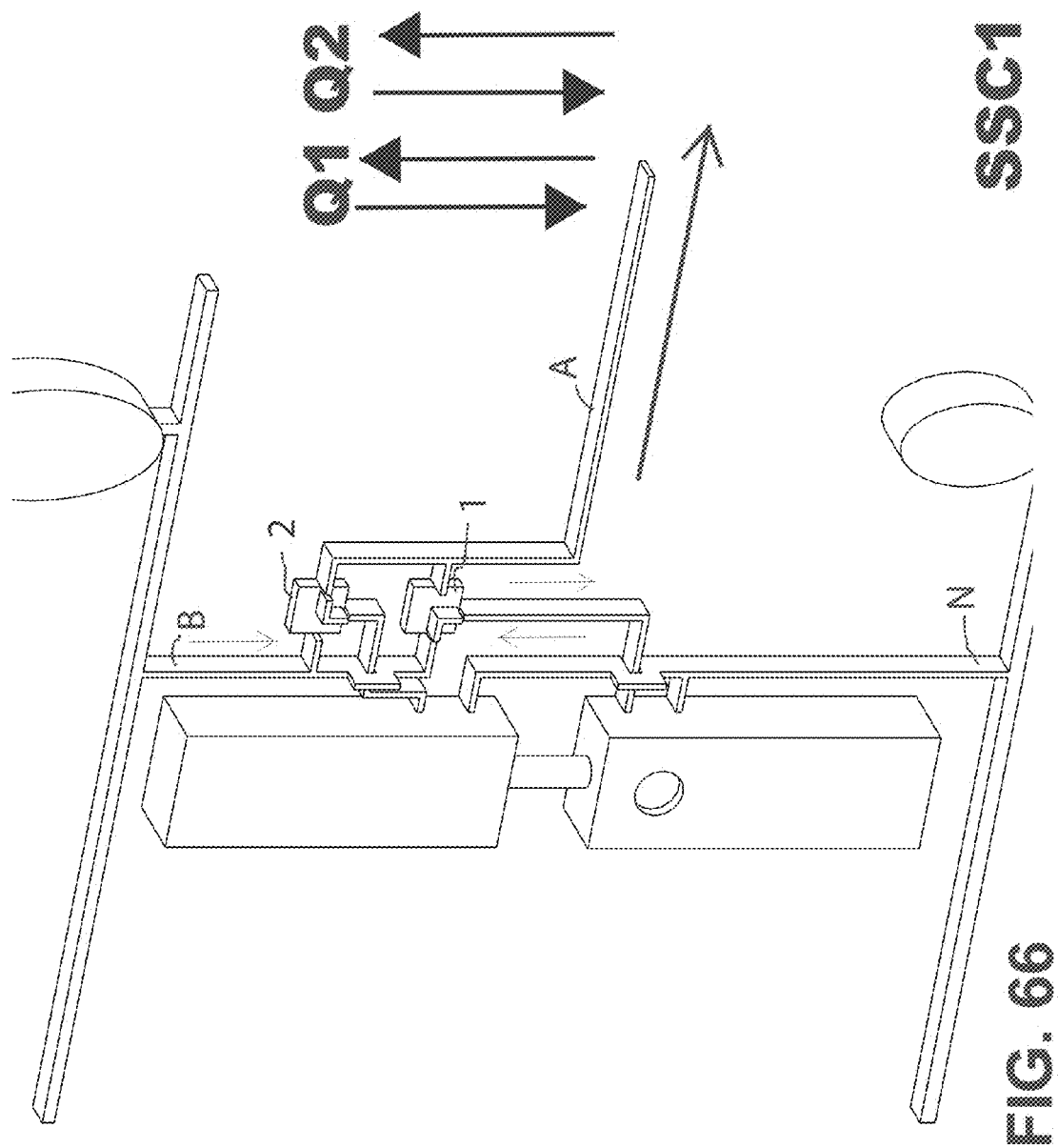
Figure 67:
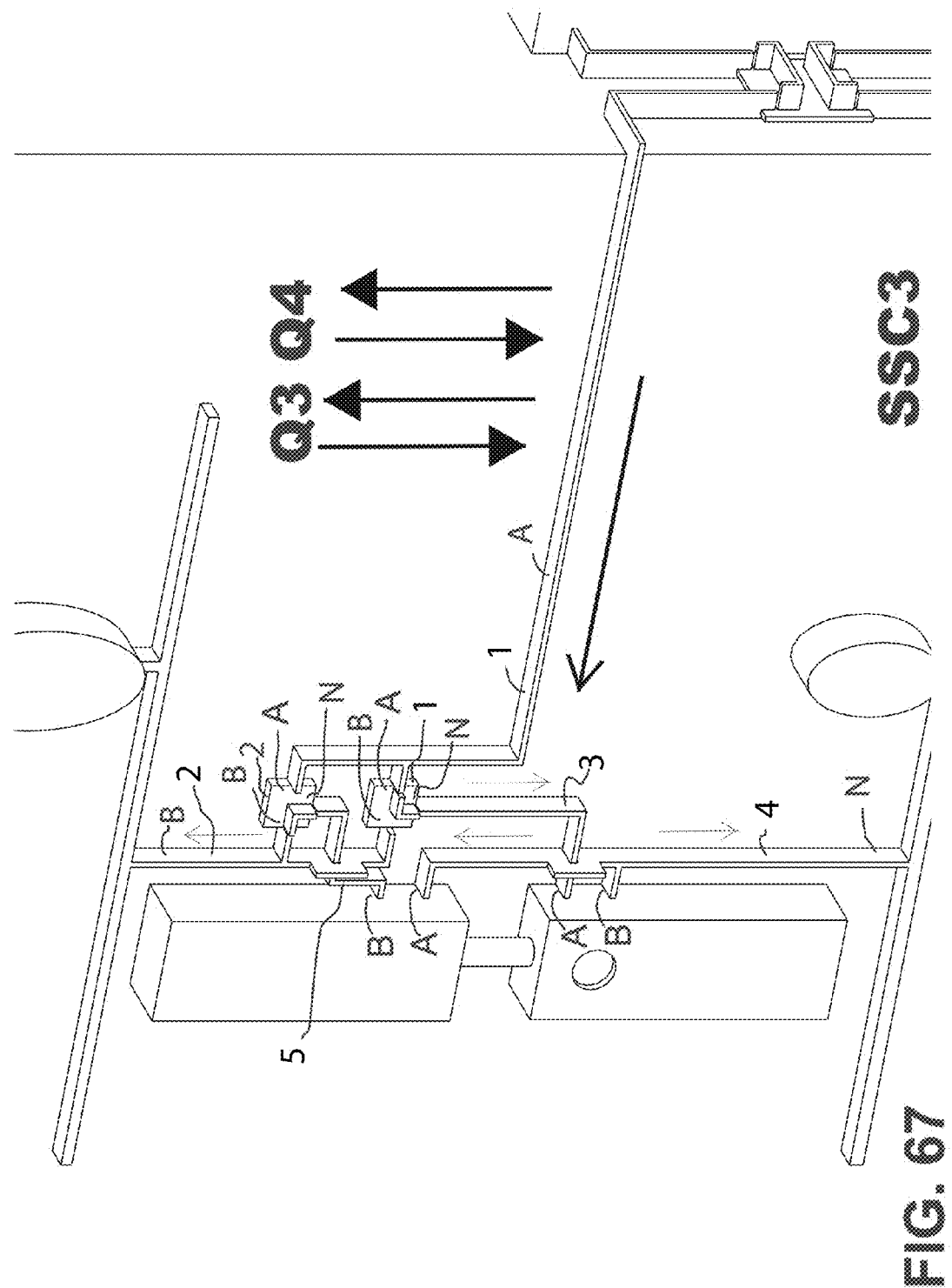

FIG. 66 and FIG. 67 are multi-dimensional cube representations of switching states SSC1 and SSC2 of FIGS. 15 and 14, respectively.

FIG. 68 shows a conceptual drawing of a known electric power distribution system alongside an analogous hypothetical hydraulic distribution system.

Artisans of electronic filing will appreciate the overview afforded by scrolling the mouse wheel while in full page view. For example a quick overview of the inventive fluid power transformer is had by scrolling from FIGS. 46 to 61, and 68. Then clicking the Destination tabs after first aligning the tabs in easy readable order by first clicking on the pages header to put the destination tabs in the pages order. For example, clicking tabs SS1, SSS1, SSC1 provides a close comparison of transformer embodiments Class A, Class B and Class C, respectively, of boosting fluid pressure in Q1 motoring mode. Then clicking 'Previous View' twice on the Acrobat Reader dashboard to step back to SS1, and 'Next view' to retrace the steps to SSSC1. The Achten transformer in motoring mode can be similarly included as a step in the sequence of comparison.

DETAILED DESCRIPTION OF THE INVENTION

Glossary

"Terminal" or "line terminal" means a connection point of a hydraulic fluid line to a port of a hydraulic fluid device, such as "input terminal" means a point of flow into a device such as a hydraulic motor, pump, accumulator, "fluid power transformer," and so on, and "outlet terminal" means a point of flow out of a hydraulic device;

"cylinder assembly switching state" means valve positions setting the number of cylinders in groups for operation below a piston thereby adjusting the ratio of wave pressure to fluid pressure at the terminal of the cylinder assembly, where state one means all cylinders in operation, providing lowest fluid pressure and highest fluid flow in communication with the fluid power transformer, and may also include, in the alternative, a second group of cylinders whose fluid flow by-passes the fluid power transformer and communicates directly with an accumulator for that purpose;

"fluid power transformer" means a device of a known configuration (Class C) or an inventive configuration (Class A or Class B) that transforms fluid power from one particular combination of pressure and flow at the input terminals to another combination of pressure and flow at the output terminals, analogous to an electric power transformer, and also includes a Class C transformer with an inventive switching arrangement;

"fluid transposing switch" also known as a "transposition switch" means a switching device for use with a fluid power transformer comprising multiple two-way valves, (2-position, 3-port) with a position indicator mechanism, for transposing the fluid lines to a hydraulic motor with the fluid lines to a hydraulic pump in the configuration where a pump serves in place of a fluid motor operating in regenerative mode, aka a mutually exclusive motor pump arrangement, as opposed to a mutually interchangeable arrangement in the absence of said switch;

"fluid piping network switching state" means a particular set of fluid control valve positions and motor displacement settings that facilitate hydraulic fluid flow through the fluid power transformer during a power-stroke and return-stroke power production cycle, namely SS1 to SS4, with a Class A transformer, and a second set of switching states SSS1 to SSS4 with a Class B transformer;

"multi-dimensional cube" means a 3-Dimensional structural representation and/or expression of the method of control of the inventive transformer, showing fluid switching states, motor and regenerating modes of actuator control, with Class A, Class B and Class C transformers;

"fluid energy swing" means a system for transferring fluid energy between a power-stroke and a return-stroke by communication between a hydraulic cylinder assembly and an accumulator without need for hydraulic rotary equipment;

"ocean-wave-degree" means a unit of measurement in units of time or distance, equivalent to the period of an ocean wave divided by 360, the number of degrees in a wave cycle, used in a context analogous to degrees-before-top-dead-center as commonly shown on a scale on an engine block for advancing ignition timing for internal combustion engines; for example, a wave period of 18 seconds computes to a wave speed of 20 ocean-wave-degrees per second;

"wave state vector" means a two-dimensional vector representation of the wave within a computer control system, which includes separate vectors for the wave peak and the wave trough, the "wave peak vector" defines the location of the vertical axis of the wave crest in units along the x-axis corresponding to distance in feet from piston center, and the elevation of the wave crest in units along the y-axis corresponding to elevation in feet relative to the top of shell opening; the wave trough vector defines the location of the vertical axis of the wave trough in units along the x-axis corresponding to distance in feet from piston axis center, and elevation of the wave trough represented in units along the y-axis corresponding to elevation in feet relative to the top of shell opening; the wave peak vector minus the wave trough vector equals the wave vector, the real component of which equals the horizontal distance between the peak axis and trough axis of the wave and the imaginary or quadrature component equals the wave height in absolute terms; the wave vector is used within the computer to select those waves that can be harvested efficiently as they approach the WEC; other wave vectors may be computed to monitor distant waves as they approach from farther off-shore;

"vector drive" means a system with computer control for optimal functioning of the WEC, which includes sensing a train of on-coming waves, computing their wave state vectors, setting the switching states for the cylinder assembly and the fluid power transformer for various operating conditions as they develop, initiating and controlling the transmitting of energy during the power-stroke-return-stroke power production cycle, and transmitting electric power across the underwater cables to a user on shore.

"lowerator" means an accumulator with a gas pressure analogous a known hydraulic cylinder type shock-absorber, or analogous to a known serving dish lowerator where springs are used to reset the top dish to be level with the counter top surface.

Operation overview of the Vector Drive is explained with reference to FIG. 43 and the power-stroke shown as it would begin in FIG. 2. An optimum state estimator algorithm within the WEC control computer computes the wave vectors and the energy capability of the WEC for a complete power-stroke-return stroke cycle, and uses that dynamic model to control WEC operation. The fluid energy passes from the cylinder assembly below the main piston, through the fluid power transformer to the accumulator during the power-stroke and from the accumulator back through the fluid power transformer to the cylinder assembly to lift the piston during the return-stroke. As the wave crest moves over the top of the piston, seconds in advance of the axis of the crest aligning with the axis of the piston, say 30-35 ocean wave degrees in advance of top-dead-centre of the vertical axis of the piston, the computer switches the fluid piping network and the fluid flow by displacement control of the hydraulic rotating devices as shown in FIG. 6 or FIG. 7, to start the piston in motion and achieve maximum force-times-distance through the power-stroke, similar to that of an engine when ignition is applied say 30-35 mechanical degrees in advance of top-dead-centre for maximum torque. Similarly during the return-stroke, shown as it would begin in FIG. 3, seconds before the wave trough axis aligns with the piston axis, the computer switches the fluid piping network and the fluid flow by displacement control of the hydraulic rotating devices as shown in FIG. 8 or FIG. 9, and hydraulic cylinders return the piston to top position, while discharging seawater like a combustion engine discharges exhaust gases. When wave heights are less than design maximum for the converter, the stroke is reduced so as not to waste energy for an unnecessarily long return-stroke.

Consider an ideal system with no losses and the WEC operating in a calm sea with the shell submerged. The fluid energy generated during power-stroke equals the fluid energy consumed to return the piston to top position. Energy for hydraulic fluid system losses, is drawn from storage in an accumulator, analogous to fuel drawn from the fuel tank for engine losses while idling a combustion engine. Selecting the appropriate "cylinder assembly switching state" is analogous to shifting gears up and down, in accordance with wave height, to keep cylinder operating pressure as close as possible within the high efficiency operating range of about 20% pressure variation between input and output for the preferred fluid power transformer, which in turn is optimally adjusted to facilitate flow and minimize fluid transmission losses.

Computer optimal control techniques are commonly used in state-of-art motor vehicles. The operation of the main power piston of the inventive WEC is analogous to the operation of the pistons in an internal combustion engine. The inherent variable-piston-displacement feature of the WEC is analogous to the displacement-on-demand feature of current-art efficiency improved combustion engines, where it is claimed under light load conditions up to 4 cylinders of an 8 cylinder engine will shut down automatically to improve efficiency up to 25 percent. Optimal WEC operation follows concepts analogous to state-of-art motor vehicle terms like spark-advance before top-dead-center, combustion monitoring, feedback to adjust the ignition timing for the next power-stroke to maximize efficiency, supercharging, displacement on demand, gear-shifting, etc. In high-end automobiles, the engine and transmission control systems adapt to changing conditions, seemingly learning as the car is driven along, and readjusting to changing situations, a control strategy commonly known as sub-optimal adaptive computer control. The proposed invention uses state-of-the-art optimal control systems for monitoring power conversion operation to maximize efficiency and computer graphics for displaying performance, and the on-coming wave. An algorithm in the computer control system provides a running state estimate of the ocean wave as it approaches within about one wave length of the converter. Optimal control is achieved with state-of-art computer control devices commonly called PLC and DCS controls, which receive input from sensors on all aspects of the inventive WEC and particularly pressure along the seabed under the on-coming waves.

An important object of the invention is to transmit hydraulic fluid energy substantially more efficiently than state-of-art fluid transmission through to the electric generator, and particularly through the fluid power transformer, where losses are concentrated in state of art devices. The fluid power transformer serves to transfer energy from the converter piston during the power-stroke to the accumulator and from the accumulator to the converter piston during the return-stroke. The fluid power transformer is optimally adjusted to facilitate flow and minimize energy losses: during the power-stroke output pressure is amplified to match pressure in the accumulator as pressure gradually rises as energy is accumulated. Flow is continually adjusted to optimally control piston velocity throughout the power-stroke to maximize energy in each stroke, minimize energy losses, and maximize overall efficiently. Part of the flow during the power-stroke is directed to a low pressure accumulator to provide a pressure float for the return-stroke to minimize return-stroke energy. At the bottom of the power-stroke, the fluid power transformer is switched to facilitate the return-stroke and the optimizing function repeated to minimize the energy expended to discharge the seawater into the lowest point in the wave trough, return the piston to the top position and await the next wave crest to move into position, and then open the valves to begin the power-stroke.

Efficiency of the inventive WEC is substantially improved with the inventive fluid power transformer over the state-of-art, over the entire range of operating conditions, including boosting and reducing pressure, for both forward and reverse power flows. For efficiency comparison, the best choice of fluid power transformer state-of-art for the inventive WEC application consists of a variable displacement driving motor rotatably coupled to a variable displacement pump. Driving torque equals driven torque. Flow times pressure at the input terminals is approximately equal to flow times pressure at the output terminals when losses are small. An ideal fluid power transformer has no losses. Known state-of-art fluid power transformers pass all the energy through two rotary devices rotatably connected in series such that losses of the driving motor compound the losses of the driven pump resulting in high overall losses. The former of these Class C fluid power transformers are described in the patent of the Kouns, and the latter in the patent of Achten. Achten taught use a single rotary device to which is added an additional port. Returning now to describe the efficiency advantage of the inventive Class A and Class B fluid power transformers.

For example, 80% transmission efficiency for each rotary unit compounds to an input requirement which computes as (1/0.80/0.80) to 1.56 per unit input for 1.0 per unit output, or 64% transmission efficiency overall, and 36% losses.

In contrast the inventive fluid power transformer is configured so both rotary devices are connected at a common terminal, that being the input terminal when output pressure is to be increased, and that being the output terminal when output pressure is to be reduced, and a third terminal being the low pressure out flow terminal when output pressure is to be increased, and being the low pressure inflow terminal when output pressure is to be reduced, with the result that for pressure changes of less than 50% most of the power transmitted by-passes the rotary devices and in this way substantially lower losses and substantially higher transmission efficiency is achieved which is apparent from the shaft torque being much lower than state-of-art, for the same power flow. In the inventive fluid power transformer, the discharge device can be a pump or driven motor in regenerative mode, which is driven by the input motor. (The said low pressure terminal connects to a low pressure accumulator which is switchable to a reservoir at atmospheric pressure.) For example when output pressure is boosted relative to input pressure, (through fluid flow is reduced in proportion), the driving motor needs only supply a motor load equivalent to the pumping or driven motor load (regenerative motor load) which is the product of the incremental increase in output pressure and total output flow plus losses for pumping.

For example to boost pressure 10%, power losses by the output motor operating in regenerative mode, as measured at the input shaft to the regenerative motor, are the product of 10% pressure boost and 90% fluid flow and the efficiency factor for this condition which, to use 80% efficiency to be consistent with the prior art example, computes as (0.10× 0.90/0.80) to approximately 0.1125 per unit input to the shaft of the regenerative output motor. Total fluid power to the input motor including losses computes as (0.1125/0.80) to 0.1406 per unit, of which 0.09 per unit is transmitted by the regenerative motor through to the fluid power transformer output terminals. Total losses for the inventive fluid transformer compute to 0.0506 per unit or 5.06%, and overall transmission efficiency computes to approximately 95% compared to 64% efficiency for the aforementioned state-of-art fluid power transformer—with the result that 48% more energy is available for generation.

For example to boost pressure 20%, power losses by the output motor operating in regenerative mode, as measured at the input shaft to the regenerative motor, are the product of 20% pressure boost and 80% fluid flow and the efficiency factor for this condition which, to use 80% efficiency to be consistent with the prior art example, computes as (0.20× 0.80/0.80) to approximately 0.2000 per unit input to the shaft of the regenerative output motor. Total fluid power to the input motor including losses computes as (0.2000/0.80) to 0.2500 per unit, of which 0.16 per unit is transmitted by the regenerative motor through to the fluid power transformer output terminals. Total losses for the inventive fluid transformer compute to 0.09 per unit or 9%, and overall transmission efficiency computes to approximately 91% compared to 64% efficiency for the aforementioned state-of-art fluid power transformer—with the result that 42% more energy is available for generation.

Similarly for a 50% boost in output pressure, power to the input shaft of the regenerative motor computes as (0.5×0.510.80) to 0.3125 per unit, fluid power to the input motor computes as (0.3125/0.80) to 0.3906 per unit, of which 0.25 per unit is transmitted by the regenerative motor through to the output terminals. Total losses compute as (0.3906-0.25) to 0.1406 per unit or 14.06%, and overall transmission efficiency computes to about 86% for a pressure boost of 50%, compared to 64% efficiency for the aforementioned state-of-art fluid power transformer—with the result that 34% more energy is available for generation.

From 42% more to 34% more electric power can be generated by use of the inventive fluid power transformer in the pressure change range of 20% to 50%, compared to state-of-art fluid transformation means. It is preferable that maximum hydraulic system transmission efficiency be realized by selecting a cylinder switching state so the fluid pressure transformer operates within a pressure change range of about 20%.

The same holds true when output pressure is reduced relative to input pressure and fluid through-flow is increased, the additional flow coming by way of the output motor in regenerative mode pumping from the low pressure terminal, as the configuration is essentially the same as if flow through all elements of the fluid power transformer are reversed and the fluid transformer is viewed from the opposite direction.

For purposes of this proposal the fluid power transformer with the aforementioned inventive configuration is known in this document as the Class A configuration because it is substantially higher efficiency than the state-of-art configuration which is known in this document as the Class C configuration. It is preferred that the hydraulic motor units have a reversible variable displacement feature with a plus-100-percent-to-minus-100-percent range for added flexibility. In an alternative inventive configuration to the aforementioned Class A configuration, a further inventive fluid power transformer configuration comprises a pump in place of a motor operating in regenerative mode. The motor and pump are rotatably connected by a common shaft and fluid lines connected by way of fluid transposing switch comprising four 2-way valves so the pump is always in place of the regenerative motor and the inventive configuration including said transposing switch is known in this document as the Class B configuration.

The vector drive is the overall control system for the wave energy converter which includes the cylinder assembly below the piston, the fluid power transformer(s), the accumulator(s) and the hydraulic motor(s) that drive the electric power generator(s).

The vector drive takes ocean power in the form of alternating ocean waves of variable frequency, computes the wave particulars, and converts wave power to alternating current electric power of constant frequency in synchronism with the electric utility receiving the power. The vector drive of the inventive WEC is analogous to a mirror image of known electric power system art, where variable frequency drives take power from a constant frequency source, convert it to direct current power and then invert it to variable frequency alternating current power to drive an induction motor at a predetermined speed and direction which corresponds to the frequency and phase sequence, respectively, of the power produced. The inventive vector drive for ocean wave generation, where electric power is used to generate waves, is the mirror image of the inventive vector drive for power generation.

In the known electric power system, inertia effects are minimized for fast response by using induction motors and extremely fast solid-state circuitry for switching voltage and current. Similarly, in this inventive WEC, inertial effects are minimized for fast piston response. The underside of the converter piston is fixed to a rigid structural aluminum frame, with mass kept to a minimum, allowing the piston to respond quickly when the valves are opened to begin the power-stroke (equivalent to regenerative stroke), and stop quickly at the end of the power-stroke, then restart quickly into the return-stroke (equivalent to motor stroke) to exhaust water from the converter chamber into the wave trough, and stop again at top position—a total of 2 stops and 2 starts per WEC cycle.

The fluid power transformer in combination with the accumulator going through power-stroke and return-stroke functions analogous to a flywheel in a combustion engine, except that fluid transfer losses are much higher than bearing losses and judicious operation is required to minimize fluid power losses. It is another object of the inventive WEC to provide means for energy exchange without significant efficiency losses, in the nature of a fluid energy swing more closely analogous to a flywheel effect, between the piston and an accumulator directly without rotary hydraulic motors or pumps. This fluid energy swing is analogous to a gas-pressurized shock absorber added into a motor vehicle, completely independent of other functions. The variability comes with increasing or reducing the gas pressure and the number of hydraulic cylinders in the energy swing circuit.

It is known WECs lose effectiveness as piston dimension in the direction of the on-coming wave increases to about ¼ wave length. In the preferred arrangement, the shell and the piston are elliptical with wall thickness increased near the minor diameter to strengthen the shell in the direction of the incoming wave. An elliptical converter harvests a wider swath through an incoming ocean wave, restricted only by its minor axis, whereas a circular converter, where both major and minor diameters are the same, becomes less effective as its width increases beyond ¼ wave length. An elliptical rollable annular seal functions smoothly like a circular seal, without a tendency to rotate, and a pressure surface approximately 78% of a rectangular piston surface, without the disadvantage of reduced reliability that would result from a sharp corner in a rollable seal.

General

Aspects of an embodiment of a wave energy conversion system in accordance with the present invention are shown in FIG. 1. Several wave energy converters (WEC's) 10a, 10b and 10c are installed on the ocean floor 20. Preferably the location of installation is near shore 21, where energy of waves 22 have a significant translation component toward the shore. In deeper water, the motion of water particles is more nearly orbital. As described in more detail below, each WEC has a piston designed to translate up and down as recurring waves pass over it. The piston rides in an open topped shell to which it is sealed such that the volume of the shell bound at the top by the piston varies. The interior volume of each WEC is vented to the atmosphere, such as by a vent pipe 15a, 15b, or 15c, which is sufficiently tall as to extend above the water. Alternatively, or additionally, communication to the atmosphere can be shared by way of vent piping 12a, 12b, and 12c that communicates with a shared vent pipe 16, by way of canister 11 mounted closer to the shore. Canister 11 with its shared vent pipe 16 serve as an alternate communication vent to atmosphere where high waves may be over topping the individual vents on the WECs.

In the embodiment represented in FIG. 1, the WECs are offset relative to the incoming wave crest 26 and trough 27. Thus, the pistons of the individual WECs, which act independently, do not reciprocate in synchronism. Rather, the pistons move down and up sequentially for a smoother power flow. More specifically, in a representative embodiment the most seaward WEC 10a will first encounter the wave crest 26 and operate in a downward power stroke, followed by the next most seaward WEC 10b, and finally the least seaward, WEC 10c. The return stroke of each piston occurs as the wave trough 27 passes over. The up and down reciprocation of the pistons drives a system of hydraulic cylinders, there being multiple hydraulic cylinders beneath each piston. Hydraulic fluid pressurized in the down stroke ultimately drives one or more rotary hydraulic motors connected to an electric generator. Energy of the pressurized hydraulic fluid can be stored in accumulators. Power and system control cables 23 connect the WECs to an electrical distribution surface structure 24 of an under ground electrical distribution system on shore. The control cables include fiber optic lines or other signal transmitting lines from a computer control center to components of the WECs and the hydraulic energy conversion system. Preferably, the control system includes an array of pressure sensors 25, which detect characteristics of incoming waves prior to the waves passing over the WECs. The computer control system 10 calculates characteristics of the individual waves, such as wave height and speed, thereby estimating the energy of the on-coming wave and controlling aspects of the wave energy conversion system accordingly.

Wave Energy Converter Construction

Figure 2:
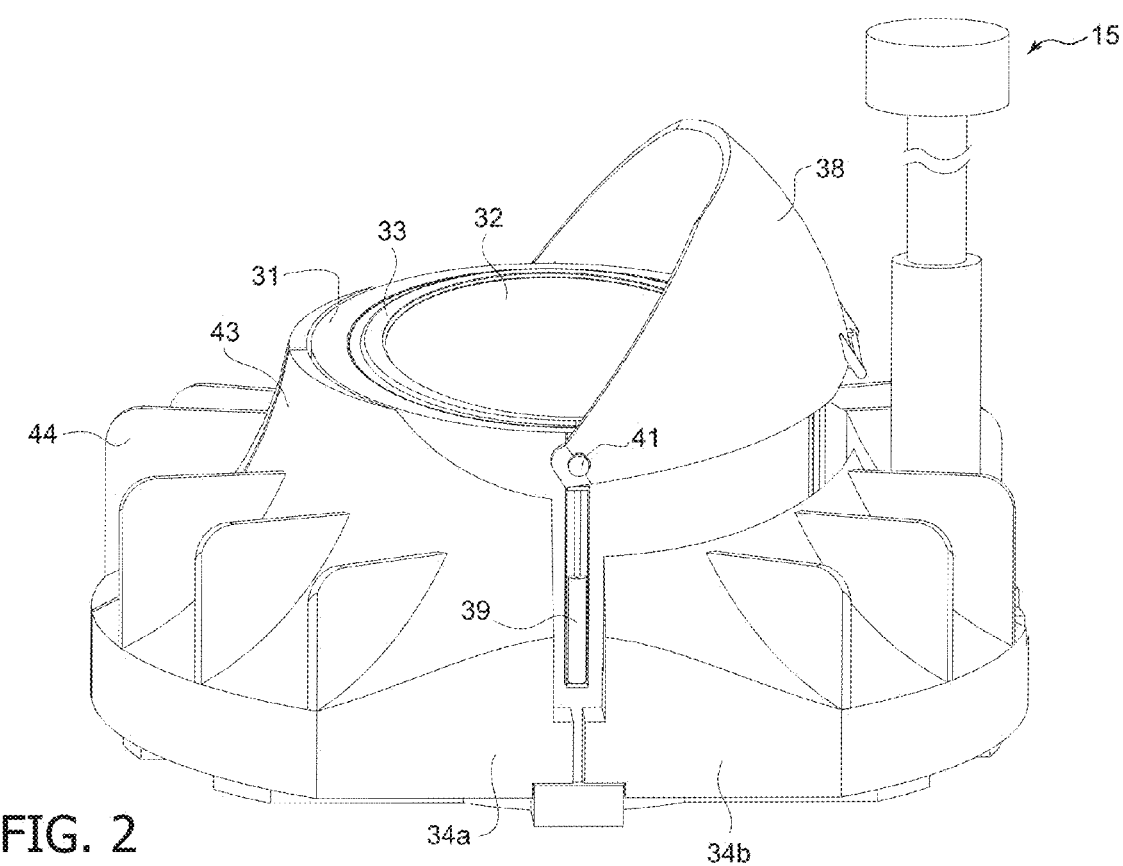
FIG. 2 is a perspective view of one of the WECs 10 of FIG. 1, such one WEC 10 having a piston at top position with a deflector 38 fully raised to capture as much energy as possible from an oncoming ocean wave during a power stroke.
Figure 3:
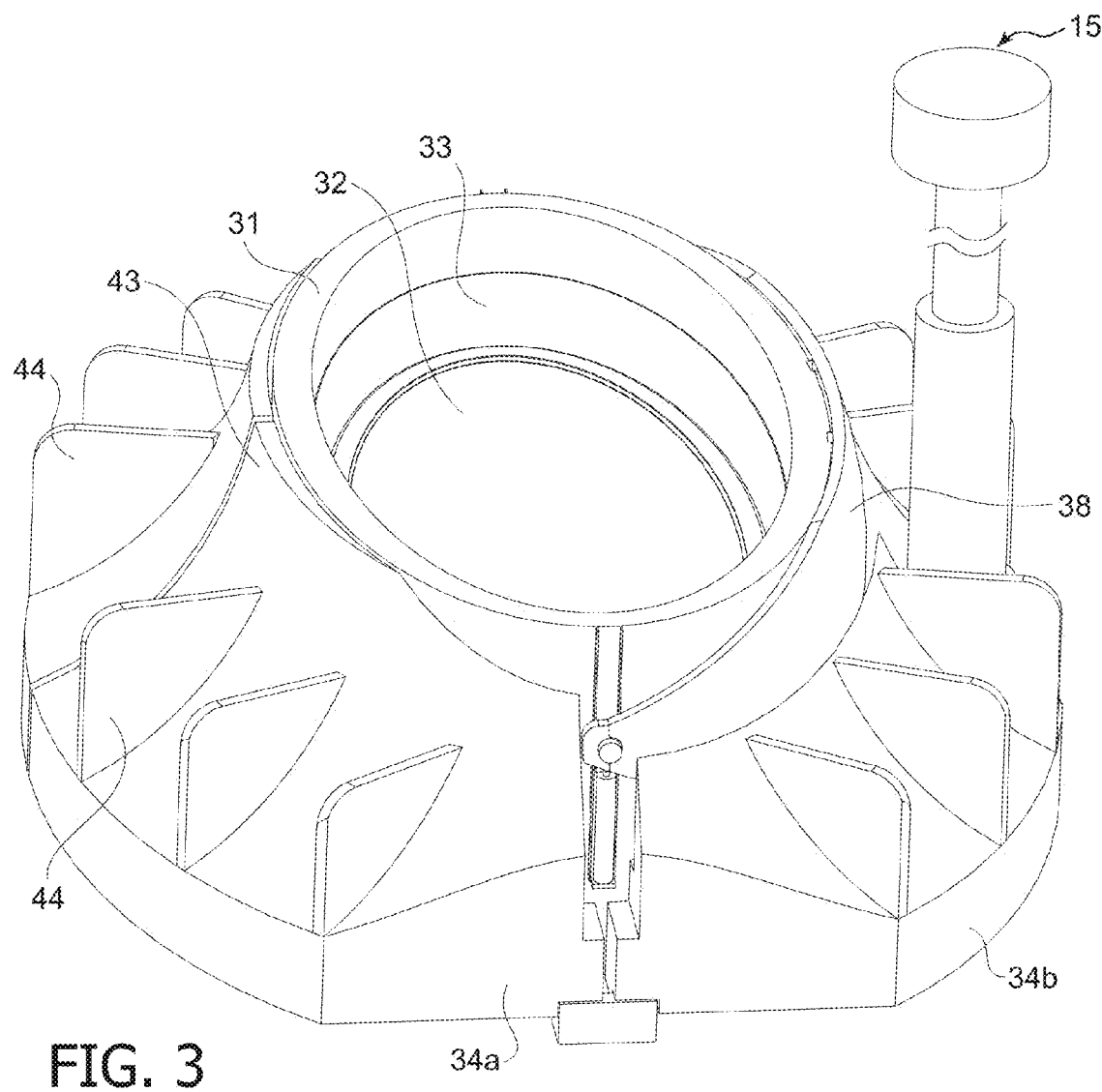
FIG. 3 is a perspective view of the WEC of FIG. 2 with parts in different positions, namely, with the piston at the lower limit of the power stroke and the deflector at its lowest position to enable sea water to be discharged into the wave trough during a return stroke.
Figure 4:
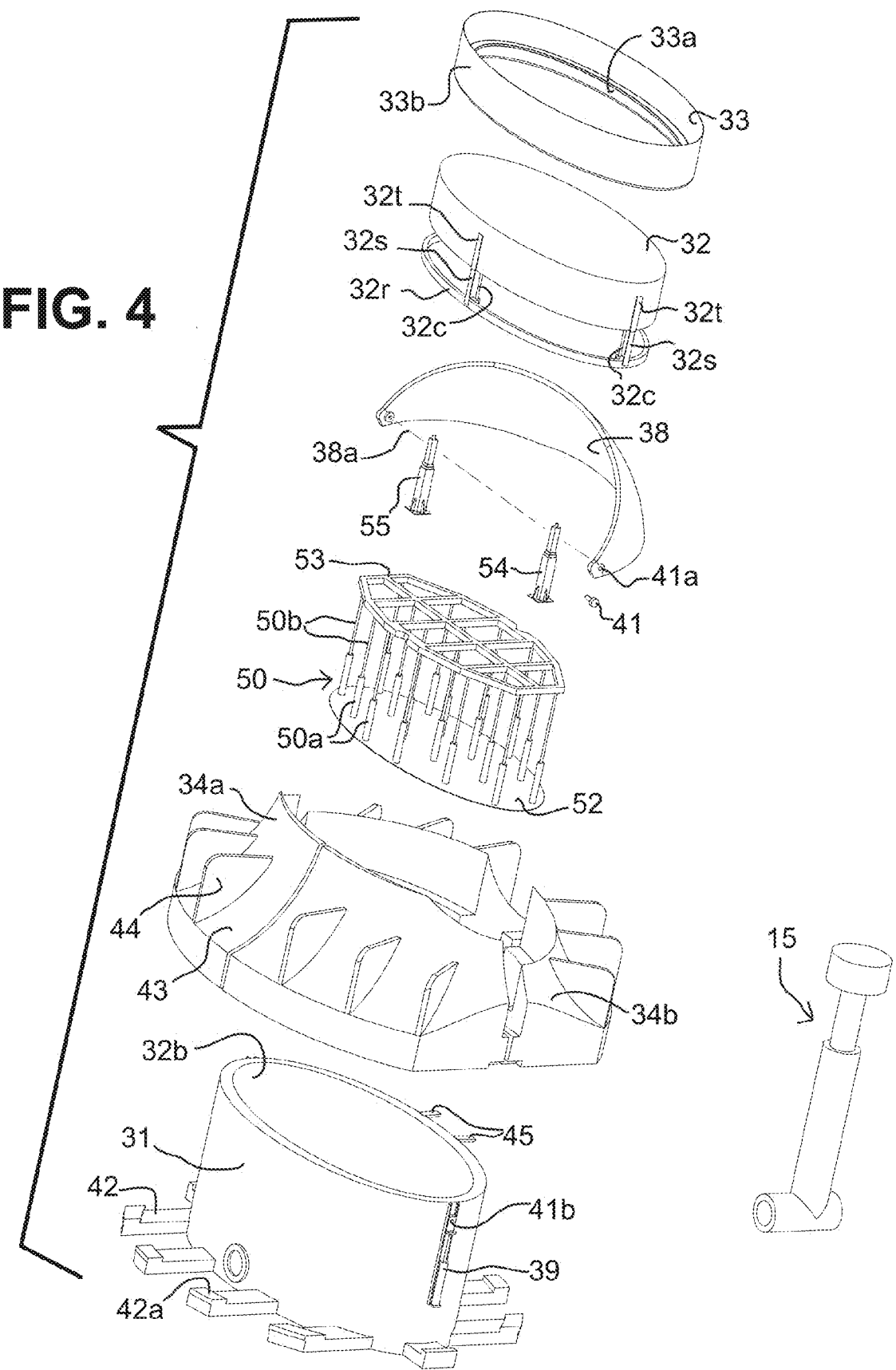
FIG. 4 is an exploded view of the WEC of FIG. 1 and FIG. 2 showing the component parts in perspective.

Aspects of an individual WEC, in accordance with the present invention, are shown in FIGS. 2-5. With reference to FIG. 4, an upright, open-topped shell 31 has an underside for resting securely on the ocean floor with the shell axis nearly vertical. After the shell is sunk to the ocean floor, a ballast of two or more parts 34a, 34b is installed on beams 42 that project outward from the lower edge portion of the shell.

Upward extending fingers 42a, at the ends of the beams 42, lock the heavy ballast pieces to the shell. Horizontal pins extending through the ballast and securely affixed to the side of the shell can also be provided. In a representative embodiment, the shell can be elliptical, with a major axis of approximately 36 feet aligned transversely to the direction of on-coming waves and a minor axis of approximately 21 feet aligned 25 approximately parallel to the apparent direction of movement of an on-coming wave.

The overall height of the shell can be 11 feet. The shell can be reinforced concrete with components of stainless steel or another suitable alloy or rigid, durable material, resistant to erosion by seawater, cast into the concrete where other components are fitted to the shell. The ballast pieces can be reinforced concrete and, accordingly, weighty enough to stably anchor the shell to the ocean floor. Such dimensions are for illustrative purposes only, and the WECs can be scaled differently, but preferably are large for significant power production in a relatively simple design.

Figure 5:
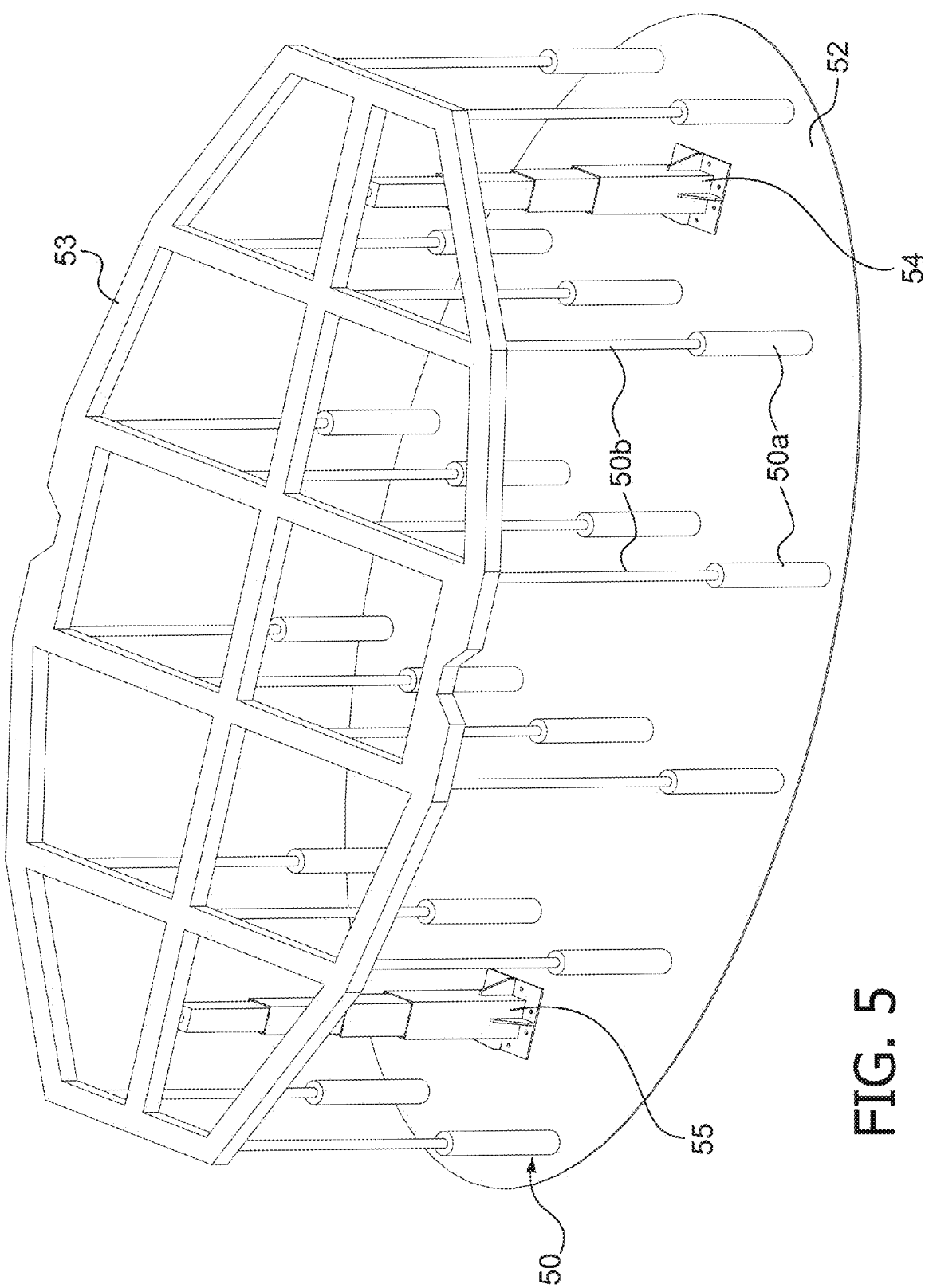
FIG. 5 is a perspective view of components of the WEC of FIGS. 1-3, namely, an assembly of hydraulic cylinders underneath the piston.

Still referring to FIG. 4, a horizontal base plate 52 is fixed to the inside bottom of the shell 31. An array of hydraulic cylinders 50 is supported on the base plate. For example, the cylinders can include the usual bodies 50a and telescoping rods or plungers 50b. The upper ends of the plungers are connected to a structural framework 53. As seen in FIG. 5, up-and-down movement of the framework is guided by telescoping columns 54, 55 having bottom ends fixed to the base plate 52 and top ends secured to the framework 53. Two such telescoping guide columns are shown in FIG. 5 but four or more may be supplied to maintain the structural framework 53 in alignment with the base plate without unduly stressing the plungers or rods of the hydraulic cylinders.

Returning to FIG. 4, the piston 32 is a cup-shaped member inverted within the shell 31, over the structural framework 53. The piston 32 fits closely over the framework and fairly close within the shell 31. The underside of the piston is secured to the top of the framework. The piston has a peripheral skirt portion that extends down along and past the periphery of the framework. A lower ring 32*r* is spaced below the bottom edge of the piston skirt and is connected thereto by collapsible pneumatic cylinders 32*c*, thereby adding to the apparent depth of the piston skirt.

Vertical slats 32*s* extend upward from the ring 32*r* and are slideable along the outside of the piston skirt. While two such slats 32*s* and pneumatic cylinders 32*c* are shown, preferably they are spaced more closely together around the circumference of the piston, such as every foot or so. In a representative embodiment, the stroke of the piston 32 is limited to about twice the vertical dimension from the top of the piston to the bottom of the ring 32*r* and about ⅔ the depth of the shell 31. A rollable annular seal 33 is connected between the piston and the interior 32*b* of the shell. An inner lip portion 33*a* of the seal has a peripheral edge secured to the top of the piston, and an outer skirt portion 33*b* of the seal is secured to the inner wall of the shell at the location corresponding to the bottom most position of the piston. The fit of the seal is water tight such that seawater is not introduced into the shell below the piston. The flexible seal material rolls up as the piston shifts upward and unrolls as the piston moves down. Slats 32*s* help prevent the flexible seal from entering the space below the piston as it moves up.

A vent 15 attaches to the side of the shell to serve as a hydraulically adjustable snorkel. The snorkel can have telescoping parts so that its height can be adjusted depending on wave conditions, such as by an internal hydraulic jack. Movement of the piston 32 causes air below the piston in the chamber of the cylinder assembly to communicate with the atmosphere through the top of the snorkel.

The flexible seal can be manufactured from reinforced flexible but watertight fabric formed over a mold. The dimensions of the annular seal are fully described by measurements of the major and minor axis of the piston and of the shell, and the length of the piston skirt by the distance from bottom of the stroke to the top of the shell. The piston is preferably fluted to enable the annular seal to fit wrinkle-free against the piston as the outer side of the seal rolls into contact with the piston under pressure from sea water as the piston moves up in a return stroke. The fluting can be of a form that comprises a hollow channel 32*t* that covers the top of the aforementioned slats.

The WEC includes an arcuate deflector 38 that can be moved to a position to direct incoming waves downward toward the piston. The deflector can be lowered alongside the shell so as not to interfere with expulsion of sea water from the shell as the piston is moved upward. To position the deflector, hydraulic cylinders 39 are mounted on opposite ends of the shell, and corresponding ends of the deflector are pivoted on the reciprocating plungers or rods of the cylinders, such as by pins 41 extending through holes 41*a*. Additional control cylinders 45 are mounted on the exterior of the shell near the minor axis and at the same side, which would correspond to the side away from an incoming wave. The central portion of the arc of the deflector 38 is carried by the reciprocating plungers of hydraulic cylinders 45. Operation of cylinders 39 and 45 can be coordinated to translate the deflector 38 upward and also rotate it somewhat fore and aft around the axis 38*a* defined by the holes 41*a* and pins 41. As described in more detail below, operation of the four hydraulic cylinders is under computer control for raising and tilting the wave deflector so as to capture wave energy and direct it downward during a power stroke, and retract the deflector 38 during a return stroke.

FIG. 2 illustrates the WEC 10 with parts assembled and with the curved deflector 38 raised and tilted forward in preparation for a cresting incoming wave. The piston 32 is fully raised adjacent to the top of the vertical shell 31. The hydraulic cylinders 39 at the sides have their rods extended to lift the deflector 38. The rear cylinders (the upper ends of which are represented at 45 in FIG. 4 but are not shown in FIG. 2) are raised to tilt the deflector 38 forward. The surface 43 of the ballast piece 34*a*, which faces the incoming wave, is concave with upright fins 44 to assist in directing the wave along the ballast surface and toward the raised deflector 38. The overall result is to increase downward pressure of the cresting wave on the piston as the wave passes over. In the position of FIG. 3, the deflector 38 has been lowered and tilted down alongside the shell opposite the direction of wave approach. FIG. 3 represents the lower most position of the piston 32. From that position, at or near alignment with a wave trough, the piston moves upward to expel water at approximately the location of the trough.

FIGS. 40 to 44 show a number of WEC-type_II wave energy devices 900 creating waves, each with a deflector 901 actuated by two known art helical hydraulic actuators 902, 904, arranged similar to the WEC shown in FIGS. 1 to 5.

Hydraulic System

FIGS. 6-9 are schematic representations of hydraulic fluid energy conversion equipment of a wave energy conversion system 210 in accordance with the present invention. Piston 252 (shown diagrammatically) corresponds to the WEC piston described previously. All hydraulic cylinders driven by such piston are represented as a single cylinder 221, with an internal volume 255 for hydraulic fluid. Such volume within the cylinder decreases as the piston moves down and increases as the piston is moved up, pressurizing fluid on the down stroke and reducing pressure on the up stroke. An inlet-outlet port at the bottom communicates with the fluid conduit 201, which leads to a valve 211. After valve 211, the conduit branches, one branch leading along a conduit 202 through a valve 215 and to inlets of hydraulic motors 511, 512 of known design. Such motors have a common shaft 513 that drives the electric generator 510. Returning to valve 211, another branch from the conduit 201 leads to a two position fluid valve 214, which can be referred to as a boost/reduce switch. In the position indicated in FIG. 6, such switch directs flow through a conduit 203 to a motor 222. From the motor, the fluid flows through a conduit 204 and a flow transducer 212, then through a conduit 205 to a low pressure accumulator 224. In this condition, the low pressure accumulator 224 is also receiving fluid from the outlets of the hydraulic motors 511, 512. At the same time, output shaft 227 of the motor 222 drives an upper motor 223 operating in regenerative mode so that it functions as a pump. The inlet of regen motor 223 receives fluid from the cylinder 221 through another branch 202*a* and boosts the pressure at the outlet and into an outlet conduit 206, then through a flow transducer 213, conduit 207 and into a higher pressure accumulator 225.

A control computer 231 monitors pressure and displacement, flow to and from the cylinder assembly 221, accumulators, and through motor and pump units 222, 223—connecting conductors are shown here bundled in a shrink-wrap cable 232. All hydraulic motors are fully controllable electrically and are equipped with pressure sensors at inlet and outlet ports (for example, first ports 222*aa*, 223*aa*, and second ports 222*bb*, 223*bb*, of FIG. 6), double swing swash-plate fluid displacement actuators with position sensors (for example, elements 222*c*, 223*c*, of rotary devices 222, 223, respectively, of FIG. 6), and shaft speed indicators (for example, represented at 227*a* in FIG. 6). During the power stroke, a signal from a flow transducer integral with valve 211 shown here as a single device on the fluid line of the cylinder assembly is used by the computer to control fluid flow and piston speed during the power stroke (power stroke being represented by the arrow 251). Hydraulic fluid flow is biased in favor of boosting pressure through the fluid power transformer (motors 222 and 223), where receiving-end pressure is about the same as the sending-end pressure. This avoids pressures being unbalanced and there being no flow, which would effectively freeze the piston in power stroke or return stroke.

During the power-stroke (equivalent to regenerative stroke), shown in FIGS. 6 and 7, the force of the wave presses down, as indicated by arrow 251, on the piston 252 and into the cylinder assembly 221 which is schematically represented as a single cylinder and rod or plunger. The internal pistons 254 force fluid from the interior volume 255 into the fluid line 201. In the case where the pressure of the high pressure accumulator is higher than the pressure from the cylinder assembly, the computer sets the boost/reduce switch 214 to "boost" position with fluid flows in port 214a and out port 214n", connecting flow pipe 201 to 203 and designates the lower motor 222 as driving motor, as represented in FIG. 6. The computer adjusts the displacement setting to provide power for the motor by drawing from the cylinder assembly and discharging to the low pressure accumulator 224. The pumping is done from the cylinder assembly to the high pressure accumulator 225 by the second motor 223 put in regenerative mode by computer control of the displacement setting on the second motor 223.

When the pressure of the high pressure accumulator is lower than the cylinder assembly, the computer sets the boost/reduce switch 214 to "reduce" position with fluid flows in port 214n and out port 214b, thereby connecting flow pipe 206 to 203 and designates the upper motor 223 as the driving motor, as shown in FIG. 7. In the "reduce" position, the motor inlet is connected to the cylinder assembly 221 through pipe 201 and the motor outlet to the high pressure accumulator 225. Simultaneously the computer switches the displacement setting of the second motor 222 to regenerative mode to cause it to pump fluid from the low pressure accumulator 224 to the high pressure accumulator 225. In summary, the two fluid switching states for the power-stroke are identical except for the position of the fluid boost/reduce switch 214.

At the end of the power stroke, valve 211 is closed, thereby effectively "locking" the piston in the lower-most position. Also, an electric brake 227b is set to lock the common or connecting shaft 227 of motors 222, 223. Then, as the wave trough approaches, the system is set for the return-stroke, represented in FIG. 8 and FIG. 9.

During the return-stroke, the brake 227b is released and the force from the cylinder assembly 221 is pressing up under the piston 252, as indicated by arrow 261, to discharge seawater from the shell. In the case where the pressure of the high pressure accumulator 225 is lower than the pressure from the cylinder assembly 221, the computer sets the boost/reduce switch 214 to "boost" position with fluid flows in port 214n and out port 214b, and designates the lower motor 222 as the driving motor, as shown in FIG. 8. The inlet of motor 222 is connected through pipe 203 and boost/reduce switch 214 to pipe 206 and to the high pressure accumulator 225, and the motor outlet is connected through pipe 204 and 205 to the low pressure accumulator 224. The power of motoring is used to drive the second motor 223 in regenerative mode. The regenerative motor 223 displacement is simultaneously switched to pump fluid from the high pressure accumulator 225 to the cylinder assembly 221. The boost/reduce switch 214 is shown to be in the same position where fluid communicates between port 214n and port 214b as that shown in FIG. 7, which reflects the change of view of the fluid flow through the switch from power-stroke "reduce" to return-stroke "boost".

During the return stroke, if the pressure of the high pressure accumulator 225 is higher than the pressure of the cylinder assembly 221, the computer sets the boost/reduce switch 214 to "boost" position with fluid flows in port 214n and out port 214b, and designates the upper motor 223 as the driving motor, as shown in FIG. 9. The motor inlet is connected to the high pressure accumulator 225 and the outlet to the cylinder assembly 221. The power of motoring is used to drive the lower motor 222 in regenerative mode to pump fluid from the low pressure accumulator 224 to the cylinder assembly. The boost/reduce switch 214 is shown to be in the same position where fluid communicates between port 214n and port 214b as that shown in FIG. 6, which reflects the change of view of the fluid flow through the switch from power-stroke "boost" to return-stroke "reduce".

The aforementioned FIGS. 6-9 are the switching states for what is known in this document as a Class A fluid power transformer and defined in the Glossary section where both motors 222, 223 are capable of operating in regenerative mode according to displacement set by the control computer 231. A nomenclature for the ports of the hydraulic devices of the transformer are port a and port b, as suffixes of the device namely, for the Class A transformer 222a, 222b and 223a, 223b, and for the Class B transformer 322a, 322b and 323a, 323b. It may be preferable to use a pump in place of the regenerative motor, inter alia, a pump may be more efficient than a motor driven in regenerative mode, and to switch the pump into the regeneration motor location each time regeneration is required. In accordance with the present invention this can be done by inserting a fluid transposing switch ahead of the motor and pump as shown in FIGS. 10-13 and toggling the transposing switch (indicated at 310 in these figures and having four individual valves 311-314) such that the pump is always in the position of the regenerative motor as evidenced by comparing FIG. 10 to FIG. 6; FIG. 11 to FIG. 7; FIG. 12 to FIG. 8; and FIG. 13 to FIG. 9. The following FIG. 10-FIG. 13 show that the fluid transposing switch 310 makes it possible to use the most efficient rotating equipment available, in what is known in this document as a Class B fluid power transformer, without any loss of flexibility, functionally identical to figures FIG. 6-FIG. 9, and independent of other functions of the inventive WEC.

It is shown in FIG. 10 that the fluid transposing switch 310 is in the transpose position. Each of the four fluid switches 311-314 are connected to transpose motor 323 and pump 322 to align with the motor and regenerative terminals to the configuration shown in FIG. 6.

It is shown in FIG. 11 that the fluid transposing switch 310 is in the straight though position and no transposition is required. Each of the four fluid switches 311-314 that make up switch 310 is connected straight through to the motor 323 and pump 322 to the configuration as shown in FIG. 7.

It is shown in FIG. 12 a transposition of switches 311-314 is required so that the motor 323 and pump 322 are in the same configuration as the motor and regenerative motor in FIG. 8.

It is shown in FIG. 13 that no transposition is required as the motor 323 and pump 322 are in the same configuration as the motor and regenerative motor in FIG. 9.

The fluid transposition switch has an auxiliary function, that of transposition switching the electrical sensors and displacement controls for the motor and pump simultaneous with the fluid transposition. This requires a two-position double-throw switch of the requisite number of poles, plus auxiliary contacts to control the fluid transposition switch. It is preferable that this electrical switching be done entirely within the control computer, where the first part of an algorithm performs the electrical sensor and displacement control transposition, and the second part, the fluid line transposition, is done by an electrical pulse to each valve 311-314 in the fluid transposition switch 310.

It is apparent from the discussion of FIG. 6 to FIG. 13 that the two inventive fluid power transformers (Class A and Class B) are functionally equivalent, and would perform equally well for the four main operating conditions, boosting and reducing pressure in the power-stroke and return-stroke. It may be preferable to reduce the low pressure accumulator 224 to atmospheric pressure reservoir 226. A two-position double-throw fluid valve switch 216 (seen in FIGS. 6-9) at the inlet to a charging pump 516 is switchable to allow the low pressure accumulator 224 to communicate through pipe 208 with the oil reservoir 226 at atmospheric pressure.

In the conversion of fluid power to electric power generation, it is preferable during the power-stroke to send about half the fluid energy directly through on-off switch 215 to the hydraulic motor that powers the electric generator and thus avoid the power transformation losses that would otherwise occur if all the energy was sent to storage and then drawn back for generation. A fluid power switch 215 inserted into the cylinder assembly line 202 is kept open for direct generation during power-stroke as shown in FIGS. 6, 7, 10 and 11, and kept closed during return-stroke as shown in FIGS. 8, 9, 12 and 13.

The generator 510 is preferably powered by two hydraulic motors 511, 512, rotatably coupled as indicated at 513, at least one of which is supplied directly from the cylinder assembly during the power-stroke through an open valve 215 as shown in FIGS. 6, 7, 10 and 11. The second motor is switchable to lead the change-over to operate from the high pressure accumulator 225 during periods of transition, which is at a different pressure than the flow from the cylinder assembly 221 via line 201. These hydraulic motors are operated at constant speed for constant frequency electric power generation. The cylinder assembly valve 215 is closed at the end of the power-stroke and fluid is then supplied from the accumulator 225 for the duration of the return-stroke and during periods of piston inactivity. The computer program has a forward looking state-estimator algorithm to estimate the steady level of power that can be produced for a particular on-coming wave condition and determines the best estimate for the power production settings. Such optimal control and optimal state estimator features are known to be programmable in state-of-art computer PLC and DCS systems.

Power is imported from the utility system on shore, or from a motor-generator set, over the under water cables to an electrical box 514 (FIGS. 6-9) to start the WEC into operation. Electrical control lines connect the control computer 231 to a computer on shore. A small electric start-up motor 515 drives a pump 516 to charge the accumulators and hydraulic equipment from a reservoir 226.

Sufficient power is imported to operate the electric motor-pump-set to charge the high pressure accumulator 225 to build up an energy reserve sufficient to run the WEC 10 through a few power-stroke return-stroke cycles and give the computer algorithms time to adjust to ocean wave conditions. After fluid energy in the high pressure accumulator 225 is considered sufficient to sustain continuous electric power production, the fluid line to the turbine is opened, the hydraulic turbines 511, 512 are started and electric generator 510 is brought up to speed and synchronized at the electrical control panel 514. Power is exported to shore by increasing turbine displacement to increase power generation.

FIGS. 16 to 35 shows the fluid power transformer in a double-acting embodiment operating in quadrants Q1 to Q4, similar to single-acting embodiment shown in FIGS. 6 to 15 in quadrants Q1 and Q3. FIGS. 16 to 35 include the 4-way two-position cross-over switch 801 which facilitates the double-acting feature, with a first position CO1 and a second position CO2.

FIG. 16 is similar to FIG. 6 except with a 4-way cross-over switch 801 with four ports A, B, C and D, positioned between the transformer terminal A 211 and the actuator 221, about midway along conduit 201, with one end of the divided conduit 201 to port D 801d of the cross-over switch 801, and thence from port B 801b by conduit 802 with one end at the actuator 221, and further connected by a second conduit 803 connected at the opposite end of the actuator 221 with a second end at port B 801a. The transformer terminal N is connected at port C 801c.

The cross-over switch 801 with its two positions, CO1 and CO2, facilitates double-acting cylinder actuation throughout the four quadrants Q1 to Q4, functionally independent of the functions of the two position boost/reduce switch 214.

Another embodiment of fluid transfer arrangement for further efficiency enhancement, known in this document as a fluid energy swing, from the power stroke (equivalent to regeneration stroke) to the return stroke (equivalent to motor stroke), is shown in FIG. 36 and FIG. 37. In the power stroke (FIG. 36), a first group of piston driven cylinders 221a communicates through line 421 to two-position fluid valve 414 and line 423-424 to a separate accumulator 425, storing energy from the power stroke to provide energy for the return stroke without incurring loses from fluid pressure transformation. The fluid energy swing is adjustable from approximately 0 to 100% of the energy required to return the piston to its top position, depending on numbers of cylinders (each with a single-pole double-throw fluid switch 414) in the group and accumulator pressure. The second group of cylinders 221b communicates through fluid line 201 to the fluid power transformer similar to that shown in FIGS. 6-15. FIG. 37 shows the conditions during the return stroke (equivalent to motor stroke).

The modified fluid transmission circuit shown in FIG. 38 has the assembly 221 of piston driven cylinders divided into three groups. Power stroke conditions are illustrated in FIG. 38. The first cylinder group 221a communicates through conduit 421, valve 414, conduit 423, valve 415, and conduit 424 with the additional accumulator 425. As for the embodiment of FIGS. 36 and 37, charging pressure in accumulator 425 on the down stroke can be recaptured on the return stroke. A second cylinder group 221b communicates with the fluid pressure transformation pair 222 and 223, similar to the embodiments of FIGS. 6-15. A third cylinder group 221c communicates directly with the high pressure accumulator 225, i.e., by way of line 601 and valve 611 to line 207, so as to transfer fluid directly to such high pressure accumulator. Thus, the first group 221a functions independent of wave action as if the piston is simply translating up and down, pressurizing the additional accumulator 425 on the power stroke and using this pressure on the return stroke. The third group 221c operates as a base load group where fluid pressure is transmitted directly to the high pressure accumulator on the power stroke without using the pressure transformation motor-pump pair 222, 223. The second group 221b is a residual flow group which transmits the balance of the energy in the ocean wave, some of which goes directly to drive electricity generation through line 202 and valve 215 (valve 215 being open during the power stroke and closed at other times).

A simple flow diagram of operation of all embodiments of the wave energy conversion system in accordance with the present invention is shown in FIG. 45. The sensor array positioned seaward of the WECs detects wave characteristics as indicted at box 600. The control computer reads data from the sensors and computes the wave vectors and analyzes the useful energy of the on-coming wave, as indicated by box 602. The control computer then evaluates the operating characteristics of the WEC and, in combination with the wave characteristics calculated from the sensor data, makes a decision as to whether or not the on-coming wave is appropriate for energy harvest. If not, no additional action is taken and the next wave is analyzed, as indicated by line 605. On the other hand, if it is determined that the wave is appropriate for energy harvest based on its energy and the operating condition of the WEC, the power stroke is instituted (box 606) and continued to the optimal lower most position of the piston. For example, for a representative wave train the WEC deflector 38 may be raised and tilted to its energy capturing position at approximately 10 to 30 ocean-wave-degrees prior to alignment with the wave crest. At the end of the power stroke, the WEC is returned to a "hold" condition with the main supply valve closed and the electric brake 227b applied (box 608), until the appropriate time for instituting the return stroke (box 610), which could occur for example, at 10 to 30 ocean-wave-degrees prior to the wave trough passing over the WEC. Between the end of the power stroke and the beginning of return stroke, the deflector 38 is lowered so as not to interfere with expulsion of seawater from the WEC. At the end of the return stroke, the system again is placed in the "hold" condition (box 612; electric brake 227b applied and main supply valves closed) and the system recycles to analyzing the next on-coming wave.

The Class C transformer is shown in power stroke (regeneration mode) in FIG. 34 where it is substituted for the Class A transformer shown in FIG. 6 in power stroke with pressure boost, in Q3 and SS3. Switch 214 and switch 264 are in the same position in both figures, directing fluid flow from the piston to the motor. An additional single-pole double-throw two-position switch 274 controls fluid flow from the low pressure accumulator through pump 223 to the high pressure accumulator. It is apparent in power stroke that all the discharged fluid flow from the Class C transformer goes from the low pressure accumulator through the pump 223 to the high pressure accumulator, and the motor 222 draws additional energy from the piston in power stroke including for its own losses and for pump losses. It is apparent therefore that the Class C transformer is less efficient than Class A and Class B transformers where energy stored in the high pressure accumulator 225 is pumped from piston pressure to the high pressure accumulator rather than from the low pressure accumulator 224.

The Class C transformer is shown in return stroke (motoring mode) in FIG. 32 where it is substituted for the Class A transformer shown in FIG. 8 in return stroke with pressure boost, in Q1 and SS1. The additional switch 274 controls flow from the low pressure accumulator 224 through pump 223 to the piston. It is apparent that all the discharge fluid flow from the transformer goes from the low pressure accumulator 224 through the pump 223 to the piston, and the motor 222 draws additional energy from the high pressure accumulator 225 in return stroke (equivalent to motor stroke), including for its own losses and for pump losses. It is apparent therefore that the Class A and Class B transformers are more efficient than the Class C transformer where fluid is boosted through greater pressure differential, from accumulator 224 to the WEC piston.

In FIG. 46, the Class A transformer is shown in motoring mode in an isometric view of the right side of the multi-dimensional cube, in pressure boost and pressure reduce switching states, SS1 and SS2, respectively, and is equivalent to the arrangement of FIG. 8 showing switching state SS1 and FIG. 9 showing switching state SS2, both states of which apply to quadrant Q1 of the WEC and to Q1 and Q2 generally. A large button on the top front face of the motor distinguishes it from the regenerative motor being driven as a pump.

In FIG. 47, the Class A transformer is shown in regeneration mode in an isometric view of the left side of the multi-dimensional cube, in pressure boost and pressure reduce switching states, SS3 and SS4, respectively, and is equivalent to FIG. 6 showing SS3 and FIG. 7 showing SS4, both states of which apply to quadrants Q3 of the WEC and to Q3 and Q4 generally.

FIGS. 48 and 49 show the cross-over switch positions CO1, CO2, CO1, and CO2 as they apply to fluid flow in quadrants Q1 to Q4, respectively, as the swashblock is toggled from +15 degrees to −15 degrees, respectively. The position indicator is shown in Q1. Toggling between FIGS. 48 and 49 shows the position indicator effects rotary actuation but has no effect on linear actuation.

Switching states SS2 and SS3, shown in FIGS. 46 and 47, respectively, require that the swashblock of the pump or of the motor be reversed to facilitate the fluid flow shown by the arrows, by electronic swashblock actuation, or in the absence of a swashblock actuation feature, a cross-over switch (not shown) can be added to transpose the fluid flow at the terminals of either the pump or the motor. The inventive transformer can therefore provide a fixed ratio of pressure change in the four switching states, SS1 to SS4, in four quadrants, Q1 to Q4. This is discussed further with relation to FIGS. 63 and 64 as it applies to the Class A and Class B transformers, SSS2 and SSS3.

In FIG. 50, the Class B transformer is shown in motoring mode. In pressure boost, it is equivalent to FIG. 12 showing SSS1 and is functionally equivalent to FIG. 8 and FIG. 46 showing SS1. In pressure reduce, it is equivalent to FIG. 13 showing SSS2 and is functionally equivalent to FIG. 9 and FIG. 46 showing SS2. Both states apply to quadrant Q1 of the WEC and to Q1 and Q2 generally.

Figure 53:
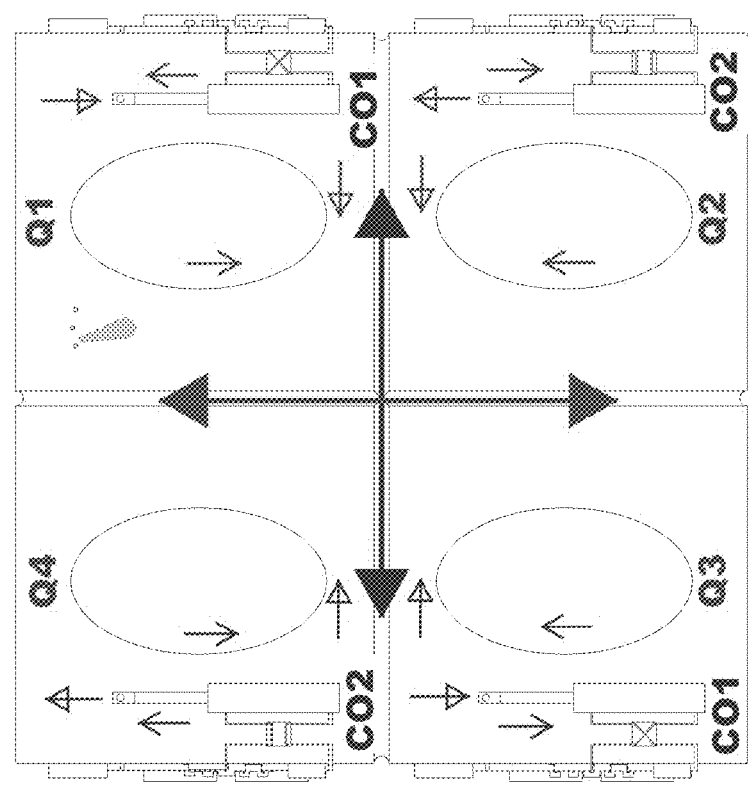

The Class B transformer is shown in regeneration mode in FIG. 51 and is equivalent to FIG. 10 showing SSS3 and is functionally equivalent to FIG. 6 showing SS3. FIG. 53 is equivalent to FIG. 11 showing SSS4 and functionally equivalent to FIG. 7 and FIG. 48 showing SS4. Both states apply to quadrants Q3 of the WEC and to Q3 and Q4 generally. Switching states SSS2 and SSS3 require that the swashblock of the pump or the motor be reversed to facilitate the fluid flow shown by the arrows, or in the absence of a swashblock actuation feature, a cross-over switch (not shown) can be added to transpose the fluid flow at the terminals of either the pump or the motor. The inventive Class B transformer can, therefore, in the absences of variable swashblock control, provide a fixed ratio of pressure change in the four switching states, SSS1 to SSS4, in four quadrants, Q1 to Q4.

Electronic filing for accelerated examination provides new opportunities for expression to expedite comprehension of similarities and differences of the switching states of the inventive Class A (SSn), Class B (SSSn) and Class C (SSCn) fluid power transformers in this application, where n equals 1-4, 1-4, and 1&3, respectively. Figures that show the switching states are consistently margined and scaled views for animation purposes, where viewing the drawing full screen size instantly shows the effects of computer switching by scrolling the mouse wheel through the switching states as described in reference to a special isometric composite view consistent with the view of the top front corner of FIG. 51. The Class B and C transformers are shown in FIGS. 62 to 67.

Respective switching states, SSS1, SSS2, SSS3, SSS4 are shown in FIGS. 62 to 65, and SSC1, SSC2 are shown in FIGS. 66 and 67.

The fluid transposing switch 310 (shown on FIGS. 10 to 13) is represented by a cluster of four single-pole-double-throw two-position fluid switches which appear as if mounted on a vertical panel, as shown on SSS3 on FIG. 64. This same set of drawings with the switching on the panel (switch 310) frozen in the straight through position, as shown in states SSS2 and SSS4, (FIGS. 63 and 65, respectively) is suitably illustrative of the Class A fluid transformer where fluid flows horizontally straight through the switch cluster switch 310 as if it was not there, or alternatively frozen in the non-transposed position. In the Class A representation as shown in FIGS. 46 and 47, the motor symbol identifies the motor in its ordinary function in each of the switching states. It is important to note when viewing this composite drawing set: (a) where there is no transposition of the motor and regenerative motor as in SS2 and SS4, the motor symbol is in the correct position as shown in SSS2 and SSS4, and the "motor" symbol distinguishes the motor in regenerative mode operating as a pump in SS1 and SS3, and (b) the isometric views are composites of the actual views of the Class B and Class C multidimensional cubes, specifically the left front corner (the regenerative side of the cube) as shown in FIG. 67. For example FIGS. 62, 63 and 66 are extracts from quadrants Q1 and Q2, the motoring side of the cube, which are transposed into the isometric of the regenerating side of the cube which is where Q3, Q4 are normally shown.

The figures starting at FIG. 46 to FIG. 57 have been marked to aid in visualizing the transformer switching states and the conduit networks for writing claims. For example, a claim that reads on the inventive Class A transformer and includes particulars of the conduit network thereof (as shown in FIG. 47 for switching state SS3, or FIG. 64 for switching state SSS3, which is marked up for illustration of switching claims, by disregarding the conduit network on the panel 310 and by treating the panel 310 as four straight-through conduits as shown in FIGS. 63 and 65). The Class A transformer comprises 4 conduits, one 3-way switch and two motor/pump devices coupled together. The first and second conduit have three ends, while the third and fourth have two ends. The switch 214 has a first position as shown in FIG. 63 and a second position as shown in FIG. 62.

The Class B transformer figures are FIGS. 10 to 13. A claim that reads on the network of inventive Class B transformer would include at least five fluid transfer switches and a particular conduit network (see switching state SSS3 shown in FIGS. 62 to 65);

The Class C transformer figures are FIGS. 14 to 15 and 66 to 67. The latter of which have been marked to aid in visualizing the networks and the switching states for the writing of claims. For example, a claim that reads on the inventive Class C transformer, in particular the conduit network thereof (see FIG. 66 switching state SSC1, and preferably FIG. 67 showing switching state SSC2 which is shown marked up for expeditious association.

The fluid transfer switches have been made identical to make it simpler to particularize the different switching states after the networks are particularized. All the fluid transfer switches are single-pole-double-throw two-position switches with three ports, with each of ports 214a and 214b in communication with port 214n, and in a first position, the fluid transfer switch communicates fluid between port 214a and port 214n, and in a second position, communicates fluid between port 214b and port 214n. In the isometric views of FIGS. 62 to 67, the second position is CCW from the first position. The second position is CW to the first in switching states that apply to Q1 and Q2, which are shown in isometric view of the right side of the multidimensional cubes. The claims read consistently on the transformer viewed from either side of the cube as apparent on reading the particulars on the first conduit in all the conduit networks, " . . . (a) a first conduit (1) with a first end designated terminal A of the transformer, with a second end terminated on the first port designated A of the first fluid transfer switch, . . . ".

The switching states of the Class A and Class B fluid transformers are characterized by the first and second positions of fluid switches, which are apparent on viewing FIGS. 62 to 65. The lifting of the actuator in Q1 or lowering of it in Q2 is determined by the position of a 4-way crossover switch 801 at the terminals of the actuator as shown in FIG. 48. The switching states for the Class C transformer are apparent on viewing FIGS. 66 and 67. In other words, a switching state is an arrangement of switches in a network for a special purpose.

The four switching states of the Class A transformer are apparent on viewing FIGS. 62 to 65, by disregarding the switching panel or mentally replacing it with four straight through conduits as shown in FIG. 65, in place of the panel of switches 311 to 314 in the cluster known as switch 310. Switching state SS1 serves to boost fluid pressure through the transformer while operating in motoring mode in Q1 or Q2, which is facilitated by putting the first fluid switch in the second position. Switching state SS2 facilitates fluid to flow to reduce pressure in motoring Q1 and Q2 which is facilitated with the first fluid switch in the first switch position. The first switch position facilitates fluid to flow to boost pressure in regeneration mode in Q3 and Q4, and is characterized as SS3. The second switch position facilitates fluid to flow to reduce pressure in regeneration mode Q3 and Q4, and is characterized as SS4.

The four switching states of the Class B transformer are apparent on viewing FIGS. 62 to 65. It is apparent on viewing FIGS. 62 to 65 that the second fluid switch 311 could be redrawn such that the $2^{nd}$, would be identical to the $3^{rd}$, $4^{th}$, and $5^{th}$ switches. Then the internal conduit G on departing switch 311 could be redrawn such that conduit G would be looped upward and counterclockwise, rather than looped downward and clockwise as shown in FIGS. 62 to 65.

Switching state SSS1 serves to boost fluid pressure through the transformer while operating in motoring mode in Q1 or Q2, which is facilitated by putting the 1st fluid switch 214 in second position and each of the $2^{nd}$, $3^{rd}$, 4th and $5^{th}$ switches in the first position.

Switching state SSS2 facilitates fluid to flow to reduce pressure in motoring mode Q1 and Q2 which is facilitated with the $1^{st}$ switch in the first position and each of the $2^{nd}$, $3^{rd}$, $4^{th}$ and $5^{th}$ switches in the second position. Switching state SSS3 facilitates fluid to flow to boost pressure in regenerating mode Q3 and Q4, which is facilitated with the $1^{st}$ fluid switch in the first position and each of the $2^{nd}$, $3^{rd}$, $4^{th}$ and $5^{th}$ switches in first position. Switching state SSS4 facilitates fluid to flow to reduce pressure in regeneration mode Q3 and Q4, which is facilitated with the $1^{st}$ fluid switch in the second position and the $2^{nd}$, $3^{rd}$, $4^{th}$ and $5^{th}$ switches in their second position.

For drawing clarity it was necessary to arrange conduit G and group switch 311 with ports 311a and 311b interchanged as shown in drawings FIGS. 62 to 65. The Class B fluid conduit network for transferring fluid by mutually exclusive rotatably operable motor (323) and pump (332) devices, comprises a fluid transfer switch (214) comprising a single-pole-double-throw two-position fluid switch having a port A (214a), a port B (214b), and a port N (214n) with alternate fluid flow-through positions, a first position for communicating fluid between port N (214n) and port A (214a) and a second position for communicating fluid between port N (214n) and port B (214b). The mutually exclusive fluid transposition switch group (310), substantially interposed between the first transfer switch (214) and the motor (323) and the pump (322), [FIG. 10 to FIG. 13], comprises the second (311), third (312), fourth (313), and fifth (314) fluid transfer switch, spatially arranged within the transposition switch group (310).

The transposition switch group (310) includes the conduit network, [FIG. 62 to FIG. 65] with a total of eight external fluid ports, of which four external ports are on the transformer terminal side, specifically A (310a), B (310b), C (310c), and N (310n), and four external ports are on the motor (323) and pump (322) side, specifically port D (310ma), port E (310mb) and port F (310pa), port G (310pb), respectively, with a first position, a straight-through position, and a second position, a transposed position, specifically with the transposition switch group (310).

Fluid flow is communicated within the transposition switch group (310), in the first position of the switch group (310), [FIG. 11][FIG. 13][FIG. 63][FIG. 65] known as the straight-through position, is effectively communicated directly between the transformer terminal side and the motor and pump side, specifically from port A (310a), B (310b), C (310c), N (310n) to motor D (310ma), E (310mb), and pump F (310pa), G (310pb), respectively, as follows:

Between group port A (310a) and port N (312n) of the third transfer switch (312) through to port B (312b), from thence through conduit D to group port D (310ma), from thence externally directly by conduit direct to motor port A (323a);

Between group port B (310b) and port N (311n) of the second transfer switch (311) through to port A (311a), from thence through conduit E to group port E (31 Oma), from thence externally directly by conduit direct to motor port A (323a);

Between group port C (310c) and port N (313n) of the fourth transfer switch (313) through to port B (313b), from thence through conduit F to group port F (310pa), from thence externally directly by conduit direct to pump port A (322a);

Between group port N (310n) and port N (313n) of the fifth transfer switch (314) through to port B (314b), from thence through conduit G to group port G (310pb), from thence externally directly by conduit direct to pump port B (322b).

Fluid flow is communicated within the transposition switch group (310), in the second position of the switch group (310), known as the transposed position [FIG. 10][FIG. 12][FIG. 64][FIG. 62], as follows:

Between group port A (310a) and port N (312n) of the third transfer switch (312) from thence externally by conduit F to port F (310pa) from thence externally directly by conduit to pump port A (322a);

Between group port B (310b) and port N (311n) of the second transfer switch (311) through to port A (311b) and thence by conduit G to group port G (310pb) from thence externally directly to pump port B (322b);

Between group port C (310c) and port N (313n) of the fourth transfer switch (313) from thence through port A (313a), from thence by conduit D to port D (310ma) from thence externally directly to motor port A (323a); and Between group port N (310n) and port N (314n) of fifth transfer switch (314) through to port A (314b) from thence through conduit B to group port B (310mb) from thence externally directly to motor port B (323b).

The two switching states of the Class C transformer are apparent on viewing FIGS. 66 to 67. Each state suffices to boost or reduce pressure through the transformer. Switching state SSC1 facilitates flow through the transformer in motoring mode by putting the first fluid switch in second position and the second fluid switch in the first position, and thereby lift the actuator in Q1 and or lower it in Q2, as determined by the position of a 4-way crossover switch 801 at the terminals of the actuator. Switching state SSC3 facilitates fluid through the transformer in regenerating mode by putting the first fluid switch in first position and the second fluid switch in the second position, and thereby recover energy from the actuator in lift motion in Q3 or lower motion in Q4, the quadrature affected by the position of a 4-way crossover switch 801 at the terminals of the actuator.

The best method of control of the Class A transformer when in communication with a linear actuator, on a command within the computer to the configuration section of the transformer to set the transformer in regenerating mode to recover fluid energy (apparent on viewing FIGS. 64 and 65 and FIG. 51), while retracting (downward) in Q3 or extending (upward) in Q4, as determined by the position of a directional control switch at the actuator, said command including a first part comprising a setpoint for fluid flow and thereby actuator speed, and a second part comprising the switching state for the transformer, includes the following steps:

(a) initializing the transformer, by setting the electric brake caliper in normally-closed position, toggling swashblock controls to the positive range, setting the displacement of the motor and the pump/regen-motor to zero flow positions, implementing the switching state part of the command, which if equal to SS3 then configuring switching to boost pressure from the first terminal to the second terminal of the transformer and then toggle pump/regen-motor swashblock control to the negative range, or if equal to SS4 then configuring switching to reduce pressure from the first terminal to the second terminal of the transformer and then toggle pump/regen-motor swashblock control to the positive range;

(b) opening the first shutoff valve (not shown) between the first terminal of the transformer and the actuator, gradually increasing displacement of the motor, thereby facilitating in-coming fluid to flow through the transformer and regenerative energy therefrom to transfer to the high pressure accumulator on the opening of a second shutoff valve and thereby transfer energy from the actuator moving in lift or lower direction as determined by the position of the actuator directional switch;

(c) judiciously increase displacement of the motor, thereby increasing torque on the brake, open the second shutoff valve (not shown) between the second terminal of the transformer and the high pressure accumulator, judiciously gradually increase displacement of the pump/regen-motor to incrementally increase flow to the high pressure accumulator while releasing the brake, and thereby start a ramp up of fluid flow to the high pressure accumulator and bring about a gradual increase in speed of the actuator;

(d) judiciously increase motor and pump/regen-motor displacements and thereby ramp up fluid flow to the setpoint for fluid flow/actuator speed.

In alternative to steps (c) and (d) above, with object to start with a full step to the desired fluid flow/actuator speed setpoint, the method could further include the following alternative steps:

(c) estimating the displacement settings for the motor and the pump/regen-motor appropriate for the flow setpoint conditions and implementing the estimated displacements settings, opening the second shutoff valve (not shown) between the second terminal of the transformer and the high pressure accumulator, monitoring post transient actuator speed, and judiciously adjusting displacement in accordance with a speed error computation about the setpoint according to known PID (proportional, plus integral, plus derivative) control methods;

(d) continuing to adjust displacements according to the known PID method to match actual actuator flow/speed to changing setpoint commands to the computer, and close the first shutoff valve if the setpoint equals zero.

The best method of control of the Class A transformer when in communication with a linear actuator, on a command within the computer to the configuration section of the transformer to set the transformer in powering mode to deliver fluid energy to a linear actuator, (apparent on viewing FIGS. 62 and 63 and FIG. 50) for extending (lifting) in Q1 or for retracting (lowering) in Q2, depending on the position of the actuator directional control switch, said command including a first part comprising a setpoint for fluid flow and thereby actuator speed, and a second part comprising the switching state for the transformer, includes the following steps:

(a) initializing the transformer, by setting the electric brake caliper in normally-closed position, toggling swashblock controls to the positive range, setting the displacement of the motor and pump/regen-motor to zero flow positions, implementing the switching state part of the command, which if equal to SS1 then configuring switching to boost pressure from the second terminal to the first terminal of the transformer and then toggle motor swashblock control to the positive range, or if equal to SS2 then configuring switching to reduce pressure to the actuator and then toggle motor swashblock control to the negative range;

(b) opening the second shutoff valve (not shown) between the second terminal of the transformer and the high pressure accumulator, gradually increasing displacement of the motor, thereby facilitating in-coming fluid to flow through the transformer and energy therefrom to transfer to the actuator on the opening of the first shutoff valve and thereby transfer energy to the actuator moving it in lift or lower direction as determined by the position of the actuator directional switch;

(c) judiciously increase displacement of the motor, thereby increasing torque on the brake, open the first shutoff valve (not shown) between the first terminal of the transformer and the actuator, judiciously gradually increase displacement of the pump/regen-motor to incrementally increase flow from the high pressure accumulator while releasing the brake, and thereby start a ramp up of fluid flow to the first terminal of the transformer and bring about a gradual increase in speed of the actuator;

(d) judiciously increase motor and pump/regen-motor displacements and thereby ramp up fluid flow to the setpoint for fluid flow/actuator speed.

In alternative to steps (c) and (d) above, with object to start with a full step to the desired fluid flow/speed setpoint, the method could further include the following alternative steps:

(c) estimating the displacement settings for the motor and the pump/regen-motor appropriate for the flow setpoint conditions and implementing the estimated displacements settings, opening the first shutoff valve (not shown) between the first terminal of the transformer and the actuator, monitoring post transient actuator speed, and judiciously adjusting displacement in accordance with a speed error computation about the setpoint according to known PID (proportional, plus integral, plus derivative) control methods;

(d) continuing to adjust displacements according to the known PID method to match actual actuator speed to changing setpoint commands to the computer, and close the second shutoff valve when the setpoint goes to zero.

The best method of control of the Class B transformer when in communication with a linear actuator, on a command within the computer to the configuration section of the transformer to set the transformer in regenerative mode to recover fluid energy (apparent on viewing FIGS. 62, and 63 and FIG. 51), while retracting (downward) in Q3 or extending (upward) in Q4, as determined by the position of a directional control switch at the actuator, said command including a first part comprising a setpoint for fluid flow and thereby actuator speed, and a second part comprising the switching state for the transformer, includes the following steps:

(a) initializing the transformer, by setting the electric brake caliper in normally-closed position, toggling swashblock controls to the positive range, setting the displacement of the motor and the pump at zero flow positions, and implementing the switching state part of the command, which if equal to SSS3 then configuring switching to boost pressure from the first terminal to the second terminal of the transformer and then toggle motor swashblock control to the negative range, or if equal to SSS4 then configuring switching to reduce pressure from the first terminal to the second terminal of the transformer;

(b) opening the first shutoff valve (not shown) between the first terminal of the transformer and the actuator, gradually increasing displacement of the motor, thereby facilitating in-coming fluid to flow through the transformer and regenerative energy therefrom to transfer to the high pressure accumulator on the opening of the second shutoff valve and thereby transfer energy from the actuator moving in lift or lower direction as determined by the position of the actuator directional switch;

(c) judiciously increase displacement of the motor, thereby increasing torque on the brake, open the second shutoff valve (not shown) between the second terminal of the transformer and the high pressure accumulator, judiciously gradually increase displacement of the pump to incrementally increase flow to the actuator while releasing the brake, and thereby start a ramp-up of fluid flow to the high pressure accumulator and bring about a gradual increase in speed of the actuator;

(d) judiciously increase motor and pump displacements and thereby ramp up fluid flow to the setpoint for fluid flow/actuator speed.

In alternative steps to (c) and (d) above, with object to start with a full step to the desired fluid flow/actuator speed setpoint, the method could include the following alternate steps:

(c) estimating the displacement settings for the motor and the pump appropriate for the flow setpoint conditions and implementing the estimated displacements settings, opening the second shutoff valve (not shown) between the second terminal of the transformer and the high pressure accumulator, monitoring post transient actuator speed, and judiciously adjusting displacement in accordance with a speed error computation about the setpoint according to known PID (proportional, plus integral, plus derivative) control methods;

(d) continuing to adjust displacements according to the known PID method to match actual actuator flow/speed to changing setpoint commands to the computer, and close the first shutoff valve if the setpoint equals zero.

The best method of control of the Class B transformer when in communication with a linear actuator, on a command within the computer to the configuration section of the transformer to set the transformer in power mode (apparent on viewing FIGS. 62 and 63 and FIG. 50) to extend (raise) in Q1 or to retract (lower) in Q2, depending on the position of the actuator directional control switch, said command including a first part comprising a setpoint for fluid flow and thereby actuator speed, and a second part comprising the switching state for the transformer, includes the following steps:

(a) initializing the transformer, by setting the electric brake caliper in normally-closed position, toggling swashblock controls to the positive range, setting the displacement of the motor and pump to zero flow positions, implementing the switching state part of the command, which if equal to SSS1 then configuring switching to boost pressure from the second terminal to the first terminal of the transformer and then toggle motor swashblock control to the positive range, or if equal to SSS2 then configuring switching to reduce pressure to the actuator and then toggle motor swashblock control to the negative range;

(b) opening the second shutoff valve (not shown) between the second terminal of the transformer and the high pressure accumulator, gradually increasing displacement of the motor, thereby facilitating in-coming fluid to flow through the transformer and energy therefrom to transfer to the actuator on the opening of the first shutoff valve and thereby transfer energy to the actuator moving it in lift or lower direction as determined by the position of the actuator directional switch;

(c) judiciously increase displacement of the motor, thereby increasing torque on the brake, open the first shutoff valve (not shown) between the first terminal of the transformer and the actuator, judiciously gradually increase displacement of the pump to incrementally increase flow from the high pressure accumulator while releasing the brake, and thereby start a ramp up of fluid flow to the first terminal of the transformer and bring about a gradual increase in speed of the actuator;

d) judiciously increase motor and pump displacements and thereby ramp up fluid flow to the setpoint for fluid flow/ actuator speed.

In alternative steps to (c) and (d) above, with object to start with a full step to the desired fluid flow/actuator speed setpoint, the method could include the following alternate steps:

(c) estimating the displacement settings for the motor and the pump appropriate for the flow setpoint conditions and implementing the estimated displacements settings, opening the first shutoff valve (not shown) between the first terminal of the transformer and the actuator, monitoring post transient actuator speed, and judiciously adjusting displacement in accordance with a speed error computation about the setpoint according to known PID (proportional, plus integral, plus derivative) control methods;

(d) continuing to adjust displacements according to the known PID method to match actual actuator speed to changing setpoint commands to the computer, and close the second shutoff valve when the setpoint goes to zero.

The best method of control of the Class C transformer when in communication with a linear actuator, on a command within the computer to the configuration section of the transformer to set the transformer in regeneration mode to recover fluid energy (apparent on viewing FIG. 67 and FIG. 55), while retracting (on being pushed downward) in Q3 or while extending (on being pulled upward) in Q4, as determined by the position of a directional control switch at the actuator, said command including a first part comprising a setpoint for fluid flow and thereby actuator speed, a second part comprising the switching state for the transformer, includes the following steps:

(a) initializing the transformer, by setting the electric brake caliper in normally-closed position, toggling swashblock controls to the positive range, setting the displacement of the motor and the pump to zero flow positions, and implementing the switching state part of the command, which if equal to SSC3 then configuring switching to boost or reduce pressure through the transformer as determined by pressures at terminals of the actuator and the high pressure accumulator;

(b) opening the first shutoff valve (not shown) between the first terminal of the transformer and the actuator, gradually increasing displacement of the motor, thereby facilitating in-coming fluid to flow through the transformer and regenerative energy therefrom to transfer to the high pressure accumulator on the opening of the second shutoff valve and thereby transfer energy from the actuator moving in lift or lower direction as determined by the position of the actuator directional switch;

(c) judiciously increase displacement of the motor, thereby increasing torque on the brake, open the second shutoff valve (not shown) between the second terminal of the transformer and the high pressure accumulator, judiciously gradually increase displacement of the pump to incrementally increase flow to the actuator while releasing the brake, and thereby start a ramp-up of fluid flow to the high pressure accumulator and bring about a gradual increase in speed of the actuator; (d) judiciously increasing motor and pump displacements and thereby ramp up fluid flow to the setpoint for fluid flow/ actuator speed.

In alternative to steps (c) and (d) above, with object to start with a full step to the desired fluid flow/speed setpoint, the method could further include the following alternative steps:

(c) estimating the displacement settings for the motor and the pump appropriate for the flow setpoint conditions and implementing the estimated displacements settings, opening the second shutoff valve (not shown) between the second terminal of the transformer and the high pressure accumulator, monitoring post transient actuator speed, and judiciously adjusting displacement in accordance with a speed error computation about the setpoint according to known PID (proportional, plus integral, plus derivative) control methods;

(d) continuing to adjust displacements according to the known PID method to match actual actuator flow/speed to changing setpoint commands to the computer, and close the first shutoff valve if the setpoint equals zero.

Similarly the best method of control of the Class C transformer when in communication with a linear actuator, on a command within the computer to the configuration section of the transformer of the transformer to set the transformer in power mode (apparent on viewing FIG. 66 and FIG. 54) to extend (raise) in Q1 or retract (lower) in Q2, depending on the position of the actuator directional control switch, said command including a first part comprising a setpoint for fluid flow and thereby actuator speed, and a second part comprising the switching state for the transformer, includes the following steps:

(a) initializing the transformer, by setting the electric brake caliper in normally-closed position, toggling swashblock controls to the positive range, setting the displacement of the motor and the pump to zero flow positions, implementing the switching state part of the command, which if equal to SSC1, then configuring switching to boost or reduce pressure from the second terminal to the first terminal of the transformer as determined by pressures at the terminals of the actuator and the high pressure accumulator;

(b) opening the second shutoff valve (not shown) between the second terminal of the transformer and the high pressure accumulator, gradually increasing displacement of the motor, thereby facilitating in-coming fluid to flow through the transformer and energy therefrom to transfer to the actuator on the opening of the first shutoff valve and thereby transfer energy to the actuator moving it in lift or lower direction as determined by the position of the actuator directional switch;

(c) judiciously increase displacement of the motor, thereby increasing torque on the brake, open the first shutoff valve (not shown) between the first terminal of the transformer and the actuator, judiciously gradually increase displacement of the pump to incrementally increase flow from the high pressure accumulator while releasing the brake, and thereby start a ramp up of fluid flow to the first terminal of the transformer and bring about a gradual increase in speed of the actuator;

d) judiciously increase motor and pump displacements and thereby ramp up fluid flow to the setpoint for fluid flow/actuator speed.

In alternative steps to (c) and (d) above, with object to start with a single step to the desired fluid flow/actuator speed setpoint, the method could include the following alternate steps:

(c) estimating the displacement settings for the motor and the pump appropriate for the flow setpoint conditions, and implementing the estimated displacement settings, opening the first shutoff valve (not shown) between the first terminal of the transformer and the actuator, monitoring post transient actuator speed, and judiciously adjusting the displacements in accordance with a speed error computation about the setpoint according to known PID control methods;

(d) continuing to adjust displacements according to the known PID method to match actual actuator speed to changing setpoint commands to the computer, and close the second shutoff valve when the setpoint goes to zero.

The disadvantage of the Class C transformer compared with the Class A and Class B transformers is the substantially lower efficiency as a result of all of the incoming fluid flowing through the motor discharging to the lowest pressure accumulator, all the energy thereof is expended in pumping fluid through to the transformer outlet through the entire high pressure to low pressure difference, whereas the Class A and Class B transformers pump fluid mainly through the input output pressure difference. The advantage of the innovative Class C transformer as described herein compared to the prior art Class C transformers is the simplification of switching configuration through the use of only two single-pole-double-throw two-position fluid transfer switches. The control methodology for Class A, Class B and Class C transformers is similar as apparent on viewing the multi-dimensional cubes shown on FIGS. 46 to 57.

It is a further object of this invention to provide a multiplicity of fluid transformer embodiments to facilitate high efficiency hydraulic fluid distribution, as shown conceptually in FIG. 68, where energy would move efficiently between different common pressure rails CPRs analogous to known practise in electric power systems, like for example, in medium power complexes on the scale of a forest products pulp mill. The electrical system 1100 takes service from a utility by a 1,000 ampere, 15 kV 3-phase cable 1101 to an electrical room within the complex. There the cable is connected to a 15 kV bus 1102, and to switchgear controlling 15 kV/5 kV transformers 1103, that step voltage down to 5 kV switchgear serving a 5 kV bus from where a duct and/or feeder cable 1104 run to 5 kV switchgear and motor control centers 1105, from which 5 kV feeders 1007 fan out to distant control centers. Also connected to cable 1104 are 5 kV/600 v transformers 1106 serving 600v control centers, from which feeders of 600 v 1108 fan out to electric motors, breaker panels, etc. Efficient transformation is essential to large distribution systems. High efficiency inventive fluid power transformers in this application, of variable and fixed displacement, could facilitate a hydraulic distribution system 1200 of similar capacity to the electric distribution system 1100. A first approximation suggests a hydraulic fluid system 1200 with a 15,000 psi CPR 1202, analogous to a 15,000 volt bus 1102 of the electric power system 1100, with fluid flow in units of gals/unit time, analoguous to current flow in amperes. An electric system 1100 of one thousand ampere capacity (1,000 amps) at 15 kV would compute to a capacity of about 25 megawatts. At 15,000 psi (15kPsi) equivalent fluid flow for 25 MW computes to approximately 2,000 gpm. The sizing of the accumulators 1201, 1210, to enhance stability of the CPRs throughout the system is analoguous to the sizing of capacitors in electric systems at various buses to minimize voltage fluctuations and reduce losses as energy is transferred long distances between buses. It is common in electric power systems to install the power factor correcting capacitors at the 15 kV bus 1102, which suggests the 15,000 psi CPR 1202 would be the best choice location for a bank of accumulators 1201 to provide fluid pressure stability to the entire hydraulic distribution system 1200, analoguous to the support of voltage and stability provided by the electric utility via the electric cable 1101 connection. The 15kPsi/5kPsi switchgear and fluid transformers 1203 step the pressure down to 5kPsi and switch supply to a 5kPsi conduit 1204, which includes a low pressure return 1204 to and from a 5kPsi CPR, from thence to 5kPsi switchgear and 5kPsi motor control 1205. The conduit would also serve 5kPsi/600 psi transformers and 600 psi switchgear 1206. The 5kPsi feeders 1207 fan out from the 1205. A 600 psi feeder 1208 connects to a 600 psi work center 1209. Accumulators 1210 of various pressures and capacities are judicously installed to serve to maintain pressure in the event of loss of an connecting conduit 1204. Artisans of electric power systems appreciate while a robust service from the utility adds to the stability of the power system, it also increases requirement for high interrupting capability in the switchgear 1103,1105, 1006. Artisans of hydraulic power systems will similarly appreciate that while large accumulaters add to stability, they also increase requirement for interrupting fluid flow. Similar ecomomies of classification of equipment by pressure levels in electric systems could be realized in hydraulic systems. It is an object of this fluid transformer invention to provide fixed and variable ratio transformer embodiments which make for a similarly efficient and stratified fluid distribution system.

The university group, "Engineering Research Center for Compact and Efficient Fluid Power" (CCEFP), states in a successful application for funding by the National Science Foundation, "The use of fluid power is so prevalent that any improvement in efficiency will have an important impact on energy consumption. Further, the intrinsic bandwidth and power density advantages of fluid power has not been exploited on smaller scale, portable and self-powered systems." It is further stated that an efficiency improvement of one percent in existing applications translates to a savings of $1 billion per year. The CCEFP reports their test beds include for hydraulic devices up to several megawatts, largest wind turbines of 3 MW or more.

Further embodiments of the inventive transformers are disclosed in the following paragraphs, where the swashblocks of the motor and pump devices are fixed rather than variable electronically. The fluid polarity assumed throughout this application is that when swashblock defection is in positive range, fluid enters motor port A, the motor rotates CW when viewed from its shaft end, thereby rotating the pump CCW when viewed from its shaft end, which is CW when viewed from opposite the pump shaft end. Viewed together as a transformer, when fluid enters motor port A, connecting shaft rotates CW and fluid exits from pump port A. On the other hand, when fluid enters motor port B, its shaft rotates CCW and fluid exits from pump port B. It is explained below that a 4-way fluid switch at the ports of a rotary device can be used to switch the polarity of the device.

The switching states where the swashblock deflection is set to negative to achieve consistency with the assumed polarity given in the previous paragraph are as follows: SS2, SS3, and SSS2, SSS3, with transformers of Class A and Class B, respectively. In SS2 and SSS2, the motor swashblock is reversed (switched to negative deflection range) so that the fluid will exit from pump port A. In both these switching states the first rotary device (consistently shown in the top position) is a motor operating as motor. In SS3, the motor (the second rotary device, shown in bottom position) swashblock is reversed to bring about CCW rotation so that the fluid will exit from pump port B, or alternatively, the pump (top) swashblock is reversed and the swashblock of the motor (bottom) is maintained positive. In SSS3 the first rotary device, the top device, is a motor. The motor swashblock is reversed to bring about CCW rotation so that the fluid will exit from pump port B, or alternatively, the pump swashblock is reversed and the swashblock of the motor is maintained positive. (In the context of this paragraph and the following paragraph, the term pump is interchangeable with the term pump/regen-motor of the Class A transformer.)

The efficiency benefits of the aforementioned inventive Class A and Class B transformers with electronically switchable over-center swashblock control are achieved in further embodiments in this application with fixed swashblock displacement devices in similar switching configurations by including a 4-way fluid transfer switch, with a first position for straight-through flow and a second position for transposed flow, installable at either or both the motor and pump terminals in lieu of the electronic over-center control.

In a fixed displacement embodiment with a Class A transformer configuration, known herein as a Class AF transformer, it is preferable to install only one 4-way switch similar to element 801, at the terminals of the first rotary operable device, setting it to the first position in SS1, and SS4, and to the second position in SS2, and SS3. In other words, the 4-way switch is only needed in switching states SS2 and SS3. In SS2 fluid flow is into port B of the first rotary device, which in this switching state is operating in motor mode, therefore the swashblock on the motor needed to be reversed to bring about CW rotation of the motor and thereby CCW rotation of the pump, for fluid flow to discharge from pump port A. A 4-way switch element 801 with fixed displacement swashblock would achieve the same result. In SS3 fluid flow is into port A of the second rotary device, which in this state is operating in motor mode, therefore for fluid to flow into port A of the first rotary device, which in this switching state is operating in pump mode, the swashblock of the first rotary device needed to be reversed (negative range).

In a fixed displacement embodiment with a Class B transformer configuration, known herein as a Class BF transformer, where the motor and the pump have mutually exclusive duties, it is preferable to install two 4-way switches, similar to element 801, to include those instances when it is preferable to maintain fluid flow into inlet port B of the pump and fluid flow out pump port A, with CCW rotation (consistent with the assumed polarity). In switching states SSS1 and SSS4, with all swashblocks in the positive position therefore no transposition switch is necessary. In switching state SSS2, the swashblock is in the negative position for the motor and in the positive position for the pump. This can be accommodated with a fixed positive displacement system by including a 4-way switch at the motor terminals and putting the 4-way switch element 801 in the second position to achieve CCW at the pump. In switching state SSS3, including a 4-way switch, element 801, set to the second position, at the motor terminals would serve to reverse the rotation to that shown on FIG. 64. Also including a second 4-way switch, element 801, set in the second position, at the pump terminals would transpose the fluid flow of the pump to that shown. In summary, one 4-way switch element 801, at the motor terminals, and a second at the pump terminals only if there is preference to always keep fluid flow into port B of the pump. Artisans will appreciate that the second switch, element 801, may not be necessary, that in switching state SSS3, the flow from the actuator to the pump is at considerable pressure coming from the actuator, and therefore the pump even without the switch is never going to be sucking at port A.

Fixed displacement fluid transformers, which would include a Class C transformer known herein as a Class CF transformer, are functionally analogous to fixed ratio electric power transformers, where boosting voltage when in power flow in one direction, results in reducing voltage in power flow in the opposite direction. Electric transformers and hydraulic transformers are similarly transposed. SS1 and SS4 are such states, boosting pressure in motoring mode in Q1, and reducing pressure in regenerating mode in Q4.

The application of the fluid power transformer to a WEC-Type-II wave energy converter as shown in FIGS. 40, and 41 to 44, includes two double-acting helical hydraulic rotary actuators 902, 904, for manipulating each WEC deflector 901. The inventive transformer can be applied in multiplex mode to incrementally actuate the deflectors in wave making application. When the WEC-Type-II 900 is applied to making waves to move from right to left, the deflector actuators 902, 904 operate in motoring mode in quadrant Q1, rotating in a CCW direction in steps of FIGS. 41 to 44 when viewed looking into the page. During the trough of a wave the actuator operates in motoring mode in quadrant Q2, rotating in a CW direction to reset itself and move to rest position for the next wave crest to pass over.

When the WEC-Type-II is applied to take energy from waves that move from left to right in FIG. 1A, the actuator operates in regeneration mode in quadrant Q3, rotating in a CW direction when viewed into the page. The four banks of converters while shown in a line in FIG. 40 are not in line but are staggered similar to the three WECs shown in FIG. 1. During the trough of a wave, the actuator operates in motoring mode in quadrant Q1, rotating in a CCW direction to reset itself to FIG. 44 position and hold for the next wave crest to impinge on the deflector 901 and then is switched to regeneration mode while the deflector 901 moves CW under force of the wave 22 as the wave crest 26 and trough 27 passes over.

When several WEC-Type-II wave energy converters are operated together as shown in FIG. 40, the transformer can be applied in multiplex mode to sequentially, incrementally, step through the actuation of the deflector of each converter. The process of multiplexing fluid flow from a single transformer to two rotary actuators is apparent when considering a single WEC-Type-II wave energy converter moving in small increments through the positions shown in FIGS. 41 to 44.

The aforementioned drawings and discussion have been simplified to assist in comprehension with some details omitted for brevity. A WEC operates continuously when waves are favorable, making it cost-effective to apply high efficiency hydraulic equipment and computer technology to the maximum extent possible. It is known that it is preferable, for greatest efficiency and flexibility, that for optimal state estimation all possible parameters be measurable (accessible and observable) to formulate the computer model for optimal computer control. A comprehensive computer model includes motor speed and fluid displacement indicators, fluid pressure and metering sensors, and fluid valve position indication at all possible points of measurement. It is known good practice for example, that auxiliary contacts on electrically operated devices such as fluid valves in this case, ensure that the devices have responded as required and are in the required position; and to include flow measurement. The hydraulic motors and pumps are preferably the full-range reversible type, actuated with electronic signals, with displacement indicators. The computer on board the WEC is subordinate to a master computer on shore, allowing the master computer to log, review and improve the performance of the slave.

The wave energy conversion system in accordance with the companion of the fluid transformer invention is essentially a computer controlled wave energy harvesting device that relies on a state estimator model of an incoming wave, as determined from pressure transducers on the ocean floor, to set the strategy for the harvesting of each wave cycle. The WEC's, forward looking, discrete switching, synchronizes itself to the waves coming on shore, and adjusts itself to harvest only those waves with energy above a predetermined threshold.

The system of the companion WEC invention in combination with the fluid transformer invention lends itself to use for creating waves for recreational purposes in addition to harvesting waves for energy generation. In the case of wave creation, energy for operating the wave making surface comes from shore. If small recurring waves are present, the WECs are positioned and timed for expelling water upward and, if deflectors are used, shoreward in a calculated sequence that progressively increases wave height and volume. The principles are the same but the energy flow is opposite. When starting a wave in a calm sea, calculation can be based on creating an imaginary horizontal drum of water and setting it in rotation toward the shore, slowly accelerating it in a forward direction. As the imaginary drum passes over a series of WECs, the pistons are reciprocated so as to create a longer drum or wave front with additional rows of WECs similarly configured. The helical hydraulic rotary actuator 902, 904, version WEC-Type-II 900 is operated in a similar manner.

The fluid power transformer can be considered to be a computer controlled system with basic elements and optional elements, the basic elements being the two rotatably operable devices connected by a shaft with a brake, a network of fluid piping, and one or more two-position fluid switches, depending on the Class of transformer, (1), (2), or (3), with optional elements for each of the above being (4) an electrically operated swashblock control, (5) fixed displacement swashblocks, (6) accumulator(s), (7) a two-quadrant actuator, (8) a four-quadrant actuator, (9) the transformer of (1), (2), or (3) in combination with a swing assembly with accumulator, (10) the fluid transformer of (1), (2), or (3) in combination with a fluid switch to direct fluid to high pressure storage in triplex assembly, and (11) a two-stage helical hydraulic rotary actuators actuator. And (12) the further embodiment of paralleling fluid transformers. The best practise for most expediently realizing the high efficiency aspects of the invention is by commissioning the transformer into service in the following sequence of combinations:

(1) The broad system of basic elements in a Class A configuration with none of the specified optional elements;
(2) The broad system of basic elements in a Class B configuration with none of the specified optional elements;
(3) The broad system of basic elements in a Class C configuration with none of the specified optional elements.
(4) In the system of basic elements (1), or (2), computing fluid flow at a notional speed and continuing in a form of step-by-step optimal control;
(5) Including state estimation with the system of (4) in the method of control;
(6) Commissioning the Class A and the Class B transformers in the WEC application;
(7) Continuing with the WEC application (6), sectionalizing the assembly of cylinders below the piston into two groups and commissioning the swing accumulator:
(8) Continuing further with the WEC in (7), except sectionalizing in 3 groups, and including the by-pass circuit;
(9) Focus on putting into service the two main types of swashblock actuation, electric and hydraulic;
(10) Commission the electrically actuated transformer in the second WEC application that of double acting hydraulic helical actuators, in electric power generation or wave making applications;
(11) Commission the fixed displacement transformer Class AF, Class BF, and Class CF;
(12) Test out the method of paralleling the aforementioned six inventive transformers as explained in Claim 12;

Artisans will appreciate there are many other combinations of the above that are equally beneficial.

While illustrative embodiments have been illustrated and described, it will be appreciated that various changes can be made therein without departing from the spirit and scope of the invention.

The embodiments of the invention in which an exclusive property or privilege is claimed are defined as follows:

1. A hydraulic power transmission system comprising:
   a hydraulic transformer, including,
   (a) a first variable displacement hydraulic rotatably operable device (223) with a first fluid port (223a) and a second fluid port (223b);
   (b) a second variable displacement hydraulic rotatably operable device (222) with a third fluid port (222a) and a fourth fluid port (222b);
   (c.) a common shaft (227) rotatably connecting the first rotatably operable device (223) to the second rotatably operable device (223); and
   (d.) an electrically operable brake (227b) operable between the common shaft and the stationary frame of said rotatably operable devices;
   (e.) a fluid conduit network comprising a fluid connection between the fourth port (222b) and a low pressure port (212), and a two-position fluid transfer switch (214) having a port A (214a) fluidly connected to the first port (223a) and to an input/out port (211), a port B (214b) fluidly connected to the second port (223b) and to a high pressure port (213), and a port N (214n) fluidly connected to the third port (222a); wherein a first position of the fluid transfer switch (214) fluidly connects port N and port A and a second position fluidly connects port N and port B;
   (f.) a linear fluid device (221) fluidly connected to the input/output port (211);
      wherein when a first switching state is desired [FIG. 8], allowing fluid flow from the high pressure port (213) to the input/output port (211) with a pressure increase, the fluid transfer switch (214) is set to the second position, where fluid flows from the high pressure port (213) to the third port (222a), to operate the second rotatably operable device (222) as a motor driving the first rotatably operable device (223) as a pump, to increase pressure from the second port (223b) to the first port (223a), to move flow from the high pressure port (213) to the input/output port (211);

wherein when a second switching state is desired [FIG. 9], allowing fluid flow from the high pressure port (213) to the input/out port (211) with a pressure decrease, the fluid transfer switch is set to the first position, where fluid flows from the high pressure port (213) to the second port (223b), to operate the first rotatably operable device (223) as a motor driving the second rotatably operable device (222) as a pump, to increase pressure from the low pressure port (212), through the third port (222b), to the input/output port (211), and wherein flow to the second port (223b), through the first rotatably operable device (223) and from the first port, also flows to the input/output port (211);

wherein when a third switching state is desired [FIG. 6], allowing fluid flow from the input/output port (211) to the high pressure port (213) with a pressure increase, the fluid transfer switch (214) is set to the first position, where fluid flows from the input/output port (211) to the third port (222a), to operate the second rotatably operable device (222) as a motor driving the first rotatably operable device (223) as a pump, to increase pressure from the second port (223b) relative to the first port (223a), to move flow from the input/output port (211) to the high pressure port (213);

wherein when a fourth switching state is desired [FIG. 7], allowing fluid flow from the input/output port (211) to the high pressure port (213) with a pressure decrease, the fluid transfer switch is set to the second position, where fluid flows from the input/output port (211) to the first port (223a) through the second port (223b), to operate the first rotatably operable device (223) as a motor driving the second rotatably operable device (222) as a pump, to increase pressure from the low pressure port (212), through the third port (222a), to the high pressure port (213), and wherein flow to the first port, through the first rotatably operable device (223) and from the second port (223b), also flows to the high pressure port (213); and (g.) a computer including a means for receiving linear fluid device control objectives and pressure and flow at the high pressure port, the low pressure port and input/output port, a means for determining a desired switching state, based on the actuator control objectives and a means for computing fluid flow through the first and second rotatably operable objectives; wherein the computer controls the fluid transfer switch to be in the desired switching state and controls the displacement of the first and second rotatably operable devices, throughout movement of the linear fluid device.

2. The transmission system according to claim 1, including a first accumulator (225) connected to the transformer high pressure port (213), and a second accumulator (224) connected to the transformer low pressure port (212).

3. A hydraulic power transmission system comprising:
a hydraulic transformer including,
(a.) a first variable displacement hydraulic rotatably operable device (323) with a first fluid port (323a) and a second fluid port (323b), operable as a motor;
(b.) a second variable displacement hydraulic rotatably operable device (322) with a third fluid port (322a) and a fourth fluid port (322b), operable as a pump;
(c.) a common shaft (227) rotatably connecting the first rotatably operable device (323) to the second rotatably operable device (322); and
(d.) an electrically operable brake (227b) operable between the common shaft and the stationary frame of said rotatably operable devices;

(e.) a linear fluid device (221) fluidly connected to the input/output port (211);
(f.) a fluid conduit network comprising, a two-position fluid transfer switch (214) having
a port A fluidly connected to an input/output port (211) and to a port A of a fluid transposition switch,
a port B fluidly connected to a high pressure port (213) and to a port B of the fluid transposition switch, and
a port N fluidly connected to a port C of the fluid transposition switch, wherein a first position of the fluid transfer switch (214) fluidly connects port N and port A of the fluid transfer switch and a second position fluidly connects port N and port B of the fluid transfer switch (214), with a fluid connection between a low pressure port (212) and
a port N of the fluid transposition switch [FIG. 10-13], wherein the fluid transposition switch (310), substantially interposed between the first fluid conduit network and the motor and the pump, includes four two-position valves, with
a first position fluidly connecting port A of the fluid transposition switch to the third port (322a), port B of the fluid transposition switch to the fourth port (322b), port C of the fluid transposition switch to the first port (323a), and port N of the fluid transposition switch to the second port (323b), and with
a second position fluidly connecting port A of the fluid transposition switch to the first port (323a), port B of the fluid transposition switch to the second port (323b), port C of the fluid transposition switch to the third port (322a), and port N of the fluid transposition switch to the fourth port (322b);
a linear fluid device (221) fluidly connected to the input/output port (211);
wherein when a first switching state is desired [FIG. 12], allowing fluid flow from the high pressure port (213) to the input/output port (211) with a pressure increase, the fluid transfer switch (214) is set to the second position, and the fluid transposition switch (310) is set to the first position, wherein fluid flows from the high pressure port (213) to the first port (323a), to operate the first rotatably operable device (323) as a motor driving the second rotatably operable device (223) as a pump, to increase pressure from the fourth port (322b) relative to the third port (322a), to move flow from the high pressure port (213) to the input/output port (211);
wherein when a second switching state is desired [FIG. 13], allowing fluid flow from the high pressure port (213) to the input/port (211) with a pressure decrease, the fluid transfer switch (214) is set to the first position, and the fluid transposition switch (310) is set to the second position, wherein fluid flows from the high pressure port (213) to the second port (323b) to operate the first rotatably operable device (323) as a motor driving the second rotatably operable device (322) as a pump, to increase pressure from the low pressure port (212), through the fourth port (322b), out the third port (322a) to the input/output port (211), and wherein flow from the second port (323b), through the first rotatably operable device (323) and from the first port (322a), also flows to the input/output port (211);
wherein when a third switching state is desired [FIG. 10], allowing fluid flow from the input/output port (211) to the high pressure port (213) with a pressure increase, the fluid transfer switch (214) is set to the first position and the fluid transposition switch (310) is set to the first position, wherein fluid flows from the input/output port (211) to the first port (323a), to operate the first rotatably operable device (323) as a motor driving the second rotatably operable device (322) as a pump, to increase pressure from the fourth port (322b) relative to the third port (322a), to move flow from the input/output port (211) to the high pressure port (213);

wherein when a fourth switching state is desired [FIG. 11], allowing fluid flow from the input/output port (211) to the high pressure port (213) with a pressure decrease, the fluid transfer switch (214) is set to the second position, and the fluid transposition switch (310) is set to the second position, where fluid flows from the input/output port (211) to the first port (323a) through the second port (323b), to operate the first rotatably operable device (323) as a motor driving the second rotatably operable device (322) as a pump, to increase pressure from the low pressure port (212), through the third port (322a), to the high pressure port (213), and wherein flow from the input/output port (211) to the first port (323a), through the first rotatably operable device (323) and from the second port (323b) also flows to the high pressure port (213); and (g.) a computer including a means for receiving linear fluid device control objectives and pressure and flow at the high pressure port, the low pressure port and input/output port, a means for determining a desired switching state, based on the actuator control objectives and a means for computing fluid flow through the first and second rotatably operable objectives; wherein the computer controls the fluid transfer switches to be in the desired switching state and controls the displacement of the first and second rotatably operable devices, throughout movement of the linear fluid device.

4. The transmission system according to claim 3, including a first accumulator (225) connected to the transformer high pressure port (213), and a second accumulator (224) connected to the transformer low pressure port (212).

5. A hydraulic power transmission system comprising:
a hydraulic transformer including,
(a.) a first variable displacement hydraulic rotatably operable device (222) with a first fluid port (222a) and a second fluid port (222b), operable as a motor, the second port (222b) fluidly connected to a low pressure port (212);
(b.) a second variable displacement hydraulic rotatably operable device (223) with a third fluid port (223a) and a fourth fluid port (223b), operable as a pump, the third port (223a) fluidly connected to the low pressure port;
(c.) a common shaft (227) rotatably connecting the first rotatably operable device (323) to the second rotatably operable device (322); and
(d.) an electrically operable brake (227b) operable between the common shaft and the stationary frame of said rotatably operable devices;
(e.) a fluid conduit network comprising,
a first two-position fluid transfer switch (264) and a second two-position fluid transfer switch (274),
said first transfer switch (264) having
a port A (264a) of the first transfer switch fluidly connected to an input/output port (211) and to a port A (274a) of the second transfer switch (274), with
a port B (264b) of the first transfer switch fluidly connected to a high pressure port (213) and to a port B (274b) of the second transfer switch (274), and
a port N (264n) fluidly connected to the first port (222a),
wherein a first position of the first transfer switch (264) fluidly connects port N (264n) and port B (264b) of the first transfer switch and a second position fluidly connects port N (264n) and port A (264a) of the first transfer switch and the second transfer switch (274) having
a port N (274n) of the second transfer switch fluidly connected to the fourth port (223b),
wherein the first position of the second transfer switch (274) fluidly connects port N (274n) of the second transfer switch and port A (264a) of the first transfer switch, and the second position connects port N (274n) of the second transfer switch and port B (274b) of the second transfer switch;

(f.) a linear fluid device (221) fluidly connected to the input/output port (211);
wherein when a first switching state is desired [FIG. 15], allowing fluid flow from the high pressure port (213) to the input/output port (211), the transfer switches are set to the first position, wherein fluid flows from the high pressure port (213) to the first port (222a), to operate the first rotatably operable device (222) as a motor driving the second rotatably operable device (223) as a pump, to increase pressure from the third port (223a) to the fourth port (223b), to move flow from the low pressure port (212) to the input/output port (211);
wherein when a second switching state is desired [FIG. 14], allowing fluid flow from the input/output port (211) to the high pressure port (213), the transfer switches are set to the second position, wherein fluid flows from the input/output port (211) to the first port (222a), to operate the first rotatably operable device (222) as a motor driving the second rotatably operable device (223) as a pump, to increase pressure from the third port (223a) to the fourth port (223b), to move flow from the low pressure port (212) to the high pressure port (213); and (g.) a computer including a means for receiving linear fluid device control objectives and pressure and flow at the high pressure port, the low pressure port and input/output port, a means for determining a desired switching state, based on the actuator control objectives and a means for computing fluid flow through the first and second rotatably operable objectives; wherein the computer controls the transfer switches to be in the desired switching state and controls the displacement of the first and second rotatably operable devices, throughout movement of the linear fluid device.

6. The transmission system according to claim 5, including a first accumulator (225) connected to the transformer high pressure port (213), and a second accumulator (224) connected to the transformer low pressure port (212).

* * * * *